United States Patent
Lang et al.

(10) Patent No.: US 10,499,146 B2
(45) Date of Patent: Dec. 3, 2019

(54) VOICE CONTROL OF A MEDIA PLAYBACK SYSTEM

(71) Applicant: Sonos, Inc, Santa Barbara, CA (US)

(72) Inventors: Jonathan P. Lang, Santa Barbara, CA (US); Mark Plagge, Santa Barbara, CA (US); Simon Jarvis, Cambridge, MA (US); Romi Kadri, Cambridge, MA (US); Yean-Nian Willy Chen, Santa Barbara, CA (US); Paul Andrew Bates, Santa Barbara, CA (US); Luis Vega-Zayas, Cambridge, MA (US); Christopher Butts, Evanston, IL (US); Nicholas A. J. Millington, Santa Barbara, CA (US); Keith Corbin, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/438,749

(22) Filed: Feb. 21, 2017

(65) Prior Publication Data
US 2017/0242653 A1    Aug. 24, 2017

Related U.S. Application Data

(60) Provisional application No. 62/312,350, filed on Mar. 23, 2016, provisional application No. 62/298,393, (Continued)

(51) Int. Cl.
*G06F 17/00* (2019.01)
*H04R 3/00* (2006.01)
(Continued)

(52) U.S. Cl.
CPC ............... *H04R 3/00* (2013.01); *G06F 3/162* (2013.01); *G06F 3/165* (2013.01); *G06F 3/167* (2013.01);
(Continued)

(58) Field of Classification Search
CPC ...... H04R 3/00; H04R 3/12; H04R 2227/005; G06F 3/162; G06F 3/165; G06F 3/167;
(Continued)

(56) References Cited

U.S. PATENT DOCUMENTS

| 4,741,038 A | 4/1988 | Elko et al. |
| 4,941,187 A | 7/1990 | Slater |

(Continued)

FOREIGN PATENT DOCUMENTS

| AU | 2017100486 A4 | 6/2017 |
| AU | 2017100581 A4 | 6/2017 |

(Continued)

OTHER PUBLICATIONS

US 9,299,346 B1, 03/2016, Hart et al. (withdrawn)
(Continued)

*Primary Examiner* — Fan S Tsang
*Assistant Examiner* — David Siegel
(74) *Attorney, Agent, or Firm* — McDonnell Boehnen Hulbert & Berghoff LLP

(57) ABSTRACT

Multiple aspects of systems and methods for voice control and related features and functionality for various embodiments of media playback devices, networked microphone devices, microphone-equipped media playback devices, and speaker-equipped networked microphone devices are disclosed and described herein, including but not limited to designating and managing default networked devices, audio response playback, room-corrected voice detection, content mixing, music service selection, metadata exchange between networked playback systems and networked microphone systems, handling loss of pairing between networked devices, actions based on user identification, and other voice control of networked devices.

20 Claims, 25 Drawing Sheets

Related U.S. Application Data filed on Feb. 22, 2016, provisional application No. 62/298,425, filed on Feb. 22, 2016, provisional application No. 62/298,350, filed on Feb. 22, 2016, provisional application No. 62/298,388, filed on Feb. 22, 2016, provisional application No. 62/298,439, filed on Feb. 22, 2016, provisional application No. 62/298,418, filed on Feb. 22, 2016, provisional application No. 62/298,410, filed on Feb. 22, 2016, provisional application No. 62/298,433, filed on Feb. 22, 2016.

(51) Int. Cl.

| | | |
|---|---|---|
| *G06F 3/16* | (2006.01) | |
| *H04R 29/00* | (2006.01) | |
| *H04W 8/00* | (2009.01) | |
| *H04W 8/24* | (2009.01) | |
| *H04R 27/00* | (2006.01) | |
| *H04L 12/28* | (2006.01) | |
| *G10L 15/14* | (2006.01) | |
| *G10L 15/22* | (2006.01) | |
| *H04R 3/12* | (2006.01) | |
| *H04S 7/00* | (2006.01) | |
| *G10L 21/02* | (2013.01) | |
| *H04W 84/12* | (2009.01) | |

(52) U.S. Cl.
CPC .............. *G10L 15/14* (2013.01); *G10L 15/22* (2013.01); *H04L 12/2803* (2013.01); *H04L 12/2809* (2013.01); *H04R 3/12* (2013.01); *H04R 27/00* (2013.01); *H04R 29/007* (2013.01); *H04S 7/301* (2013.01); *H04S 7/303* (2013.01); *H04W 8/005* (2013.01); *H04W 8/24* (2013.01); *G10L 21/02* (2013.01); *G10L 2015/223* (2013.01); *H04L 2012/2849* (2013.01); *H04R 2227/003* (2013.01); *H04R 2227/005* (2013.01); *H04R 2420/07* (2013.01); *H04W 84/12* (2013.01)

(58) Field of Classification Search
CPC ......... G10L 15/14; G10L 15/22; G10L 21/02; G10L 2015/223; H04L 12/2803; H04S 7/301; H04S 7/302; H04S 7/303; H04W 8/005

See application file for complete search history.

(56) References Cited

U.S. PATENT DOCUMENTS

| | | | |
|---|---|---|---|
| 5,440,644 | A | 8/1995 | Farinelli et al. |
| 5,588,065 | A | 12/1996 | Tanaka et al. |
| 5,740,260 | A | 4/1998 | Odom |
| 5,761,320 | A | 6/1998 | Farinelli et al. |
| 5,923,902 | A | 7/1999 | Inagaki |
| 6,032,202 | A | 2/2000 | Lea et al. |
| 6,088,459 | A | 7/2000 | Hobelsberger |
| 6,256,554 | B1 | 7/2001 | DiLorenzo |
| 6,301,603 | B1 | 10/2001 | Maher et al. |
| 6,311,157 | B1 | 10/2001 | Strong |
| 6,404,811 | B1 | 6/2002 | Cvetko et al. |
| 6,408,078 | B1 | 6/2002 | Hobelsberger |
| 6,469,633 | B1 | 10/2002 | Wachter |
| 6,522,886 | B1 | 2/2003 | Youngs et al. |
| 6,594,347 | B1 | 7/2003 | Calder et al. |
| 6,594,630 | B1 | 7/2003 | Zlokarnik et al. |
| 6,611,537 | B1 | 8/2003 | Edens et al. |
| 6,611,604 | B1 | 8/2003 | Irby et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,661,107 | B1 | 2/2010 | Van Dyke et al. |
| 7,702,508 | B2 | 4/2010 | Bennett |
| 7,792,311 | B1 | 9/2010 | Holmgren et al. |
| 7,853,341 | B2 | 12/2010 | McCarty et al. |
| 7,961,892 | B2 | 6/2011 | Fedigan |
| 7,987,294 | B2 | 7/2011 | Bryce et al. |
| 8,014,423 | B2 | 9/2011 | Thaler et al. |
| 8,041,565 | B1 | 10/2011 | Bhardwaj et al. |
| 8,045,952 | B2 | 10/2011 | Qureshey et al. |
| 8,073,125 | B2 | 12/2011 | Zhang et al. |
| 8,103,009 | B2 | 1/2012 | McCarty et al. |
| 8,234,395 | B2 | 7/2012 | Millington et al. |
| 8,239,206 | B1 | 8/2012 | Lebeau et al. |
| 8,255,224 | B2 | 8/2012 | Singleton et al. |
| 8,284,982 | B2 | 10/2012 | Bailey |
| 8,290,603 | B1 | 10/2012 | Lambourne |
| 8,340,975 | B1 | 12/2012 | Rosenberger et al. |
| 8,364,481 | B2 | 1/2013 | Strope et al. |
| 8,385,557 | B2 | 2/2013 | Tashev et al. |
| 8,386,261 | B2 | 2/2013 | Mellott et al. |
| 8,423,893 | B2 | 4/2013 | Ramsay et al. |
| 8,428,758 | B2 | 4/2013 | Naik et al. |
| 8,453,058 | B1 | 5/2013 | Coccaro et al. |
| 8,483,853 | B1 | 7/2013 | Lambourne |
| 8,484,025 | B1 | 7/2013 | Moreno Mengibar et al. |
| 8,831,761 | B2 | 9/2014 | Kemp et al. |
| 8,831,957 | B2 | 9/2014 | Taubman et al. |
| 8,874,448 | B1 | 10/2014 | Kauffmann et al. |
| 8,938,394 | B1 | 1/2015 | Faaborg et al. |
| 8,942,252 | B2 | 1/2015 | Balassanian et al. |
| 8,983,383 | B1 | 3/2015 | Haskin |
| 8,983,844 | B1 | 3/2015 | Thomas et al. |
| 9,042,556 | B2 | 5/2015 | Kallai et al. |
| 9,094,539 | B1 | 7/2015 | Noble |
| 9,215,545 | B2 | 12/2015 | Dublin et al. |
| 9,251,793 | B2 | 2/2016 | Lebeau et al. |
| 9,253,572 | B2 | 2/2016 | Bedingfield, Sr. et al. |
| 9,262,612 | B2 | 2/2016 | Cheyer |
| 9,288,597 | B2 | 3/2016 | Carlsson et al. |
| 9,300,266 | B2 | 3/2016 | Grokop |
| 9,307,321 | B1 | 4/2016 | Unruh |
| 9,318,107 | B1 | 4/2016 | Sharifi |
| 9,319,816 | B1 | 4/2016 | Narayanan |
| 9,335,819 | B1 | 5/2016 | Jaeger et al. |
| 9,368,105 | B1 | 6/2016 | Freed et al. |
| 9,374,634 | B2 | 6/2016 | Macours |
| 9,412,392 | B2 | 8/2016 | Lindahl et al. |
| 9,426,567 | B2 | 8/2016 | Lee et al. |
| 9,431,021 | B1 | 8/2016 | Scalise et al. |
| 9,443,527 | B1 | 9/2016 | Watanabe et al. |
| 9,472,201 | B1 | 10/2016 | Sleator |
| 9,472,203 | B1 | 10/2016 | Ayrapetian et al. |
| 9,484,030 | B1 | 11/2016 | Meaney et al. |
| 9,489,948 | B1 | 11/2016 | Chu et al. |
| 9,494,683 | B1 | 11/2016 | Sadek |
| 9,509,269 | B1 | 11/2016 | Rosenberg |
| 9,510,101 | B1 | 11/2016 | Polleros |
| 9,514,752 | B2 | 12/2016 | Sharifi |
| 9,536,541 | B2 | 1/2017 | Chen et al. |
| 9,548,053 | B1 | 1/2017 | Basye et al. |
| 9,548,066 | B2 | 1/2017 | Jain et al. |
| 9,552,816 | B2 | 1/2017 | Vanlund et al. |
| 9,560,441 | B1 | 1/2017 | McDonough, Jr. et al. |
| 9,576,591 | B2 | 2/2017 | Kim et al. |
| 9,601,116 | B2 | 3/2017 | Melendo Casado et al. |
| 9,615,170 | B2 | 4/2017 | Kirsch et al. |
| 9,615,171 | B1 | 4/2017 | O'Neill et al. |
| 9,626,695 | B2 | 4/2017 | Balasubramanian et al. |

(56) References Cited

U.S. PATENT DOCUMENTS

| | | |
|---|---|---|
| 9,632,748 B2 | 4/2017 | Faaborg et al. |
| 9,633,186 B2 | 4/2017 | Ingrassia, Jr. et al. |
| 9,633,368 B2 | 4/2017 | Greenzeiger et al. |
| 9,633,660 B2 | 4/2017 | Haughay et al. |
| 9,633,671 B2 | 4/2017 | Giacobello et al. |
| 9,633,674 B2 | 4/2017 | Sinha et al. |
| 9,640,179 B1 | 5/2017 | Hart et al. |
| 9,640,183 B2 | 5/2017 | Jung et al. |
| 9,641,919 B1 | 5/2017 | Poole et al. |
| 9,646,614 B2 | 5/2017 | Bellegarda et al. |
| 9,653,060 B1 | 5/2017 | Hilmes et al. |
| 9,653,075 B1 | 5/2017 | Chen et al. |
| 9,659,555 B1 | 5/2017 | Hilmes et al. |
| 9,672,821 B2 | 6/2017 | Krishnaswamy et al. |
| 9,685,171 B1 | 6/2017 | Yang |
| 9,691,378 B1 | 6/2017 | Meyers et al. |
| 9,691,379 B1 | 6/2017 | Mathias et al. |
| 9,697,826 B2 | 7/2017 | Sainath et al. |
| 9,697,828 B1 | 7/2017 | Prasad et al. |
| 9,698,999 B2 | 7/2017 | Mutagi et al. |
| 9,704,478 B1 | 7/2017 | Vitaladevuni et al. |
| 9,721,566 B2 | 8/2017 | Newendorp et al. |
| 9,721,568 B1 | 8/2017 | Polansky et al. |
| 9,721,570 B1 | 8/2017 | Beal et al. |
| 9,728,188 B1 | 8/2017 | Rosen et al. |
| 9,734,822 B1 | 8/2017 | Sundaram et al. |
| 9,747,011 B2 | 8/2017 | Lewis et al. |
| 9,747,899 B2 | 8/2017 | Pogue et al. |
| 9,747,920 B2 | 8/2017 | Ayrapetian et al. |
| 9,747,926 B2 | 8/2017 | Sharifi et al. |
| 9,754,605 B1 | 9/2017 | Chhetri |
| 9,762,967 B2 | 9/2017 | Clarke et al. |
| 9,811,314 B2 | 11/2017 | Plagge et al. |
| 9,813,810 B1 | 11/2017 | Nongpiur |
| 9,813,812 B2 | 11/2017 | Berthelsen et al. |
| 9,820,036 B1 | 11/2017 | Tritschler et al. |
| 9,820,039 B2 | 11/2017 | Lang |
| 9,826,306 B2 | 11/2017 | Lang |
| 9,865,259 B1 | 1/2018 | Typrin et al. |
| 9,865,264 B2 | 1/2018 | Gelfenbeyn et al. |
| 9,881,616 B2 | 1/2018 | Beckley et al. |
| 9,916,839 B1 | 3/2018 | Scalise et al. |
| 9,947,316 B2 | 4/2018 | Millington et al. |
| 9,973,849 B1 | 5/2018 | Zhang et al. |
| 10,013,995 B1 | 7/2018 | Lashkari et al. |
| 10,048,930 B1 | 8/2018 | Vega et al. |
| 10,051,366 B1 | 8/2018 | Buoni et al. |
| 10,079,015 B1 | 9/2018 | Lockhart et al. |
| 10,134,399 B2 | 11/2018 | Lang et al. |
| 10,152,969 B2 | 12/2018 | Reilly et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0034280 A1 | 3/2002 | Infosino |
| 2002/0072816 A1 | 6/2002 | Shdema et al. |
| 2002/0124097 A1 | 9/2002 | Isely et al. |
| 2003/0040908 A1 | 2/2003 | Yang et al. |
| 2003/0070869 A1 | 4/2003 | Hlibowicki |
| 2003/0072462 A1 | 4/2003 | Hlibowicki |
| 2003/0095672 A1 | 5/2003 | Hobelsberger |
| 2003/0157951 A1 | 8/2003 | Hasty |
| 2004/0024478 A1 | 2/2004 | Hans et al. |
| 2004/0093219 A1 | 5/2004 | Shin et al. |
| 2004/0128135 A1 | 7/2004 | Anastasakos et al. |
| 2005/0031131 A1 | 2/2005 | Browning et al. |
| 2005/0031132 A1 | 2/2005 | Browning et al. |
| 2005/0031133 A1 | 2/2005 | Browning et al. |
| 2005/0031134 A1 | 2/2005 | Leske |
| 2005/0031137 A1 | 2/2005 | Browning et al. |
| 2005/0031138 A1 | 2/2005 | Browning et al. |
| 2005/0031139 A1 | 2/2005 | Browning et al. |
| 2005/0031140 A1 | 2/2005 | Browning |
| 2005/0047606 A1 | 3/2005 | Lee et al. |
| 2005/0164664 A1 | 7/2005 | DiFonzo et al. |
| 2005/0195988 A1 | 9/2005 | Tashev et al. |
| 2005/0207584 A1 | 9/2005 | Bright |
| 2005/0268234 A1 | 12/2005 | Rossi et al. |
| 2005/0283330 A1 | 12/2005 | Laraia et al. |
| 2006/0104451 A1 | 5/2006 | Browning et al. |
| 2006/0147058 A1 | 7/2006 | Wang |
| 2006/0190968 A1 | 8/2006 | Jung et al. |
| 2006/0247913 A1 | 11/2006 | Huerta et al. |
| 2006/0262943 A1 | 11/2006 | Oxford |
| 2007/0018844 A1 | 1/2007 | Sutardja |
| 2007/0019815 A1 | 1/2007 | Asada et al. |
| 2007/0033043 A1 | 2/2007 | Hyakumoto |
| 2007/0071255 A1 | 3/2007 | Schobben |
| 2007/0076131 A1 | 4/2007 | Li et al. |
| 2007/0076906 A1 | 4/2007 | Takagi et al. |
| 2007/0140058 A1 | 6/2007 | McIntosh et al. |
| 2007/0140521 A1 | 6/2007 | Mitobe et al. |
| 2007/0142944 A1 | 6/2007 | Goldberg et al. |
| 2007/0147651 A1 | 6/2007 | Mitobe et al. |
| 2008/0037814 A1 | 2/2008 | Shau |
| 2008/0090537 A1 | 4/2008 | Sutardja |
| 2008/0146289 A1* | 6/2008 | Korneluk ............ H04M 1/6041 455/569.1 |
| 2008/0221897 A1 | 9/2008 | Cerra et al. |
| 2008/0247530 A1 | 10/2008 | Barton et al. |
| 2008/0248797 A1 | 10/2008 | Freeman et al. |
| 2008/0301729 A1 | 12/2008 | Broos et al. |
| 2009/0003620 A1 | 1/2009 | McKillop et al. |
| 2009/0005893 A1 | 1/2009 | Sugii et al. |
| 2009/0010445 A1 | 1/2009 | Matsuo et al. |
| 2009/0018828 A1 | 1/2009 | Nakadai et al. |
| 2009/0076821 A1 | 3/2009 | Brenner et al. |
| 2009/0153289 A1 | 6/2009 | Hope et al. |
| 2009/0197524 A1 | 8/2009 | Haff et al. |
| 2009/0228919 A1 | 9/2009 | Zott et al. |
| 2009/0238377 A1 | 9/2009 | Ramakrishnan et al. |
| 2009/0264072 A1 | 10/2009 | Dai |
| 2009/0326949 A1 | 12/2009 | Douthitt et al. |
| 2010/0014690 A1 | 1/2010 | Wolff et al. |
| 2010/0023638 A1 | 1/2010 | Bowman |
| 2010/0035593 A1 | 2/2010 | Franco et al. |
| 2010/0075723 A1 | 3/2010 | Min et al. |
| 2010/0092004 A1 | 4/2010 | Kuze |
| 2010/0172516 A1 | 7/2010 | Lastrucci |
| 2010/0179874 A1 | 7/2010 | Higgins et al. |
| 2010/0211199 A1 | 8/2010 | Naik et al. |
| 2011/0033059 A1 | 2/2011 | Bhaskar et al. |
| 2011/0035580 A1 | 2/2011 | Wang et al. |
| 2011/0044461 A1 | 2/2011 | Kuech et al. |
| 2011/0044489 A1 | 2/2011 | Saiki et al. |
| 2011/0091055 A1 | 4/2011 | LeBlanc |
| 2011/0145581 A1 | 6/2011 | Malhotra et al. |
| 2011/0267985 A1 | 11/2011 | Wilkinson et al. |
| 2011/0276333 A1 | 11/2011 | Wang et al. |
| 2011/0280422 A1 | 11/2011 | Neumeyer et al. |
| 2011/0289506 A1 | 11/2011 | Trivi et al. |
| 2011/0299706 A1 | 12/2011 | Sakai |
| 2012/0020486 A1 | 1/2012 | Fried et al. |
| 2012/0022863 A1 | 1/2012 | Cho et al. |
| 2012/0078635 A1 | 3/2012 | Rothkopf et al. |
| 2012/0123268 A1 | 5/2012 | Tanaka et al. |
| 2012/0131125 A1 | 5/2012 | Seidel et al. |
| 2012/0148075 A1 | 6/2012 | Goh et al. |
| 2012/0163603 A1 | 6/2012 | Abe et al. |
| 2012/0177215 A1 | 7/2012 | Bose et al. |
| 2012/0297284 A1 | 11/2012 | Matthews, III et al. |
| 2012/0308044 A1 | 12/2012 | Vander et al. |
| 2012/0308046 A1 | 12/2012 | Muza |
| 2013/0006453 A1 | 1/2013 | Wang et al. |
| 2013/0024018 A1 | 1/2013 | Chang et al. |
| 2013/0039527 A1 | 2/2013 | Jensen et al. |
| 2013/0058492 A1 | 3/2013 | Silzle et al. |
| 2013/0066453 A1 | 3/2013 | Seefeldt |
| 2013/0148821 A1 | 6/2013 | Sorensen |
| 2013/0179173 A1 | 7/2013 | Lee et al. |
| 2013/0183944 A1 | 7/2013 | Mozer et al. |
| 2013/0191122 A1 | 7/2013 | Mason |
| 2013/0198298 A1 | 8/2013 | Li et al. |
| 2013/0216056 A1 | 8/2013 | Thyssen |
| 2013/0315420 A1 | 11/2013 | You |

(56) References Cited

U.S. PATENT DOCUMENTS

| | | |
|---|---|---|
| 2013/0317635 A1 | 11/2013 | Bates et al. |
| 2013/0322665 A1 | 12/2013 | Bennett et al. |
| 2013/0324031 A1 | 12/2013 | Loureiro |
| 2013/0329896 A1 | 12/2013 | Krishnaswamy et al. |
| 2013/0331970 A1 | 12/2013 | Beckhardt et al. |
| 2013/0332165 A1 | 12/2013 | Beckley et al. |
| 2013/0343567 A1 | 12/2013 | Triplett et al. |
| 2014/0003611 A1 | 1/2014 | Mohammad et al. |
| 2014/0003625 A1 | 1/2014 | Sheen et al. |
| 2014/0003635 A1 | 1/2014 | Mohammad et al. |
| 2014/0006026 A1 | 1/2014 | Lamb et al. |
| 2014/0034929 A1 | 2/2014 | Hamada et al. |
| 2014/0064501 A1 | 3/2014 | Olsen et al. |
| 2014/0075306 A1 | 3/2014 | Rega |
| 2014/0094151 A1 | 4/2014 | Klappert et al. |
| 2014/0100854 A1 | 4/2014 | Chen et al. |
| 2014/0122075 A1 | 5/2014 | Bak et al. |
| 2014/0145168 A1 | 5/2014 | Ohsawa et al. |
| 2014/0146983 A1 | 5/2014 | Kim et al. |
| 2014/0167931 A1 | 6/2014 | Lee et al. |
| 2014/0168344 A1 | 6/2014 | Shoemake et al. |
| 2014/0195252 A1 | 7/2014 | Gruber et al. |
| 2014/0219472 A1 | 8/2014 | Huang et al. |
| 2014/0222436 A1 | 8/2014 | Binder et al. |
| 2014/0244013 A1 | 8/2014 | Reilly |
| 2014/0249817 A1 | 9/2014 | Hart et al. |
| 2014/0252386 A1 | 9/2014 | Ito et al. |
| 2014/0254805 A1 | 9/2014 | Su et al. |
| 2014/0258292 A1 | 9/2014 | Thramann et al. |
| 2014/0270282 A1 | 9/2014 | Tammi et al. |
| 2014/0274185 A1 | 9/2014 | Luna et al. |
| 2014/0274203 A1 | 9/2014 | Ganong, III et al. |
| 2014/0274218 A1 | 9/2014 | Kadiwala et al. |
| 2014/0277650 A1 | 9/2014 | Zurek et al. |
| 2014/0291642 A1 | 10/2014 | Watabe et al. |
| 2014/0340888 A1 | 11/2014 | Ishisone et al. |
| 2014/0363022 A1 | 12/2014 | Dizon et al. |
| 2014/0369491 A1 | 12/2014 | Kloberdans et al. |
| 2014/0372109 A1 | 12/2014 | Iyer et al. |
| 2015/0006176 A1 | 1/2015 | Pogue et al. |
| 2015/0010169 A1 | 1/2015 | Popova et al. |
| 2015/0014680 A1 | 1/2015 | Yamazaki et al. |
| 2015/0016642 A1 | 1/2015 | Walsh et al. |
| 2015/0036831 A1 | 2/2015 | Klippel |
| 2015/0063580 A1 | 3/2015 | Huang et al. |
| 2015/0086034 A1* | 3/2015 | Lombardi ............ H04L 12/2838 381/81 |
| 2015/0104037 A1 | 4/2015 | Lee et al. |
| 2015/0106085 A1 | 4/2015 | Lindahl |
| 2015/0110294 A1 | 4/2015 | Chen et al. |
| 2015/0112672 A1 | 4/2015 | Giacobello et al. |
| 2015/0154976 A1 | 6/2015 | Mutagi |
| 2015/0169279 A1 | 6/2015 | Duga |
| 2015/0170645 A1 | 6/2015 | Di Censo et al. |
| 2015/0180432 A1 | 6/2015 | Gao et al. |
| 2015/0181318 A1 | 6/2015 | Gautama et al. |
| 2015/0189438 A1 | 7/2015 | Hampiholi et al. |
| 2015/0200454 A1 | 7/2015 | Heusdens et al. |
| 2015/0221678 A1 | 8/2015 | Yamazaki et al. |
| 2015/0222987 A1 | 8/2015 | Angel, Jr. et al. |
| 2015/0228274 A1 | 8/2015 | Leppänen et al. |
| 2015/0228803 A1 | 8/2015 | Koezuka et al. |
| 2015/0237406 A1 | 8/2015 | Ochoa et al. |
| 2015/0249889 A1 | 9/2015 | Iyer et al. |
| 2015/0253292 A1 | 9/2015 | Larkin et al. |
| 2015/0253960 A1 | 9/2015 | Lin et al. |
| 2015/0263174 A1 | 9/2015 | Yamazaki et al. |
| 2015/0271593 A1 | 9/2015 | Sun et al. |
| 2015/0280676 A1 | 10/2015 | Holman et al. |
| 2015/0296299 A1 | 10/2015 | Klippel et al. |
| 2015/0302856 A1 | 10/2015 | Kim et al. |
| 2015/0319529 A1 | 11/2015 | Klippel |
| 2015/0338917 A1 | 11/2015 | Steiner et al. |
| 2015/0341406 A1 | 11/2015 | Rockefeller et al. |
| 2015/0346845 A1 | 12/2015 | Di Censo et al. |
| 2015/0363061 A1 | 12/2015 | De Nigris, III et al. |
| 2015/0363401 A1 | 12/2015 | Chen et al. |
| 2015/0371657 A1 | 12/2015 | Gao et al. |
| 2015/0380010 A1 | 12/2015 | Srinivasan |
| 2016/0007116 A1 | 1/2016 | Holman |
| 2016/0021458 A1 | 1/2016 | Johnson et al. |
| 2016/0029142 A1 | 1/2016 | Isaac et al. |
| 2016/0035321 A1 | 2/2016 | Cho et al. |
| 2016/0036962 A1 | 2/2016 | Rand et al. |
| 2016/0042748 A1 | 2/2016 | Jain et al. |
| 2016/0044151 A1 | 2/2016 | Shoemaker et al. |
| 2016/0057522 A1 | 2/2016 | Choisel et al. |
| 2016/0077710 A1 | 3/2016 | Lewis et al. |
| 2016/0088036 A1 | 3/2016 | Corbin et al. |
| 2016/0088392 A1 | 3/2016 | Huttunen et al. |
| 2016/0093304 A1 | 3/2016 | Kim et al. |
| 2016/0094917 A1 | 3/2016 | Wilk et al. |
| 2016/0098393 A1 | 4/2016 | Hebert |
| 2016/0103653 A1 | 4/2016 | Jang |
| 2016/0111110 A1 | 4/2016 | Gautama et al. |
| 2016/0134982 A1 | 5/2016 | Iyer |
| 2016/0155443 A1 | 6/2016 | Khan et al. |
| 2016/0157035 A1 | 6/2016 | Russell et al. |
| 2016/0173578 A1 | 6/2016 | Sharma et al. |
| 2016/0173983 A1 | 6/2016 | Berthelsen et al. |
| 2016/0180853 A1 | 6/2016 | Vanlund et al. |
| 2016/0189716 A1 | 6/2016 | Lindahl et al. |
| 2016/0212538 A1 | 7/2016 | Fullam et al. |
| 2016/0225385 A1 | 8/2016 | Hammarqvist |
| 2016/0232451 A1 | 8/2016 | Scherzer |
| 2016/0234204 A1 | 8/2016 | Rishi et al. |
| 2016/0239255 A1 | 8/2016 | Chavez et al. |
| 2016/0260431 A1 | 9/2016 | Newendorp et al. |
| 2016/0302018 A1 | 10/2016 | Russell et al. |
| 2016/0314782 A1 | 10/2016 | Klimanis |
| 2016/0336519 A1 | 11/2016 | Seo et al. |
| 2016/0343866 A1 | 11/2016 | Koezuka et al. |
| 2016/0343949 A1 | 11/2016 | Seo et al. |
| 2016/0343954 A1 | 11/2016 | Seo et al. |
| 2016/0345114 A1 | 11/2016 | Hanna et al. |
| 2016/0352915 A1 | 12/2016 | Gautama |
| 2016/0353218 A1 | 12/2016 | Starobin et al. |
| 2016/0366515 A1 | 12/2016 | Mendes et al. |
| 2016/0372688 A1 | 12/2016 | Seo et al. |
| 2016/0373269 A1 | 12/2016 | Okubo et al. |
| 2017/0003931 A1 | 1/2017 | Dvortsov et al. |
| 2017/0012207 A1 | 1/2017 | Seo et al. |
| 2017/0012232 A1 | 1/2017 | Kataishi et al. |
| 2017/0019732 A1 | 1/2017 | Mendes et al. |
| 2017/0025615 A1 | 1/2017 | Seo et al. |
| 2017/0025630 A1 | 1/2017 | Seo et al. |
| 2017/0026769 A1 | 1/2017 | Patel |
| 2017/0039025 A1 | 2/2017 | Kielak |
| 2017/0060526 A1 | 3/2017 | Barton et al. |
| 2017/0062734 A1 | 3/2017 | Suzuki et al. |
| 2017/0070478 A1 | 3/2017 | Park et al. |
| 2017/0076720 A1 | 3/2017 | Gopalan et al. |
| 2017/0078824 A1 | 3/2017 | Heo |
| 2017/0083285 A1 | 3/2017 | Meyers et al. |
| 2017/0084292 A1 | 3/2017 | Yoo |
| 2017/0090864 A1 | 3/2017 | Jorgovanovic |
| 2017/0092278 A1 | 3/2017 | Evermann et al. |
| 2017/0092297 A1 | 3/2017 | Sainath et al. |
| 2017/0092889 A1 | 3/2017 | Seo et al. |
| 2017/0092890 A1 | 3/2017 | Seo et al. |
| 2017/0103755 A1 | 4/2017 | Jeon et al. |
| 2017/0110144 A1 | 4/2017 | Sharifi et al. |
| 2017/0117497 A1 | 4/2017 | Seo et al. |
| 2017/0123251 A1 | 5/2017 | Nakada et al. |
| 2017/0125037 A1 | 5/2017 | Shin |
| 2017/0125456 A1 | 5/2017 | Kasahara |
| 2017/0140748 A1 | 5/2017 | Roberts et al. |
| 2017/0140759 A1 | 5/2017 | Kumar et al. |
| 2017/0177585 A1 | 6/2017 | Rodger et al. |
| 2017/0178662 A1 | 6/2017 | Ayrapetian et al. |
| 2017/0188150 A1 | 6/2017 | Brunet et al. |
| 2017/0193999 A1 | 7/2017 | Aleksic et al. |
| 2017/0206896 A1 | 7/2017 | Ko et al. |
| 2017/0214996 A1 | 7/2017 | Yeo |

(56) References Cited

U.S. PATENT DOCUMENTS

| | | | |
|---|---|---|---|
| 2017/0236512 A1* | 8/2017 | Williams | G06F 16/68 381/79 |
| 2017/0242651 A1 | 8/2017 | Lang et al. | |
| 2017/0242653 A1 | 8/2017 | Lang et al. | |
| 2017/0243576 A1 | 8/2017 | Millington et al. | |
| 2017/0243587 A1 | 8/2017 | Plagge et al. | |
| 2017/0245076 A1 | 8/2017 | Kusano et al. | |
| 2017/0257686 A1 | 9/2017 | Gautama et al. | |
| 2017/0270919 A1 | 9/2017 | Parthasarathi et al. | |
| 2017/0287485 A1 | 10/2017 | Civelli et al. | |
| 2017/0353789 A1 | 12/2017 | Kim et al. | |
| 2018/0033428 A1 | 2/2018 | Kim et al. | |
| 2018/0040324 A1 | 2/2018 | Wilberding | |
| 2018/0047394 A1 | 2/2018 | Tian et al. | |
| 2018/0062871 A1 | 3/2018 | Jones et al. | |
| 2018/0091913 A1 | 3/2018 | Hartung et al. | |
| 2018/0130469 A1 | 5/2018 | Gruenstein et al. | |
| 2018/0137861 A1 | 5/2018 | Ogawa et al. | |
| 2018/0233136 A1 | 8/2018 | Torok et al. | |
| 2019/0043492 A1 | 2/2019 | Lang | |
| 2019/0074025 A1 | 3/2019 | Lashkari et al. | |
| 2019/0079721 A1 | 3/2019 | Vega et al. | |
| 2019/0098400 A1 | 3/2019 | Buoni et al. | |

FOREIGN PATENT DOCUMENTS

| | | |
|---|---|---|
| CN | 103546616 A | 1/2014 |
| CN | 105284076 A | 1/2016 |
| EP | 1349146 A1 | 10/2003 |
| EP | 1389853 A1 | 2/2004 |
| EP | 2683147 A1 | 1/2014 |
| EP | 2351021 B1 | 9/2017 |
| JP | 2001236093 A | 8/2001 |
| JP | 2004347943 A | 12/2004 |
| JP | 2004354721 A | 12/2004 |
| JP | 2005284492 A | 10/2005 |
| JP | 2008079256 A | 4/2008 |
| JP | 2008158868 A | 7/2008 |
| JP | 2010141748 A | 6/2010 |
| JP | 2013037148 A | 2/2013 |
| JP | 2014071138 A | 4/2014 |
| JP | 2014137590 A | 7/2014 |
| KR | 20100111071 A | 10/2010 |
| WO | 200153994 | 7/2001 |
| WO | 2003093950 A2 | 11/2003 |
| WO | 2015037396 A1 | 3/2015 |
| WO | 2015178950 A1 | 11/2015 |
| WO | 2016014142 A1 | 1/2016 |
| WO | 2016022926 A1 | 2/2016 |
| WO | 2016033364 A1 | 3/2016 |
| WO | 2016057268 A1 | 4/2016 |
| WO | 2017039632 A1 | 3/2017 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Corrected Notice of Allowability dated Mar. 8, 2017, issued in connection with U.S. Appl. No. 15/229,855, filed Aug. 5, 2016, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Oct. 30, 2017, issued in connection with EP Application No. 17174435.2, 11 pages.
Final Office Action dated Oct. 6, 2017, issued in connection with U.S. Appl. No. 15/098,760, filed Apr. 14, 2016, 25 pages.
Final Office Action dated Aug. 11, 2017, issued in connection with U.S. Appl. No. 15/131,776, filed Apr. 18, 2016, 7 pages.
Final Office Action dated Jun. 15, 2017, issued in connection with U.S. Appl. No. 15/098,718, filed Apr. 14, 2016, 15 pages.
Fiorenza Arisio et al. "Deliverable 1.1 User Study, analysis of requirements and definition of application task," May 31, 2012, http://dirha.fbk.eu/sites/dirha.fdk.eu/files/docs/DIRHA_D1.1., 31 pages.
Freiberger, Karl, "Development and Evaluation of Source Localization Algorithms for Coincident Microphone Arrays," Diploma Thesis, Apr. 1, 2010, 106 pages.
International Searching Authority, International Search Report and Written Opinion dated Nov. 22, 2017, issued in connection with International Application No. PCT/US2017/054063, filed on Sep. 28, 2017, 11 pages.
International Searching Authority, International Search Report and Written Opinion dated May 23, 2017, issued in connection with International Application No. PCT/US2017/018739, Filed on Feb. 21, 2017, 10 pages.
International Searching Authority, International Search Report and Written Opinion dated Oct. 23, 2017, issued in connection with International Application No. PCT/US2017/042170, filed on Jul. 14, 2017, 15 pages.
International Searching Authority, International Search Report and Written Opinion dated Oct. 24, 2017, issued in connection with International Application No. PCT/US2017/042227, filed on Jul. 14, 2017, 16 pages.
International Searching Authority, International Search Report and Written Opinion dated May 30, 2017, issued in connection with International Application No. PCT/US2017/018728, Filed on Feb. 21, 2017, 11 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Morales-Cordovilla et al. "Room Localization for Distant Speech Recognition," Proceedings of Interspeech 2014, Sep. 14, 2014, 4 pages.
Non-Final Office Action dated Jun. 1, 2017, issued in connection with U.S. Appl. No. 15/223,218, filed Jul. 29, 2016, 7 pages.
Non-Final Office Action dated Nov. 2, 2017, issued in connection with U.S. Appl. No. 15/584,782, filed May 2, 2017, 11 pages.
Non-Final Office Action dated Nov. 3, 2017, issued in connection with U.S. Appl. No. 15/438,741, filed Feb. 21, 2017, 11 pages.
Non-Final Office Action dated Feb. 7, 2017, issued in connection with U.S. Appl. No. 15/131,244, filed Apr. 18, 2016, 12 pages.
Non-Final Office Action dated Feb. 8, 2017, issued in connection with U.S. Appl. No. 15/098,892, filed Apr. 14, 2016, 17 pages.
Non-Final Office Action dated Mar. 9, 2017, issued in connection with U.S. Appl. No. 15/098,760, filed Apr. 14, 2016, 13 pages.
Final Office Action dated Apr. 13, 2018, issued in connection with U.S. Appl. No. 15/131,254, filed Apr. 18, 2016, 18 pages.
Non-Final Office Action dated Mar. 16, 2018, issued in connection with U.S. Appl. No. 15/681,937, filed Aug. 21, 2017, 5 pages.
Non-Final Office Action dated Apr. 18, 2018, issued in connection with U.S. Appl. No. 15/811,468, filed Nov. 13, 2017, 14 pages.
Non-Final Office Action dated Feb. 20, 2018, issued in connection with U.S. Appl. No. 15/211,748, filed Jul. 15, 2016, 31 pages.
Non-Final Office Action dated Feb. 6, 2018, issued in connection with U.S. Appl. No. 15/211,689, filed Jul. 15, 2016, 32 pages.
Non-Final Office Action dated Feb. 6, 2018, issued in connection with U.S. Appl. No. 15/237,133, filed Aug. 15, 2016, 6 pages.
Non-Final Office Action dated Apr. 9, 2018, issued in connection with U.S. Appl. No. 15/804,776, filed Nov. 6, 2017, 18 pages.
Notice of Allowance dated Apr. 11, 2018, issued in connection with U.S. Appl. No. 15/719,454, filed Sep. 28, 2017, 15 pages.

(56) References Cited

OTHER PUBLICATIONS

Notice of Allowance dated Mar. 20, 2018, issued in connection with U.S. Appl. No. 15/784,952, filed Oct. 16, 2017, 7 pages.
Notice of Allowance dated Mar. 9, 2018, issued in connection with U.S. Appl. No. 15/584,782, filed May 2, 2017, 8 pages.
Notice of Allowance dated Aug. 17, 2017, issued in connection with U.S. Appl. No. 15/131,244, filed Apr. 18, 2016, 9 pages.
Notice of Allowance dated Aug. 22, 2017, issued in connection with U.S. Appl. No. 15/273,679, filed Sep. 22, 2016, 5 pages.
Notice of Allowance dated Jan. 22, 2018, issued in connection with U.S. Appl. No. 15/178,180, filed Jun. 9, 2016, 9 pages.
Notice of Allowance dated Dec. 29, 2017, issued in connection with U.S. Appl. No. 15/131,776, filed Apr. 18, 2016, 13 pages.
Palm, Inc., "Handbook for the Palm VII Handheld," May 2000, 311 pages.
Presentations at WinHEC 2000, May 2000, 138 pages.
Tsiami et al. "Experiments in acoustic source localization using sparse arrays in adverse indoors environments", 2014 22nd European Signal Processing Conference, Sep. 1, 2014, 5 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Notice of Allowance dated Aug. 16, 2017, issued in connection with U.S. Appl. No. 15/098,892, filed Apr. 14, 2016, 9 pages.
Notice of Allowance dated Dec. 15, 2017, issued in connection with U.S. Appl. No. 15/223,218, filed Jul. 29, 2016, 7 pages.
Notice of Allowance dated Jun. 14, 2017, issued in connection with U.S. Appl. No. 15/282,554, filed Sep. 30, 2016, 11 pages.
Notice of Allowance dated Feb. 14, 2017, issued in connection with U.S. Appl. No. 15/229,855, filed Aug. 5, 2016, 11 pages.
Notice of Allowance dated Aug. 14, 2017, issued in connection with U.S. Appl. No. 15/098,867, filed Apr. 14, 2016, 10 pages.
Notice of Allowance dated Dec. 13, 2017, issued in connection with U.S. Appl. No. 15/784,952, filed Oct. 16, 2017, 9 pages.
Notice of Allowance dated Jul. 12, 2017, issued in connection with U.S. Appl. No. 15/098,805, filed Apr. 14, 2016, 8 pages.
Notice of Allowance dated Dec. 4, 2017, issued in connection with U.S. Appl. No. 15/277,810, filed Sep. 27, 2016, 5 pages.
Non-Final Office Action dated Sep. 6, 2017, issued in connection with U.S. Appl. No. 15/131,254, filed Apr. 18, 2016, 13 pages.
Non-Final Office Action dated Jun. 30, 2017, issued in connection with U.S. Appl. No. 15/277,810, filed Sep. 27, 2016, 13 pages.
Non-Final Office Action dated Oct. 26, 2017, issued in connection with U.S. Appl. No. 15/438,744, filed Feb. 21, 2017, 12 pages.
Non-Final Office Action dated Jan. 26, 2017, issued in connection with U.S. Appl. No. 15/098,867, filed Apr. 14, 2016, 16 pages.
Non-Final Office Action dated Jul. 25, 2017, issued in connection with U.S. Appl. No. 15/273,679, filed Jul. 22, 2016, 11 pages.
Non-Final Office Action dated Apr. 19, 2017, issued in connnection with U.S. Appl. No. 15/131,776, filed Apr. 18, 2016, 12 pages.
Non-Final Office Action dated Sep. 14, 2017, issued in connection with U.S. Appl. No. 15/178,180, filed Jun. 9, 2016, 16 pages.
Non-Final Office Action dated Jan. 13, 2017, issued in connection with U.S. Appl. No. 15/098,805, filed Apr. 14, 2016, 11 pages.
Non-Final Office Action dated Dec. 12, 2016, issued in connection with U.S. Appl. No. 15/098,718, filed Apr. 14, 2016, 11 pages.
Non-Final Office Action dated Jan. 10, 2018, issued in connection with U.S. Appl. No. 15/438,725, filed Feb. 21, 2017, 15 pages.
Non-Final Office Action dated Jan. 10, 2018, issued in connection with U.S. Appl. No. 15/229,868, filed Aug. 5, 2016, 13 pages.
Non-Final Office Action dated Jan. 10, 2018, issued in connection with U.S. Appl. No. 15/098,718, filed Apr. 14, 2016, 15 pages.
Advisory Action dated Jun. 28, 2018, issued in connection with U.S. Appl. No. 15/438,744, filed Feb. 21, 2017, 3 pages.
"Automatic Parameter Tying in Neural Networks" ICLR 2018, 14 pages.
Final Office Action dated Apr. 13, 2018, issued in connection with U.S. Appl. No. 15/438,744, filed Feb. 21, 2017, 20 pages.
Final Office Action dated Oct. 15, 2018, issued in connection with U.S. Appl. No. 15/804,776, filed Nov. 6, 2017, 18 pages.
Final Office Action dated Oct. 16, 2018, issued in connection with U.S. Appl. No. 15/438,725, filed Feb. 21, 2017, 10 pages.
Final Office Action dated Feb. 21, 2018, issued in connection with U.S. Appl. No. 15/297,627, filed Oct. 19, 2016, 12 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.
Giacobello et al. "Tuning Methodology for Speech Enhancement Algorithms using a Simulated Conversational Database and Perceptual Objective Measures," 2014, 4th Joint Workshop on Hands-free Speech Communication and Microphone Arrays HSCMA, 2014, 5 pages.
Han et al. "Deep Compression: Compressing Deep Neural Networks with Pruning, Trained Quantization and Huffman Coding." ICLR 2016, Feb. 15, 2016, 14 pages.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
International Bureau, International Preliminary Report on Patentability, dated Sep. 7, 2018, issued in connection with International Application No. PCT/US2017/018728, filed on Feb. 21, 2017, 8 pages.
International Bureau, International Preliminary Report on Patentability, dated Sep. 7, 2018, issued in connection with International Application No. PCT/US2017/018739, filed on Feb. 21, 2017, 7 pages.
International Searching Authority, International Search Report and Written Opinion dated Jan. 23, 2018, issued in connection with International Application No. PCT/US2017/57220, filed on Oct. 18, 2017, 8 pages.
Jose Alvarez and Mathieu Salzmann "Compression-aware Training of Deep Networks" 31st Conference on Neural Information Processing Systems, Nov. 13, 2017, 12pages.
Maja Taseska and Emanual A.P. Habets, "MMSE-Based Blind Source Extraction in Diffuse Noise Fields Using a Complex Coherence-Based a Priori Sap Estimator." International Workshop on Acoustic Signal Enhancement 2012, Sep. 4-6, 2012, 4pages.
Ngo et al. "Incorporating the Conditional Speech Presence Probability in Multi-Channel Wiener Filter Based Noise Reduction in Hearing Aids" EURASIP Journal on Advances in Signal Processing vol. 2009, Jun. 2, 2009, 11 pages.
Non-Final Office Action dated Sep. 10, 2018, issued in connection with U.S. Appl. No. 15/670,361, filed Aug. 7, 2017, 17 pages.
Non-Final Office Action dated Nov. 13, 2018, issued in connection with U.S. Appl. No. 15/717,621, filed Sep. 27, 2017, 23 pages.
Non-Final Office Action dated Sep. 14, 2018, issued in connection with U.S. Appl. No. 15/959,907, filed Apr. 23, 2018, 15 pages.
Non-Final Office Action dated Oct. 16, 2018, issued in connection with U.S. Appl. No. 15/131,254, filed Apr. 18, 2016, 16 pages.
Non-Final Office Action dated May 22, 2018, issued in connection with U.S. Appl. No. 15/946,599, filed Apr. 5, 2018, 19 pages.
Non-Final Office Action dated Aug. 24, 2017, issued in connection with U.S. Appl. No. 15/297,627, filed Oct. 19, 2016, 13 pages.

(56) References Cited

OTHER PUBLICATIONS

Non-Final Office Action dated Sep. 6, 2018, issued in connection with U.S. Appl. No. 15/098,760, filed Apr. 14, 2016, 29 pages.
Non-Final Office Action dated May 9, 2018, issued in connection with U.S. Appl. No. 15/818,051, filed Nov. 20, 2017, 22 pages.
Notice of Allowance dated Jul. 5, 2018, issued in connection with U.S. Appl. No. 15/237,133, filed Aug. 15, 2016, 5 pages.
Notice of Allowance dated Jul. 9, 2018, issued in connection with U.S. Appl. No. 15/438,741, filed Feb. 21, 2017, 5 pages.
Notice of Allowance dated Aug. 1, 2018, issued in connection with U.S. Appl. No. 15/297,627, filed Oct. 19, 2016, 9 pages.
Notice of Allowance dated Sep. 12, 2018, issued in connection with U.S. Appl. No. 15/438,744, filed Feb. 21, 2017, 15 pages.
Notice of Allowance dated Nov. 14, 2018, issued in connection with U.S. Appl. No. 15/297,627, filed Oct. 19, 2016, 5 pages.
Notice of Allowance dated Sep. 17, 2018, issued in connection with U.S. Appl. No. 15/211,689, filed Jul. 15, 2016, 6 pages.
Notice of Allowance dated Jul. 19, 2018, issued in connection with U.S. Appl. No. 15/681,937, filed Aug. 21, 2017, 7 pages.
Notice of Allowance dated Sep. 20, 2018, issued in connection with U.S. Appl. No. 15/946,599, filed Apr. 5, 2018, 7 pages.
Notice of Allowance dated Jul. 30, 2018, issued in connection with U.S. Appl. No. 15/098,718, filed Apr. 14, 2016, 5 pages.
Notice of Allowance dated Oct. 5, 2018, issued in connection with U.S. Appl. No. 15/211,748, filed Jul. 15, 2018, 10 pages.
Notice of Allowance dated Aug. 9, 2018, issued in connection with U.S. Appl. No. 15/229,868, filed Aug. 5, 2016, 11 pages.
Restriction Requirement dated Aug. 9, 2018, issued in connection with U.S. Appl. No. 15/717,621, filed Sep. 27, 2017, 8 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6pages.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
Steven J. Nowlan and Geoffrey E. Hinton "Simplifying Neural Networks by Soft Weight-Sharing" Neural Computation 4, 1992, 21 pages.
Ullrich et al. "Soft Weight-Sharing for Neural Network Compression." ICLR 2017, 16 pages.
Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.
Advisory Action dated Dec. 31, 2018, issued in connection with U.S. Appl. No. 15/804,776, filed Nov. 6, 2017, 4 pages.
Australian Patent Office, Examination Report dated Oct. 30, 2018, issued in connection with Australian Application No. 2017222436, 3 pages.
Canadian Patent Office, Canadian Office Action dated Nov. 14, 2018, issued in connection with Canadian Application No. 3015491, 3 pages.
Chinese Patent Office, First Office Action and Translation dated Mar. 20, 2019, issued in connection with Chinese Application No. 201780025028.2, 18 pages.
Chinese Patent Office, First Office Action and Translation dated Mar. 27, 2019, issued in connection with Chinese Application No. 201780025029.7, 9 pages.
European Patent Office, European Extended Search Report dated Jan. 3, 2019, issued in connection European Application No. 177570702, 8 pages.
European Patent Office, European Extended Search Report dated Jan. 3, 2019, issued in connection European Application No. 17757075.1, 9 pages.
European Patent Office, European Office Action dated Jan. 22, 2019, issued in connection with European Application No. 17174435.2, 9 pages.
Final Office Action dated Apr. 11, 2019, issued in connection with U.S. Appl. No. 15/131,254, filed Apr. 2016, 17 pages.
Final Office Action dated Apr. 26, 2019, issued in connection with U.S. Appl. No. 15/721,141, filed Sep. 29, 2017, 20 pages.
Final Office Action dated Apr. 30, 2019, issued in connection with U.S. Appl. No. 15/098,760, filed Apr. 14, 2016, 6 pages.
Helwani et al "Source-domain adaptive filtering for MIMO systems with application to acoustic echo cancellation", Acoustics Speech and Signal Processing, 2010 IEEE International Conference, Mar. 14, 2010, 4 pages.
International Bureau, International Preliminary Report on Patentability, dated Apr. 11, 2019, issued in connection with International Application No. PCT/US2017/0054063, filed on Sep. 28, 2017, 9 pages.
International Bureau, International Preliminary Report on Patentability, dated Apr. 23, 2019, issued in connection with International Application No. PCT/US2017/057220, filed on Oct. 18, 2017, 7 pages.
International Searching Authority, International Search Report and Written Opinion dated Dec. 19, 2018, in connection with International Application No. PCT/US2018/053517, 13 pages.
Korean Patent Office, Korean Office Action dated May 8, 2019, issued in connection with Korean Application No. 10-2018-7027451, 7 pages.
Korean Patent Office, Korean Office Action dated May 8, 2019, issued in connection with Korean Application No. 10-2018-7027452, 5 pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 1 page.
Non-Final Office Action dated Feb. 12, 2019, issued in connection with U.S. Appl. No. 15/670,361, filed Aug. 7, 2017, 13 pages.
Non-Final Office Action dated Nov. 13, 2018, issued in connection with U.S. Appl. No. 16/160,107, filed Oct. 15, 2018, 8 pages.
Non-Final Office Action dated Jan. 15, 2019, issued in connection with U.S. Appl. No. 16/173,797, filed Oct. 29, 2018, 6 pages.
Non-Final Office Action dated Jan. 18, 2019, issued in connection with U.S. Appl. No. 15/721,141, filed Sep. 29, 2017, 18 pages.
Non-Final Office Action dated Feb. 21, 2019, issued in connection with U.S. Appl. No. 16/214,666, filed Dec. 10, 2018, 12 pages.
Non-Final Office Action dated May 23, 2019, issued in connection with U.S. Appl. No. 16/154,071, filed Oct. 8, 2018, 36 pages.
Non-Final Office Action dated Dec. 26, 2018, issued in connection with U.S. Appl. No. 16/154,469, filed Oct. 8, 2018, 7 pages.
Non-Final Office Action dated Mar. 29, 2019, issued in connection with U.S. Appl. No. 16/102,650, filed Aug. 13, 2018, 11 pages.
Non-Final Office Action dated May 3, 2019, issued in connection with U.S. Appl. No. 16/178,122, filed Nov. 1, 2018, 14 pages.
Non-Final Office Action dated Oct. 3, 2018, issued in connection with U.S. Appl. No. 16/102,153, filed Aug. 13, 2018, 20 pages.
Non-Final Office Action dated Apr. 30, 2019, issued in connection with U.S. Appl. No. 15/718,521, filed Sep. 28, 2017, 39 pages.
Non-Final Office Action dated Apr. 4, 2019, issued in connection with U.S. Appl. No. 15/718,911, filed Sep. 28, 2017, 21 pages.
Non-Final Office Action dated Jan. 4, 2019, issued in connection with U.S. Appl. No. 15/948,541, filed Apr. 9, 2018, 6 pages.
Notice of Allowance dated Apr. 1, 2019, issued in connection with U.S. Appl. No. 15/935,966, filed Mar. 26, 2018, 5 pages.
Notice of Allowance dated Dec. 12, 2018, issued in connection with U.S. Appl. No. 15/811,468, filed Nov. 13, 2017, 9 pages.
Notice of Allowance dated Jun. 12, 2019, issued in connection with U.S. Appl. No. 15/670,361, filed Aug. 7, 2017, 7 pages.
Notice of Allowance dated Feb. 13, 2019, issued in connection with U.S. Appl. No. 15/959,907, filed Apr. 23, 2018, 10 pages.
Notice of Allowance dated Mar. 15, 2019, issued in connection with U.S. Appl. No. 15/804,776, filed Nov. 6, 2017, 9 pages.
Notice of Allowance dated Apr. 18, 2019, issued in connection with U.S. Appl. No. 16/173,797, filed Oct. 29, 2018, 9 pages.

(56) References Cited

OTHER PUBLICATIONS

Notice of Allowance dated Dec. 19, 2018, issued in connection with U.S. Appl. No. 15/818,051, filed Nov. 20, 2017, 9 pages.
Notice of Allowance dated Apr. 24, 2019, issued in connection with U.S. Appl. No. 16/154,469, filed Oct. 8, 2018, 5 pages.
Notice of Allowance dated Mar. 27, 2019, issued in connection with U.S. Appl. No. 16/214,666, filed Dec. 10, 2018, 6 pages.
Notice of Allowance dated Mar. 28, 2018, issued in connection with U.S. Appl. No. 15/699,982, filed Sep. 8, 2017, 17 pages.
Notice of Allowance dated Apr. 3, 2019, issued in connection with U.S. Appl. No. 16/160,107, filed Oct. 15, 2018, 7 pages.
Notice of Allowance dated Nov. 30, 2018, issued in connection U.S. Appl. No. 15/438,725, filed Feb. 21, 2017, 5 pages.
Notice of Allowance dated May 31, 2019, issued in connection with U.S. Appl. No. 15/717,621, filed Sep. 27, 2017, 9 pages.
Notice of Allowance dated Feb. 6, 2019, issued in connection with U.S. Appl. No. 16/102,153, filed Aug. 13, 2018, 9 pages.
Notice of Allowance dated Jun. 7, 2019, issued in connection with U.S. Appl. No. 16/102,153, filed Aug. 13, 2018, 9 pages.
Tweet: "How to start using Google app voice commands to make your life easier Share This Story shop @Bullet", Jan. 21, 2016, https://bgr.com/2016/01/21/best-ok-google-voice-commands/, 3 page.
Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.

\* cited by examiner

VOICE CONTROL OF A MEDIA PLAYBACK SYSTEM

CROSS-REFERENCE TO RELATED APPLICATIONS

This application claims priority to: (i) App. No. 62/298,410, titled "Default Playback Device(s)," filed Feb. 22, 2016; (ii) App. No. 62/298,418, titled "Audio Response Playback," filed Feb. 22, 2016; (iii) App. No. 62/298,433, titled "Room-corrected Voice Detection," filed Feb. 22, 2016; (iv) App. No. 62/298,439, titled "Content Mixing," filed Feb. 22, 2016; (v) App. No. 62/298,425, titled "Music Service Section," filed Feb. 22, 2016; (vi) App. No. 62/298,350, titled "Metadata exchange involving a networked playback system and a networked microphone system," filed Feb. 22, 2016; (vii) App. No. 62/298,388, titled "Handling of loss of pairing between networked devices," filed Feb. 22, 2016; (viii) App. No. 62/298,393, titled "Action based on User ID," filed Feb. 22, 2016; (ix) App. No. 62/132,350, titled "Voice Control of a Media Playback System," filed Feb. 22, 2016. The entire contents of the 62/298,410; 62/298,418; 62/298,433; 62/298,439; 62/298,425; 62/298,350; 62/298,388; 62/298,393; and 62/132,350 applications are incorporated herein by reference for all purposes.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
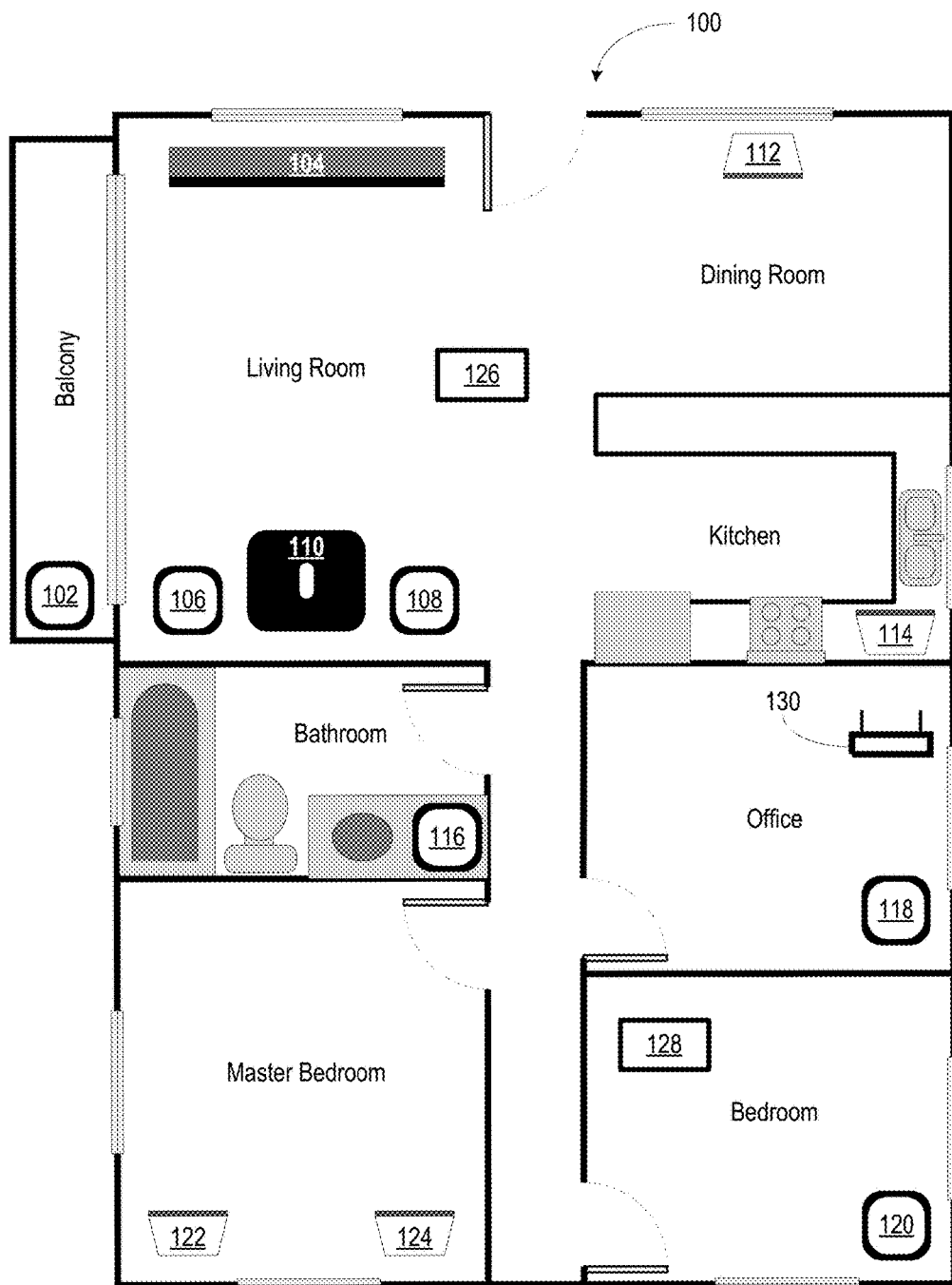
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Multiple aspects of systems and methods for voice control and related features and functionality for media playback devices, networked microphone devices, microphone-equipped media playback devices, and speaker-equipped networked microphone devices are disclosed and described herein, including but not limited to designating and managing default networked devices, audio response playback, room-corrected voice detection, content mixing, music service selection, metadata exchange between networked playback systems and networked microphone systems, handling loss of pairing between networked devices, actions based on user identification, and other voice control networked devices.

Any or all components, aspects, features, and/or functionality of any embodiment or example disclosed herein can be combined and/or implemented with any or all components, aspects, features, and/or functionality of any other disclosed embodiment, to the extent such features are not clearly mutually exclusive.

Some embodiments include receiving, via a networked microphone device associated with a media playback system, a voice command, wherein the media playback system comprises one or more zones; determining, via the networked microphone device, an audio response zone that is closest to a user, wherein the determined audio response zone comprises one or more playback devices; selecting, via the networked microphone device, the determined audio response zone to play the audio response; and causing, via the networked microphone device, at least one playback device of the one or more playback devices of the selected audio response zone to play the audio response.

In some embodiments, the received voice command comprises: a command word, one or more media variable instances, and one or more zone variable instances.

In some embodiments, the at least one playback device comprises a fallback device. Such embodiments further include before causing the at least one playback device to play the audio response, determining, via the networked microphone device, that another playback device is not available to play the audio response.

Some embodiments additionally include determining, via the networked microphone device, the audio response zone comprises causing, via the networked microphone device, a computing device to determine the audio response zone, and wherein selecting, via the networked microphone device, the determined audio response zone comprises causing, via the networked microphone device, the computing device to select the determined audio response zone, and wherein causing, via the networked microphone device, at least one playback device of the one or more playback devices of the selected audio response zone to play the audio response comprises causing, via the networked microphone device and the computing device, the at least one playback device of the one or more playback devices of the selected audio response zone to play the audio response.

Some embodiments additionally or alternatively include receiving, via the networked microphone device from a controller device, an indication of a particular zone to which the networked microphone device is assigned.

Still further embodiments additionally or alternatively include sending, via the networked microphone device to the computing device, an indication of a particular zone to which the networked microphone device is assigned.

Some embodiments additionally or alternatively include applying, via the networked microphone device, acoustics of an environment in which the networked microphone device is placed to the received voice command.

Further embodiments additionally or alternatively include causing, via the networked microphone device, the at least one playback device to adjust a volume of audio content to a volume level that is below a volume level of the audio response.

Some embodiments additionally or alternatively include receiving, via the networked microphone device, an indication of audio content; determining, via the networked microphone device, at least one music service from a plurality of music services that supports the audio content; and causing, via the networked microphone device, the at least one music service to transmit the audio content to the at least one playback device.

Some embodiments additionally or alternatively include establishing, via the networked microphone device, a metadata exchange channel between the media playback system and the networked microphone device.

Some embodiments additionally or alternatively include determining, via the networked microphone device, that the received voice command was received from a registered user of the media playback system; and in response to determining that the received voice command was received from the registered user of the media playback system, configuring, via the networked microphone device, an instruction for the media playback system based on content from the voice command and information in a user profile for the registered user.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
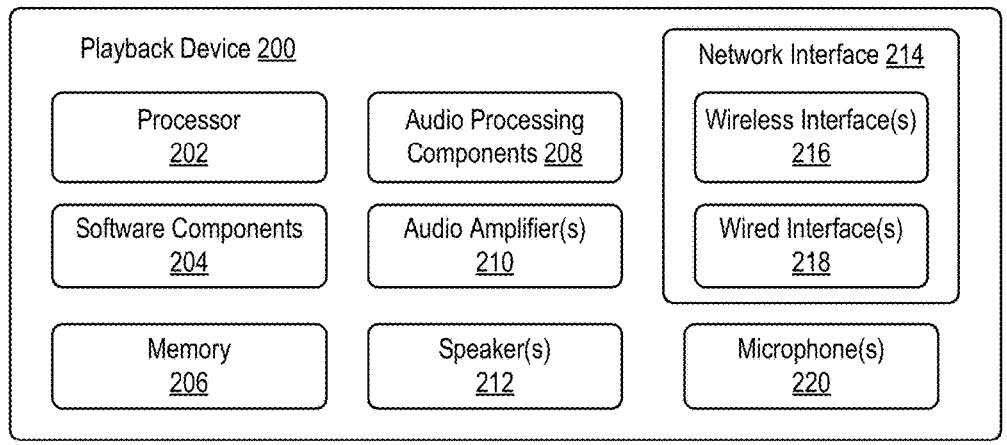
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include one or more processors 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the one or more processors 202 may be one or more clock-driven computing components configured to process input data according to instructions stored in the memory 206. The memory 206 may be a tangible computer-readable medium configured to store instructions executable by the one or more processors 202. For instance, the memory 206 may be data storage that can be loaded with one or more of the software components 204 executable by the one or more processors 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the one or more processors 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. The playback device 200 may transmit metadata to and/or receive metadata from other devices on the network, including but not limited to components of the networked microphone system disclosed and described herein. In one example, the audio content and other signals (e.g., metadata and other signals) transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render (e.g., play back) audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
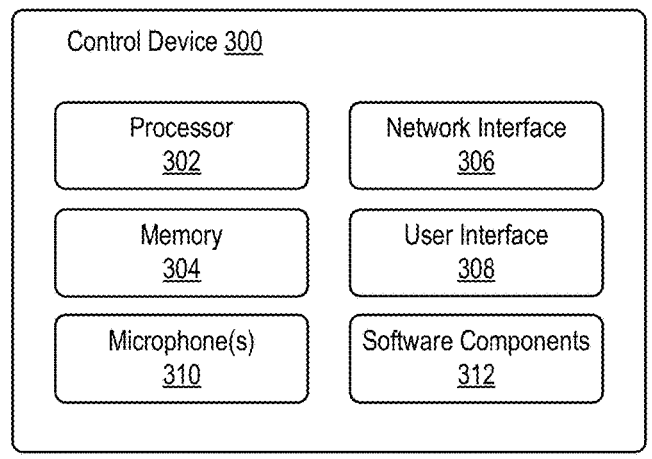
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include one or more processors 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The one or more processors 302 may be configured to perform functions relevant to facilitating user access, control, and configuration of the media playback system 100. The memory 304 may be data storage that can be loaded with one or more of the software components executable by the one or more processors 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
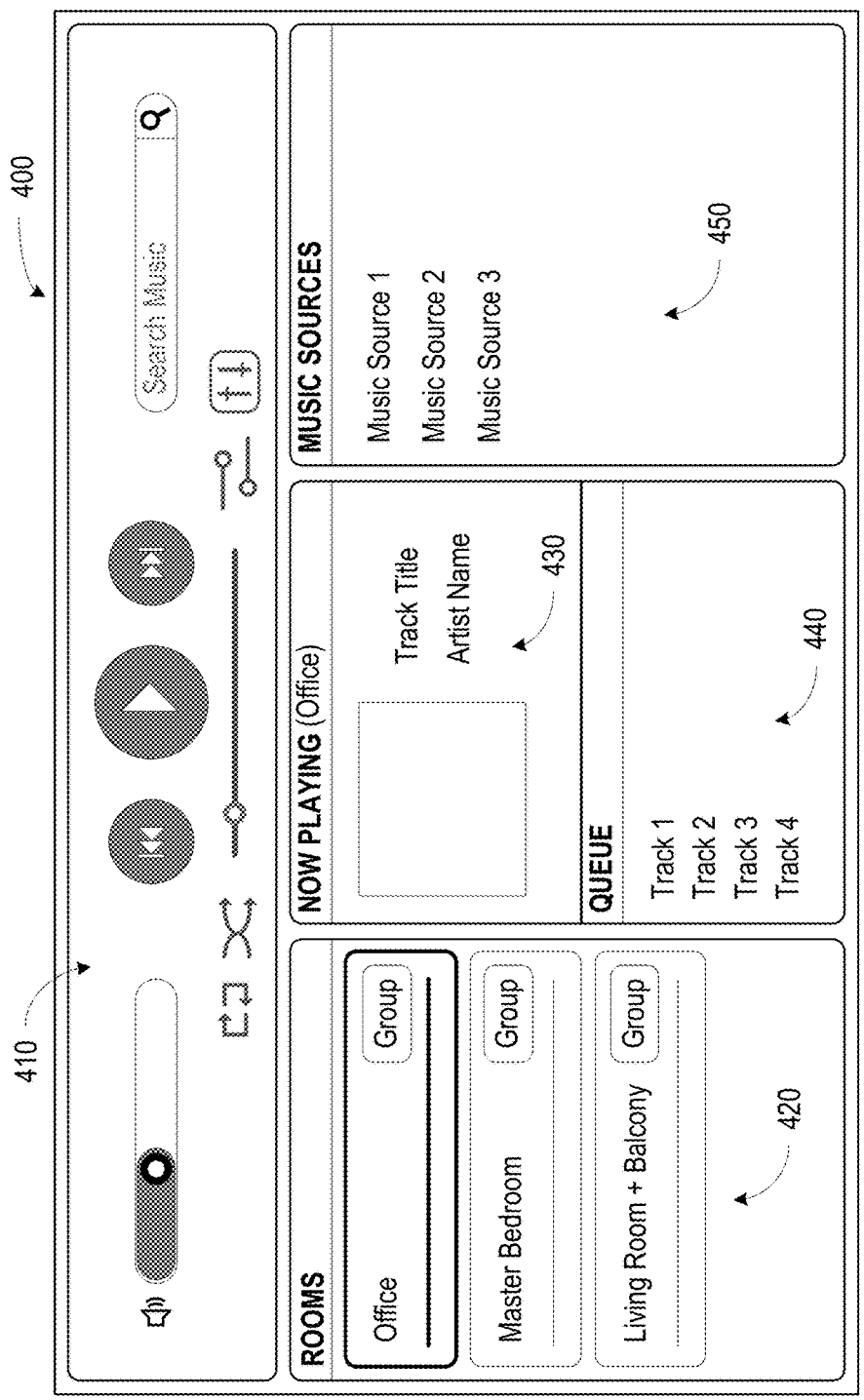
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
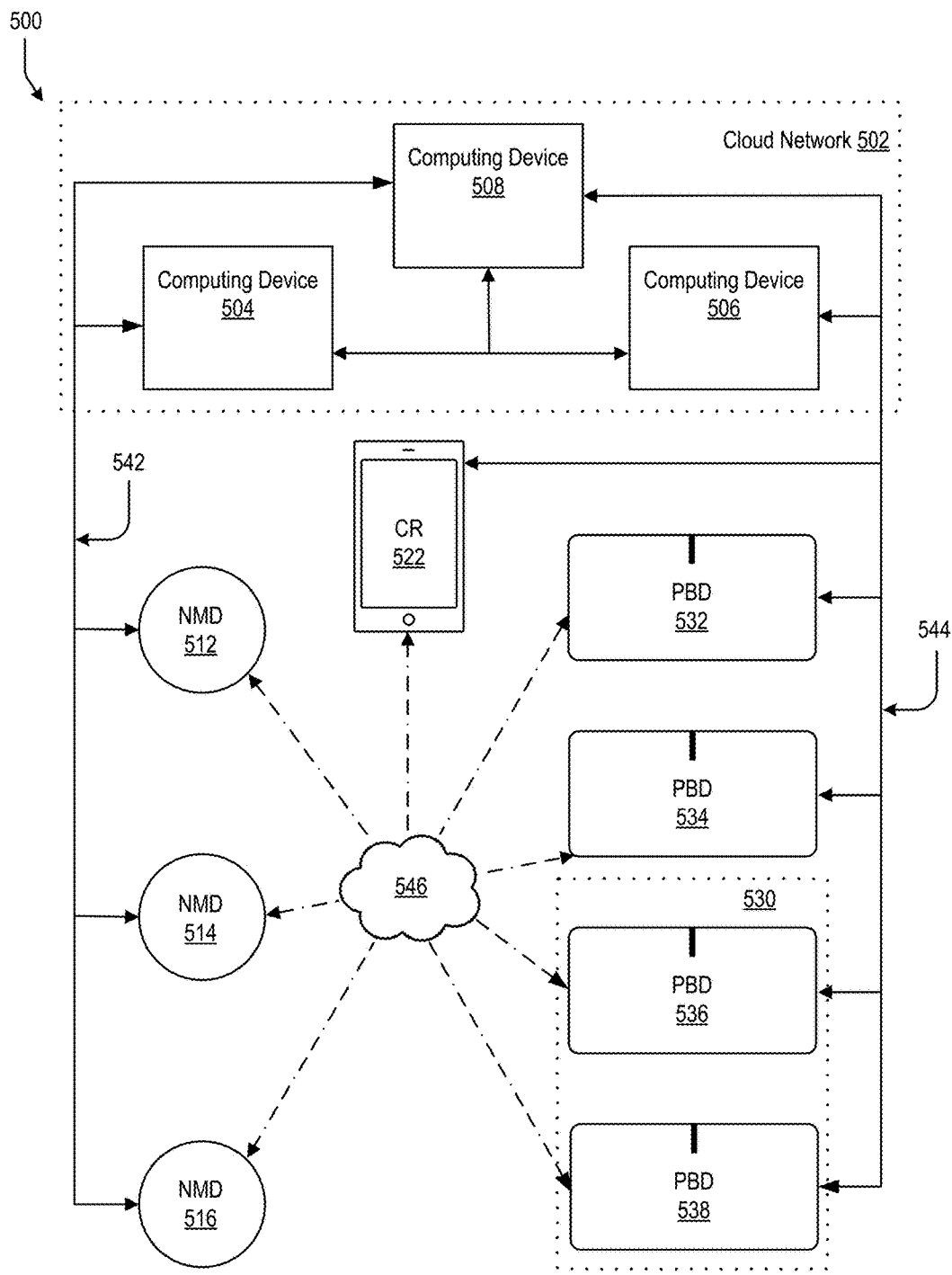
FIG. 5 shows an example plurality of network devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional (or fewer) devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array. In some embodiments, one or more of NMDs 512, 514, and/or 516 may be a microphone on a mobile computing device (e.g., a smartphone, tablet, or other computing device).

As shown, the computing device 506 may be configured to interface with CR 522 and PBDs 532, 534, 536, and 538 via communication path 544. In one example, CR 522 may be a network device such as the network control device 300 of FIG. 3. Accordingly, CR 522 may be configured to provide the controller interface 400 of FIG. 4. Similarly, PBDs 532, 534, 536, and 538 may be playback devices such as the playback device 200 of FIG. 2. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506, and computing device 506 in turn may then control one or more of PBDs 532-538 to execute the command. In another example, the computing device 504 may convert the voice input to an equivalent text command, and then subsequently transmit the text command to the computing device 506. The computing device 506 may then parse the text command to identify one or more playback commands, and then computing device 506 may additionally control one or more of PBDs 532-538 to execute the command.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as CR 522, NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
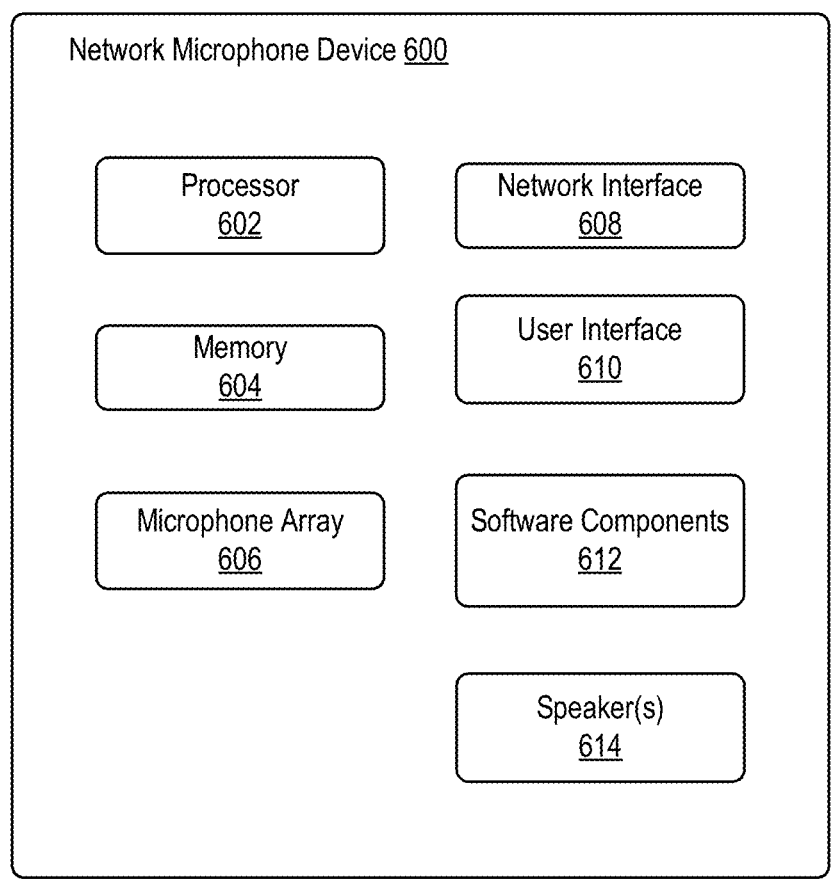
FIG. 6 shows a function block diagram of an example network microphone device.

FIG. 6 shows a function block diagram of an example network microphone device 600 that may be configured to be one or more of NMDs 512, 514, and 516 of FIG. 5. As shown, the network microphone device 600 includes one or more processors 602, memory 604, a microphone array 606 (e.g., one or more microphones), a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The one or more processors 602 may include one or more processors and/or controllers, which may take the form of a general or special-purpose processor or controller. For instance, the one or more processors 602 may include microprocessors, microcontrollers, application-specific integrated circuits, digital signal processors, and the like. The memory 604 may be data storage that can be loaded with one or more of the software components executable by the one or more processors 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing devices 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface (s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Systems and Methods Relating to Default Playback Devices

Some embodiments described herein involve designating a default playback device in a media playback system and applying such designation of the default playback device. In one embodiment, a network microphone device ("NMD") may be assigned to a playback zone in a media playback system. In such a case, one or more of the playback devices in the playback zone may be designated as the default playback device for the NMD. Some examples herein involve methods and processes for designating the default playback device and/or assigning the NMD to a playback zone. Other examples involve methods and processes for causing the default playback device to take certain actions.

In an embodiment, a command via the NMD to cause the media playback system to perform a particular playback command may not identify a specific playback zone. In such a case, the default playback device may be identified based on the assignment of the NMD to the playback zone of the default playback device. The default playback device may accordingly perform the particular playback command. Other scenarios and examples involving the designation of default playback devices and application of such designations can be found in the following sections.

As indicated above, the examples provided herein involve designating a default playback device in a media playback system and applying such designation of the default playback device. In one aspect, a method is provided. The method involves determining, by a computing device, that a networked microphone device is available for assignment to one or more playback zones within a local playback network, displaying by the computing device, a prompt to indicate at least one playback zone to which the network microphone device is to be assigned, receiving, by the computing device, an input indicating a particular playback zone in the local playback network to which the network microphone device is to be assigned, and storing, by the computing device, data indicating an assignment of the network microphone device to the particular playback zone.

In another aspect, a computing device is provided. The computing device includes a processor, and memory having stored thereon instructions executable by the processor to cause the device to perform functions. The functions include determining that a networked microphone device is available for assignment to one or more playback zones within a local playback network, displaying a prompt to indicate at least one playback zone to which the network microphone device is to be assigned, receiving an input indicating a particular playback zone in the local playback network to which the network microphone device is to be assigned, and storing data indicating an assignment of the network microphone device to the particular playback zone.

In yet another aspect, a non-transitory computer readable memory is provided. The non-transitory computer readable memory has stored thereon instructions executable by a computing device to cause the computing device to perform functions. The functions include determining that a networked microphone device is available for assignment to one or more playback zones within a local playback network, displaying a prompt to indicate at least one playback zone to which the network microphone device is to be assigned, receiving an input indicating a particular playback zone in the local playback network to which the network microphone device is to be assigned, and storing data indicating an assignment of the network microphone device to the particular playback zone.

In one aspect, a method is provided. The method maintaining, by a computing device, a database comprising data indicating an assignment of an identification of a network microphone device to a playback zone of a media playback system, receiving, by the computing device, a message indicating (i) the identification of the network microphone device and (ii) a media playback command, identifying, by the computing device the playback zone in the media playback system based on the data in the database and the received message, and transmitting, by the computing device to the playback zone, a message indicating the media playback command.

In another aspect, a computing device is provided. The computing device includes a processor, and memory having stored thereon instructions executable by the processor to cause the device to perform functions. The functions include maintaining a database comprising data indicating an assignment of an identification of a network microphone device to a playback zone of a media playback system, receiving a message indicating (i) the identification of the network microphone device and (ii) a media playback command, identifying the playback zone in the media playback system based on the data in the database and the received message, and transmitting to the playback zone, a message indicating the media playback command.

In yet another aspect, a non-transitory computer readable memory is provided. The non-transitory computer readable memory has stored thereon instructions executable by a computing device to cause the computing device to perform functions. The functions include maintaining a database comprising data indicating an assignment of an identification of a network microphone device to a playback zone of a media playback system, receiving a message indicating (i) the identification of the network microphone device and (ii) a media playback command, identifying the playback zone in the media playback system based on the data in the database and the received message, and transmitting to the playback zone, a message indicating the media playback command.

Figure 7:
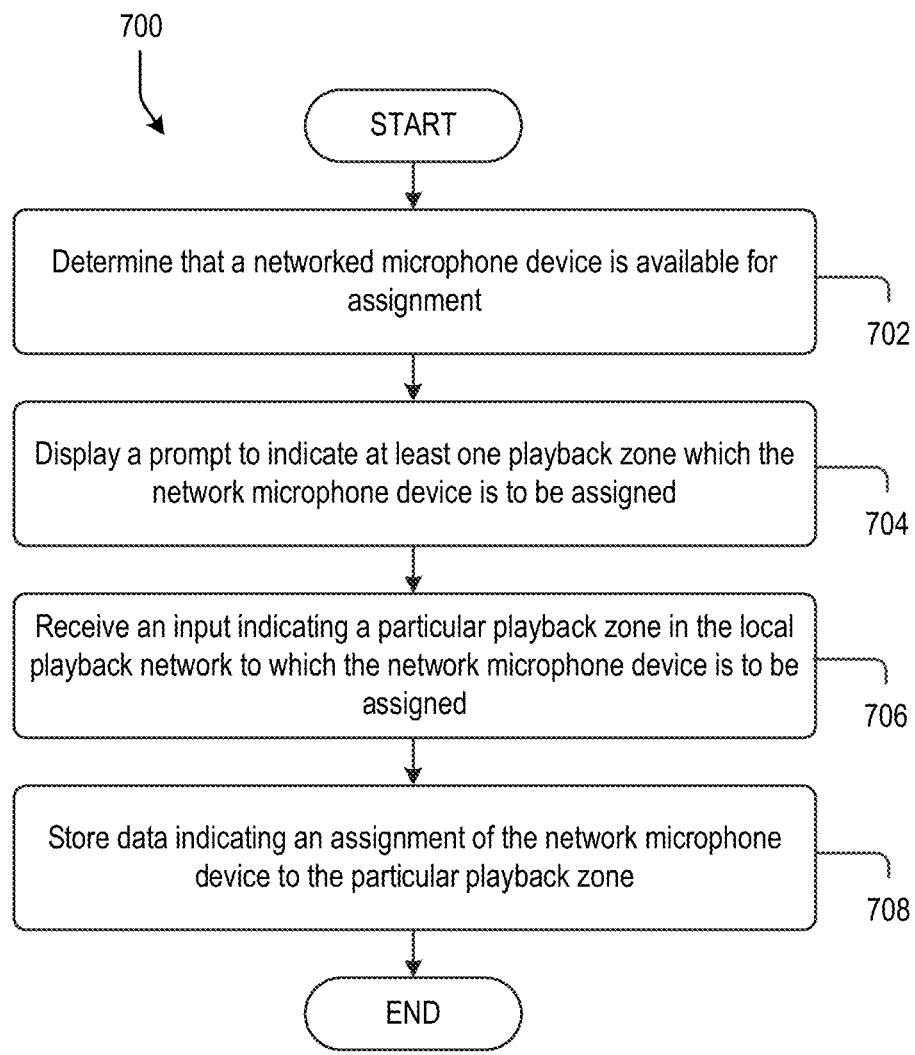
FIG. 7 shows an example flow diagram for designating default playback device(s)
Figure 9:
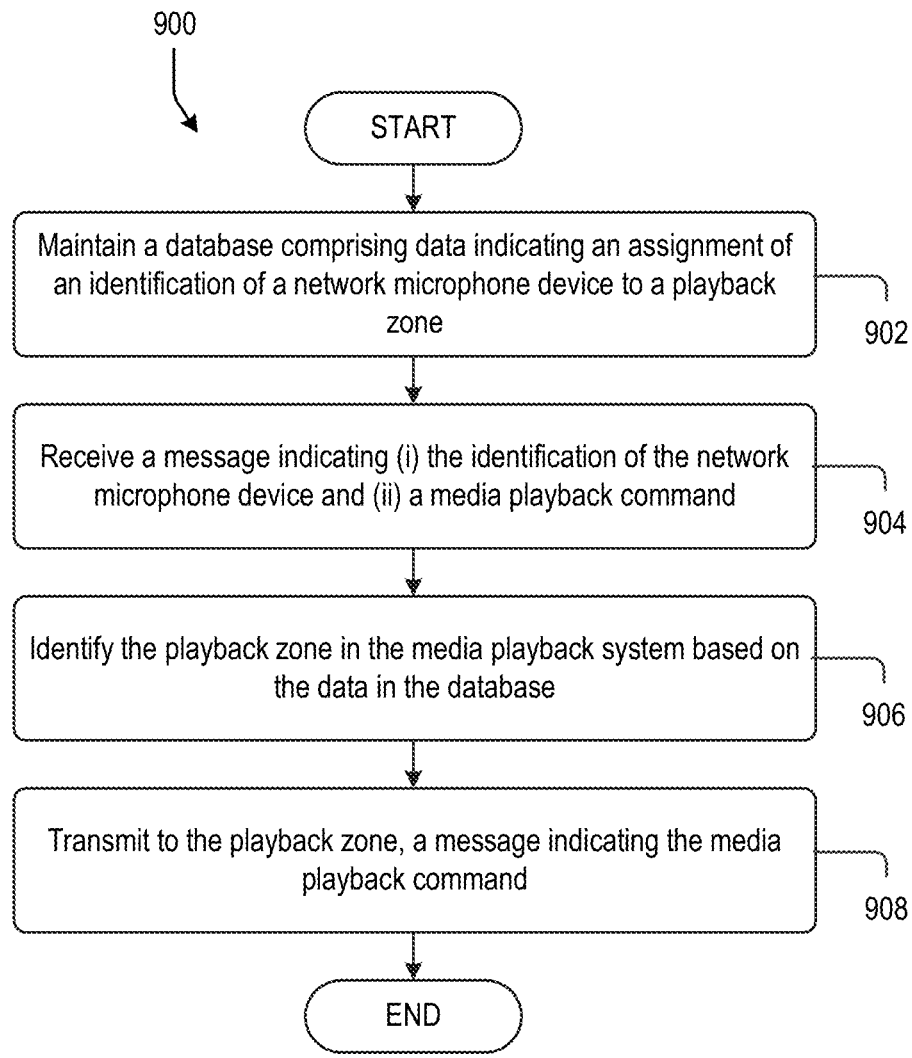
FIG. 9 shows an example flow diagram for applying default playback device designation(s)

As discussed above, embodiments described herein may involve designations of default playback devices in a media playback system, and application of such designations. FIG. 7 shows an example flow diagram 700 for designating default playback device (s), and FIG. 9 shows an example flow diagram 900 for applying default playback device designation(s). Methods 700 and 900 shown present embodiments of methods that can be implemented within an operating environment involving, for example, the media playback system 100 of FIG. 1, one or more of the playback device 200 of FIG. 2, one or more of the control device 300 of FIG. 3, and one or more of the plurality of devices of FIG. 5. Methods 700 and 900 may include one or more operations, functions, or actions as illustrated by one or more of blocks 702-708 and blocks 902-908, respectively. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for methods 700 and 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIGS. 6 and 7 may represent circuitry that is wired to perform the specific logical functions in the process.

a. Default Playback Device Designation(s)

Designation of default playback devices in a media playback system may involve assigning a network microphone device to one or more playback devices in the media playback system, such that the one or more playback devices become the designated default playback devices for functions associated with the network microphone device.

As shown in FIG. 7, the method 700 involves determining that a network microphone device is available for assignment at block 702, displaying a prompt to indicate at least one playback zone which the network microphone is to be assigned at block 704, receiving an input indicating a particular playback zone in the media playback system to which the network microphone device is to be assigned at block 706, and storing data indicating an assignment of the network microphone device to the particular playback zone at block 708.

For illustration purposes, method 700 may be performed by CR 522 of FIG. 5, which may be one of one or more controller devices configured to control a media playback system including one or more of PBDs 532, 534, 536, 538, or other playback devices. Nevertheless, one having ordinary skill in the art will appreciate that functions discussed in relation to method 700 may be additionally or alternatively wholly or partially performed, with or without applicable modifications, by one or more other devices in the plurality of devices 500 shown in FIG. 5.

In an example scenario of a user interacting with a computing device executing method 700, such as CR 522, the user of CR 522 may indicate that a network microphone device is to be assigned to one or more playback zones. In response to the indication by the user, CR 522 may determine whether one or more network microphone devices are available for assignment. In one case, the user may enter into CR 522 identification information for a network microphone device the user wishes to assign. In another case for which additional discussion is provided below, CR 522 may seek within communicative range of CR 522, network microphone devices that are available for assignment. In one instance, CR 522 may display a list of found network microphone devices, and prompt the user to select a network microphone device for assignment. Other examples are also possible.

At block 702, method 700 involves determining that a networked microphone device is available for assignment to one or more playback zones within a local playback network. In discussions herein, playback devices and controllers on the local playback network may form a media playback system such as that described in the sections above. For illustration purposes, the networked microphone device may be NMD 512 of FIG. 5. Determining that NMD 512 is available for assignment may involve determining that NMD 512 is capable of communication with the local playback network, either as a part of the local area network, or via a device in the local playback network. As discussed previously, CR 522, and PBDs 532, 534, 536, and 538 (also referred to herein as "household devices") may be configured to communicate with each other over a local playback network. As such, determining that NMD 512 is capable of communication with the local playback network may involve determining that NMD 512 is capable of communication with at least one of the household devices. In one case, one or more of the household devices may be configured to transmit and/or detect from others of the household devices, messages indicating a presence of the transmitting device on the local network. Such messages may be transmitted when the transmitting device is first powered up, periodically, and/or in response to requests from other devices. In this case, determining that NMD 512 is capable of communication with at least one of the household devices may involve receiving by one or more of the household devices from NMD 512 a message indicating a presence of NMD 512.

In one example, CR 522 may establish communication with NMD 512 over a second network different from the local playback network. For instance, NMD 512 may establish communication to a local area network (LAN) that CR 522 is also configured to communicate over, or establish communication with CR 522 over a personal area network (PAN). In one example, the LAN and/or PAN may be facilitated according to a Bluetooth™ (IEEE 802.15) wireless technology standard. In one case, upon establishing the connection over the second network, NMD 512 may transmit to CR 522, a message indicating that NMD 512 is available for assignment to one or more playback zones in the local playback network.

In another example, determining that NMD 512 is available for assignment may further involve NMD 512 joining the local playback network of the household devices. In one case, communication between CR 522 (or any other of the household devices) and NMD 512 may be established over a second network, as discussed previously. In this case, however, CR 522 may then transmit over the second network to NMD 512, data indicating parameters for joining the local playback network. Examples of parameters for joining the local playback network may include one or more of a service set identifier (SSID), network encryption type (s), network passwords, network authorization tokens, and network communication channel definitions, among other possibilities. In one instance, CR 522 may determine that NMD 512 is available for assignment after receiving from NMD 512, acknowledgment of receipt of the network parameters and/or a message indicating NMD 512 is available for assignment over the second network. In another instance, CR 522 may determine that NMD 512 is available for assignment after receiving a message from the NMD 512 over the local playback network. In this instance, the message from the NMD 512 over the local playback network may or may not explicitly indicate that NMD 512 is available for assignment because the communication between CR 522 and NMD 512 over the local playback network may be sufficient to indicate that NMD 512 is available for assignment.

As indicated previously, one or more of NMDs 512, 514, and 516 may be modules or subcomponents of one or more of the household devices CR 522, and PBDs 532, 534, 536, and 538. In such cases, continuing with the example above, CR 522 may determine that NMD 512 is available for assignment by identifying the presence of NMD 512 as a subcomponent of itself (in the case NMD 512 is a module of CR 522), or by determining that NMD 512 is a subcomponent of another one of the household devices. In one instance, if NMD 512 is a subcomponent of PBD 532, CR 522 may identify NMD 512 and determine that NMD 512 is available for assignment when CR 522 and PBD 532 establish communication (i.e. over the local playback network). Other examples are also possible.

Figure 8A:
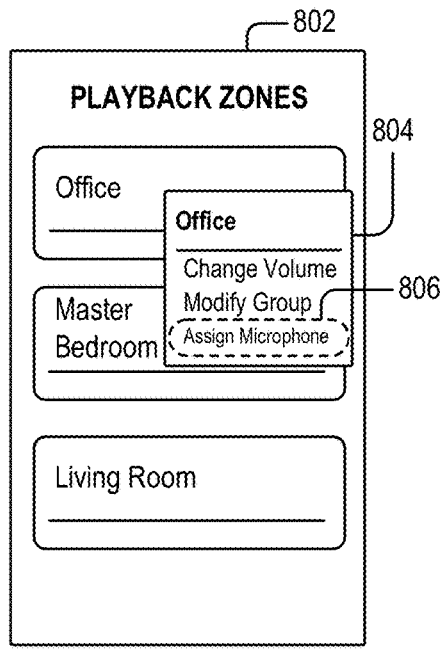
FIG. 8A-D show example user interfaces for assigning network microphone devices.

Once CR 522 determines that NMD 512 is available for assignment, CR 522 may provide an indication on a user interface of CR 522, that NMD 512 is available for assignment. For illustration purposes, FIG. 8A-D show example interfaces 802-862 that may be involved when assigning network microphone devices. Interface 802 of FIG. 8A shows a representations of playback zones in the local playback network. In one example, a selection (e.g. screen tap, force touch, and/or right click, etc.) of a representation corresponding a particular playback zone (in this case, the Office playback zone) may cause the interface to display a menu 804 (and/or a series of submenus) that provide representations of actions that can be performed on the selected playback zone. As shown, a selection 806 to "Assign Microphone" may be detected. In one example, interface 802 may be displayed and the selection 806 may be received prior to CR 522 determining that NMD 512 is available for assignment. In another example, interface 802 may be displayed and the selection 806 may be received after CR 522 has already determined that NMD 512 is available for assignment. In this case, the option to "Assign Microphone" may not be displayed in the menu 804, or may be grayed-out unless CR 522 has already determined that NMD 512, or at least one other network microphone device is available for assignment. Other examples are also possible.

Figure 8B:
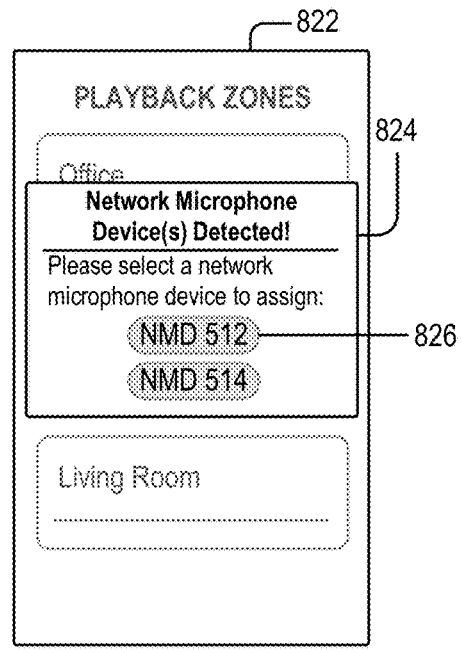

Interface 822 of FIG. 8B shows a message box 824 that indicates one or more network microphone devices have been detected (and available for assignment). The message box 824 may further include selectable representations of network microphone device that are available for assignment. For instance, representation 826 may be selectable to proceed with assigning NMD 512. In one example, interface 822 may be provided in response to the selection 806 of interface 802. In another example, interface 822 may be provided in response to CR 522 determining that NMD 512 (and in this example, NMD 514) are available for assignment. In one case, if interface 822 and message box 824 were provided in response to only a detection of one or more network microphone devices, and not from a prior input via the interface to assign a microphone (interface 802), the message box 824 may also include a selectable option (not shown) to assign the detected network microphone device (s) at a later time. Other examples are also possible.

At block 704, method 700 involves displaying a prompt to indicate at least one playback zone to which the network microphone device is to be assigned. In some cases, the at least one playback zone, may include two or more playback devices (such as the bonded zone 530 of FIG. 5, which includes PBDs 536 and 538). In such cases, CR 522 may also display a prompt to indicate at least one playback device within the at least one playback zone to which NMD 512 is to be assigned. In some other cases, CR 522 may not prompt a selection of a playback device within the at least one zone. In such cases, NMD 512 may be assigned to each playback device in the bonded zone, or by default, a group coordinator of the bonded zone. Other examples are also possible.

Figure 8C:
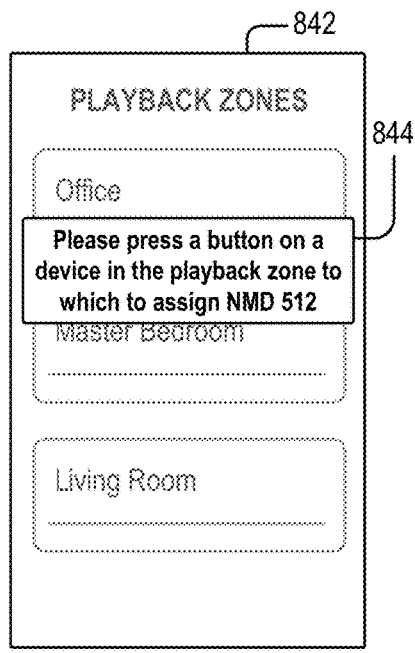

In one embodiment, the prompt to indicate at least one playback zone may involve prompting action physically related to the at least one playback zone. In one example, the prompt may be for the user to press a button on a playback device in the playback zone the user wishes to assign NMD 512 to. Interface 842 of FIG. 8C shows an example message box 844 to prompt the user to press a button on a playback device in the playback zone the user wishes to assign NMD 512. As indicated above, interface 842 may be provided in response to a selection of representation 826 on interface 822. In another example, the prompt may be for the user to tap CR 522 on a playback device in the playback zone the user wishes to assign NMD 512 to. In this case, the playback device may detect CR 522 over a near field communication (NFC) protocol.

In such examples where an action physically related to the at least one playback zone is involved, indication of the at least one playback device within the at least one playback zone to which NMD 512 is to be assigned may be inherent to the indication of the at least one playback zone. In other words, the playback device in the at least one playback zone on which the button press or CR 522 tap occurs may also be the playback device to which NMD 512 is to be assigned. Other examples are also possible.

Figure 8D:
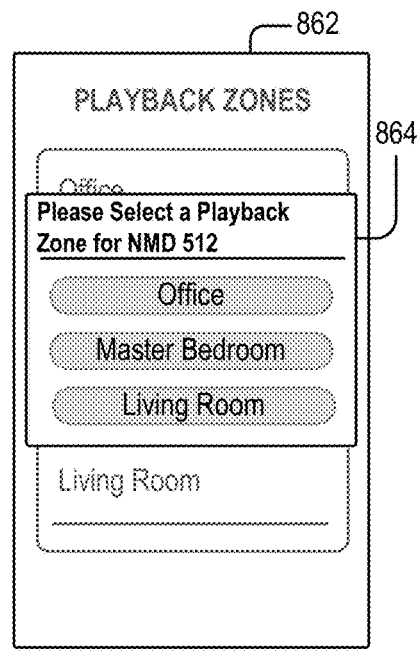

In another embodiment, the prompt to indicate at least one playback zone may involve prompting action on the user interface of CR 522. In one example, CR 522 may display on the interface, for each playback zone in the local playback network, a corresponding representation (similar to the playback zone region 420 of FIG. 4), and further display on the interface, a prompt to select a representation corresponding to the playback zone to which NMD 512 is to be assigned. Interface 862 of FIG. 8D shows an example message box 864 that includes selectable representations corresponding to the playback zones in the local playback network. As indicated above, interface 862 may be provided in response to a selection of representation 826 on interface 822. In this example, if the selected representation corresponds to a bonded playback zone, such as the bonded zone 530, CR 522 may further display on the interface, a prompt to indicate a particular playback device (i.e. PBDs 536 or 538) in the bonded playback zone. For instance, CR 522 may display on the interface a prompt to select a corresponding representation for each playback device in the selected playback zone.

In a further embodiment, the prompt to indicate at least one playback zone may involve some combination of the action physically related to the at least one playback zone, and the action on the user interface of CR 522. For instance, the prompt to indicate a playback zone to which NMD 512 is to be assigned may involve only action on the user interface of CR 522, but a subsequent prompt to indicate a playback device within the playback zone may involve actions physically related to the playback device to which NMD 512 is to be assigned. Other examples are also possible.

In yet a further embodiment, the prompt to indicate at least one playback zone may further include a suggested at least one playback zone. In one example, CR 522 may identify (i) that NMD 512 was given a name including "Master Bedroom," and (ii) that a playback zone in the local playback network has also been given the name "Master Bedroom," and accordingly include with, or add to the prompt to indicate at least one playback zone, a suggestion that the Master Bedroom playback zone may be a suitable playback zone to which NMD 512 may be assigned. Other examples are also possible.

At block 706, method 700 involves receiving an input indicating a particular playback zone in the local playback network to which the network microphone device is to be assigned. As suggested above, if the particular includes two or more playback devices, the input may further indicate a particular playback device in the particular playback zone.

In one embodiment, if the prompt displayed at block 704 involved an action physically related to the playback zone, the input indicating the particular playback zone may be received from a playback device in the particular playback zone. For instance, if a button on PBD 536 was pressed or a tap on PBD 536 by CR 522 was performed in response to the displayed prompt at block 704, PBD 536 may transmit a message to CR 522 indicating that PBD 536 and/or bonded zone 530 was selected.

In another embodiment, if the prompt displayed at block 704 involved an action on the interface of CR 522, the input indicating the particular playback zone may be received in the form of the selection input(s) by the user on the interface. Other examples are also possible.

At block 708, method 700 involves storing data indicating an assignment of the network microphone device to the particular playback zone. In one example, continuing with the examples above, storing the data indicating the assignment of NMD 512 to the bonded zone 530 may involve storing on a local memory storage of CR 522, the data indicating the assignment. In another example, storing the data indicating the assignment may involve transmitting to one or more of the other household devices, the data indicating the assignment and a message to cause the one or more of the other household devices to store the data. In yet another example, storing the data indicating the assignment may involve transmitting to a server, such as one or more of the computing device 504, 506, and 508 of cloud network 502, the data indicating the assignment and a message to cause the one or more of the computing device 504, 506, and 508 of cloud network 502 to store the data. Other examples re also possible.

As mentioned above, assignment of a network microphone device to a particular playback zone may also involve an assignment of the network microphone device to at least one playback device in the particular playback zone. As such, the data indicating the assignment of NMD 512 to the bonded zone 530 may include data indicating an assignment of NMD 512 to PBD 536, if continuing with the examples above. In some cases, if a playback device in a playback zone is not explicitly indicated, the network microphone device may be assigned to each playback device in the particular playback zone. In other cases, if a playback device in a playback zone is not explicitly indicated, a playback device in the particular playback zone may be automatically and/or intelligently identified, and the network microphone may be assigned to to the identified playback device. For instance, if the playback zone is a bonded zone, a coordinating playback device of the bonded zone may be identified. In another instance, if the playback zone is a zone group, a group coordinator playback device in the zone group may be identified. Other examples are also possible.

In one embodiment, the network microphone device that has been assigned may correspond to one or more unique identifiers. For instance, the network microphone device may have a unique serial number, or a corresponding MAC address, among other possibilities. Accordingly, storing data indicating the assignment of the NMD 512 to the bonded zone 530 (and/or PBD 536) may involve storing an assignment of the unique identifier of NMD 512 to the bonded zone 530 (and/or PBD 536).

In one example, CR 522 may receive a unique identifier for NMD 512 when initially determining that NMD 512 is available for assignment. In some cases, if the network microphone device did not provide a unique identifier, a unique identifier may be generated and assigned to the network microphone device. Other examples are also possible.

In some embodiments, a network microphone device may be assigned to two or more playback zones. For instance, in a household with an "open floor plan" such as that shown in FIG. 1, a network microphone device may be positioned somewhere within the vicinity of the Living Room, Dining Room, and Kitchen. In such cases, assignment of the network microphone device to two or more playback zones may be beneficial.

In one example, continuing with the examples above, CR 522 may display on the interface, a prompt to indicate a second playback zone to which NMD 512 is to be assigned, receive an input indicating a second playback zone in the media playback system, and storing data indicating an assignment of the network microphone device to the second playback zone such that the network microphone device is assigned to both the first playback zone and the second playback zone, similar to blocks 704-708.

In one example, interactions to assign NMD 512 to the second playback zone may be performed in series. For instance, CR 522 may display on the interface after receiving the input indicating that NMD 512 is to be assigned to bonded zone 530 at block 706, or after storing data indicating the assignment of NMD 512 to bonded zone 530, a prompt to indicate a second playback zone to which NMD 512 is to be assigned.

In another example, interactions to assign NMD 512 to the second playback zone may be performed substantially in parallel with the interactions to assign NMD 512 to the bonded zone 530. For instance, the prompt to indicate at least one playback zone at block 704 may be a prompt to indicate each playback zone to which NMD 512 is to be assigned. In this case, if the input received at block 706 indicates only a single playback zone, then the data stored at block 708 may indicate an assignment of NMD 512 to only the single playback zone. On the other hand, if the input received at block 706 indicates two or more playback zones, the data stored at block 708 may indicate an assignment of NMD 512 to each of the two or more playback zones.

In a further example, the prompt to indicate a playback zone may prompt the user to group together the two or more playback zones to which NMD 512 is to be assigned, such that the user can then select on the interface from among a representation of zones, a representation corresponding to the group (or alternatively, physically select a playback device in the zone group) to indicate that NMD 512 is to be assigned to the zone group and/or playback zones in the zone group. Other examples are also possible.

TABLE 1

| NMD | Playback Zone 1 | PBD in Zone 1 | Playback Zone 2 | PBD in Zone 2 |
|---|---|---|---|---|
| NMD 512 | Master Bedroom | PBD 536 | n/a | n/a |
| NMD 514 | Living Room | PBD 534 | Kitchen | n/a |
| NMD 516 | Office | PBD 532 | Master Bedroom | PBD 536 PBD 538 |

For illustration purposes, Table 1 shows an example set of entries in a default playback device database. As shown, Table 1 lists each of the NMDs 512, 514, and 516, and the playback zone (s) and playback device (s) to which they are assigned. In this example, both NMD 512 and NMD 516 are assigned to the Master Bedroom playback zone (bonded zone 530). In this example however, NMD 512 is further assigned specifically to PBD 536 of the Master Bedroom playback zone, while NMD 516 is further assigned specifically to both PBD 536 and PBD 538. Further in this example, NMD 514 is assigned to both the Living Room playback zone and the Kitchen playback zone. However, NMD 514 is further assigned to PBD 534 in the Living Room playback zone, but not further assigned to any playback device in the Kitchen playback zone.

One having ordinary skill in the art will appreciate that different formatting, organization, and sets of parameters may also be possible to achieve similar functions as Table 1.

In one example, two or more network microphone devices may be assigned to a single playback zone or playback device. In another example, each network microphone device may be assigned to three or more playback zones. In a further example, each network microphone device may be assigned to one or more playback devices, and not any playback zones. In yet another example, Table 1 may list each playback zone and/or playback device in the local playback network, of which perhaps not every listed playback zone (s) or playback device (s) has assigned thereto, one or more network microphone devices. Other examples are also possible.

While the above discussions may generally refer to assignments of one or more network microphone devices to one or more playback zones and/or playback devices, one having ordinary skill in the art will appreciate that such assignments and designations may be additionally or alternatively established according to other methods and/or protocols. For instance, one or more playback zones and/or playback devices may equivalently or alternatively be assigned to one or more network microphone devices, and corresponding data may be stored locally at the one or more network microphone devices or remotely at a server such as computing device 504. Continuing with the example of Table 1, entries in Table 1 may alternatively (or additionally) be provided based on assignments of PBD 536 and/or the Master Bedroom playback zone to NMD 512 via an interface corresponding to at least NMD 512 (i.e. a controller interface for managing and controlling at least NMD 512). Similarly, the Office playback zone and the Master Bedroom playback zone may both be assigned to NMD 516 via the interface corresponding to at least NMD 512 and 516.

In addition, both forms of assignments and designations may co-exist such that the plurality of network microphone devices and the plurality of playback devices may be cross-assigned to each other. In such a case, the cross-assignments may or may not fully match. For instance, in some cases, a network microphone device may be assigned to two playback devices, but only one or neither of the playback devices are assigned to the network microphone. Other examples are also possible.

As indicated above, assignment of the network microphone device to the particular playback zone indicates that the particular playback zone is designated as a default playback zone for the network microphone device. The following section provides examples for applications of such a default playback zone designation.

b. Application of Default Playback Device Designation(s)

As shown in FIG. 9, the method 900 involves maintaining a database comprising data indicating an assignment of an identification of a network microphone device to a playback zone at block 902, receiving a message indicating (i) the identification of the network microphone device and (ii) a media playback command at block 904, identifying the playback zone in the media playback system based on the data in the database and the received message at block 906, and transmitting to the playback zone, a message indicating the playback command at block 908.

For illustration purposes, method 900 may be performed by computing device 506 of FIG. 5. Nevertheless, one having ordinary skill in the art will appreciate that functions discussed in relation to method 900 may be wholly or partially performed, with or without applicable modifications, by one or more other devices in the plurality of devices 500 shown in FIG. 5. For instance, the method 900 may be wholly or partially performed by the computing devices 504 and/or 508, or the cloud network 502.

At block 902, the method 900 involves maintaining a database comprising data indicating an assignment of an identification of a network microphone device to a playback zone of a media playback system. In one example, maintaining the database may involve functions similar to that described above in connection to method 700 of FIG. 7. In addition, maintaining the database may further involve updating the database in response to changes to the media playback system and/or local playback network. For instance, if a network microphone device has been reassigned to different playback zone (s) and/or playback device (s), the database may be updated. Likewise, if one or more devices, including network microphone devices such as NMDs 512, 514, and 516, playback devices such as PBDs 532, 534, 536, and 538, or control devices, such as CR 552 are added, removed, temporarily disconnected, or reconnected, the database may be updated accordingly. Other examples of maintaining the database are also possible.

At block 904, the method 900 involves receiving a message indicating (i) the identification of the network microphone device and (ii) a media playback command. Continuing with the examples above, computing device 506 may receive the message from the NMD 514.

In one example, computing device 506 may receive the message from NMD 514 via computing device 504. As discussed in connection to FIG. 5, NMD 514 may transmit a voice input to computing device 504 via communication path 542, and computing device 504 may convert the voice input to an equivalent text command, and subsequently transmit the text command to the computing device 506. In such a case, the message indicating (i) the identification of the network microphone device and (ii) the media playback command may include the text command from the computing device 504.

In another example, computing device 506 may receive the message directly from NMD 514. In such a case, the message may include data indicating the media playback command, while the source of the message identified in the message (i.e. within a data packet header/prefix of the message) may indicate NMD 514. In this case, the computing device 506 may also process and convert the voice input to an equivalent text command.

At block 906, the method 900 involves identifying the playback zone in the media playback system based on the data in the database and the received message. As also discussed in connection to FIG. 5, the computing device 506 may then parse the text command to identify one or more playback commands. During the parsing of the text command to identify one or more playback commands, the computing device 506 may identify a particular command, but may determine that a playback zone to perform the particular command was not identified. In one example, computing device 506 may determine that a playback zone to perform the particular command was not identified if no zone indication was provided in the playback command. In another example, computing device 506 may determine that a playback zone to perform the particular command was not identified if a zone indication that was provided in the playback command does not exist in the media playback system. Other examples are also possible.

Whichever the case, in response to the determining that the received message does not indicate a particular playback zone, computing device 906 may identify in the database, a playback zone in the media playback system based on the identification of the network microphone device in the received message. In other words, computing device 506 may identify a playback zone designated as the default playback zone of the network microphone device identified in the received message (and/or from which the media playback command originated.)

Continuing with the examples above, including Table 1, if the received message does not identify a valid playback zone but indicates NMD 512, then computing device 506 may identify the playback zone "Master Bedroom" and/or PBD 536 as the playback zone to perform the media playback command in the received message.

As shown in Table 1, in some cases, a network microphone device such as NMD 514 or 516 may be assigned to two or more playback zones (and/or playback devices). In one example, computing device 506 may identify each of the two or more playback zones as playback zones that are to perform the media playback command. For instance, if the received message indicates NMD 514, computing device 506 may identify both the Living Room and the Kitchen as playback zones that are to perform the media playback command.

In another example, computing device 506 may identify a subset of the two or more playback zones as playback zones that are to perform the media playback command. For instance, if the received message indicates NMD 516, computing device may identify one of the Office or the Master Bedroom as the playback zone that is to perform the media playback command. In some cases, computing device 506 may identify the subset based on additional information, such as contextual information.

In one case, computing device 506 may identify the subset of the two or more playback zones as playback zones that are to perform the media playback command based on media content associated with the two or more playback zones. For instance, if a first subset of the two or more playback zones is playing media content and/or is associated with media content (i.e. has media content in a corresponding playback queue) while a second subset of the two or more playback zones is not playing media content and/or is not associated with media content when the voice input was received at the corresponding network microphone device, computing device 506 may identify the first subset of the two or more playback zones as playback zones that are to perform the media playback command.

Additionally, computing device 506 may identify the subset of the two or more playback zones based on the media playback command and media playback states of the two or more playback zones. In such a case, the computing device 506 may be configured to receive and maintain playback states for each of the playback zones in the media playback system. For instance, if the media playback command involves pausing playback of media content while a first subset of the two or more playback zones is playing media content and a second subset of the two or more playback zones is not playing media content when the voice input was received by the corresponding network microphone device, then computing device 506 may identify the first subset of the two or more playback zones based on an assumption that a user is more likely to provide a pause command to a playback zone that is playing media content than a playback zone that is not playing media content (i.e. already paused).

In another case, the database (or another database) may be configured to also store information relating to media playback history within the media playback system and/or more specifically, media playback command history associated with each of the network microphone devices. For instance, data in the database may indicate that a subset of the two or more playback zones is more frequently used to play media content and/or more frequently used to play media content in response to a voice command via the corresponding network microphone device. In such a case, computing device 506 may identify the more frequently used subset of two or more playback zones as playback zones that are to perform the media playback command.

In a further case, the media playback history and/or media playback command history may further indicate a times of day, or days of week, etc. when a subset of the two or more playback zones is more frequently used to playback media content and/or more frequently used to play media content in response to a voice command. In such a case, computing device 506 may further identify the subset of two or more playback zones that are to perform the media playback command based on a time when the voice input was received at the corresponding network microphone device.

In yet another case, computing device 506 may identify the subset of the two or more playback zones as playback zones to perform the media playback command based further on proximity information available to the computing device 506. In other words, computing device 506 may identify the subset of the two or more playback zones based on a physical location of the user when providing the voice input to the corresponding network microphone device.

In one example, the voice input detected and processed by the network microphone device may contain directional information corresponding to the voice input. In one embodiment, during setup and assignment of the network microphone device to the two or more playback zones, the network microphone device may determine and store in memory (locally or remotely, i.e. computing device 504), locations of the two or more playback zones in relation to the network microphone device. For instance, during setup and assignment of the network microphone device, or over time, the network microphone device may detect playback of media content by the two or more playback zones, and correlate directions from which the playback of media content is detected with the corresponding playback zones. As such, the physical location of the user may be determined based on a direction from which the voice input was detected by the network microphone device.

In another example, as previously suggested, one or more other devices in the media playback system may also include network microphone devices and/or other sensors. Accordingly, a network of available sensors may be configured to determine proximity or locate (i.e. via triangulation, etc.) the user when the user provides the voice input to the corresponding network microphone device. In one case, if the user is holding, or has recently used a control device such as CR 522, a location of the user, or proximity between the user and the playback devices/playback zones may be determined based on a signal strength between the control device and the playback devices. Similarly, an audio magnitude of the voice input as detected by the other network microphone devices, or wireless signal interference caused by the user between the various devices may also be received and applied by computing device 506 to determine the physical location of the user when the voice input was detected, and accordingly identify the subset of the two or more playback zones as playback zones that are to perform the media playback command. Other examples are also possible.

At block 908, the method 900 involves transmitting to the playback zone, a message indicating the media playback command. As described previously, each playback zone in the media playback system includes at least one playback device. Accordingly, transmitting to the playback zone, the message indicating the media playback command may involve transmitting the message indicating the media playback command to the corresponding at least one playback device of the playback zone. Referring to Table 1 and FIG. 5, the Office playback zone includes just PBD 532. In this case, transmitting a message indicating the media playback command to the Office playback zone may involve computing device 506 transmitting the message indicating the media playback command to PBD 532.

Referring again to Table 1 and FIG. 5, the bonded zone 530 (Master Bedroom) includes both PBDs 536 and 538. In one such case, computing device 506 may transmit the message indicating the media playback command to both PBDs 536 and 538. In another such case, computing device 506 may transmit the message indicating the media playback command to only one of the playback devices in the playback zone.

In one instance, the computing device 506 may select one of the PBDs 536 and 538 according to the database. For example, if the media playback command originated from NMD 512, and computing device 506 is transmitting the message indicating the media playback command to the Master Bedroom playback zone, computing device 506 may transmit the message indicating the media playback command to PBD 536 because NMD 512 is further assigned to PBD 536, but not to PBD 538.

In another example, if the media playback command originated from NMD 516, and computing device 506 is transmitting the message indicating the media playback command to the Master Bedroom playback zone, computing device 506 may select one of PBD 536 or PBD 538 based on additional information because NMD 516 has been assigned to both PBD 536 and PBD 538 as part of an assignment to the Master Bedroom playback zone. In one case, computing device 506 may select one of PBD 536 or PBD 538 based on one or more factors, such as device processing power and network conditions, among other possibilities. Additionally, or alternatively, computing device 506 may select one of PBD 536 or PBD 538 based on one of the playback devices being a coordinator for the bonded zone. Other examples are also possible.

In another case, as previously discussed, computing device 506 may identify two or more playback zones as playback zones that are to perform the media playback command. In such a case, computing device 506 may transmit the message indicating the media playback command to each playback device in each of the the two or more playback zones, a subset of the playback devices in each of the two or more playback zones, or some combination thereof.

Further, in a case where all or at least a subset of the two or more playback zones identified as playback zones that are to perform the media playback command are grouped in a zone group, computing device 506 may identify a single playback device in the zone group to transmit the message indicating the media playback command, rather than transmitting the message to a playback device in each playback zone. In this case, computing device 506 may select a playback device from the zone group based on one or more factors, such as device processing power and network condition, among other possibilities. Additionally, or alternatively, computing device 506 may select a playback device from the zone group based on the playback device being a group coordinator for the zone group. Other examples are also possible.

In one embodiment, after transmitting the message indicating the media playback command to the playback zone (s), computing device 506 may further transmit to the computing device 504 and/or the network microphone device, a message indicating the playback command was sent for execution in the playback zone. In one example, the computing device 506 may receive from at least one playback device in the playback zone, a message indicating that the playback zone is executing the playback command prior to transmitting to the network microphone device, the message indicating the playback command was sent for execution in the playback zone.

In one case, computing device 506 may transmit the message indicating the playback command was sent for execution in the playback zone directly to the network microphone device. In another case, computing device 506 may transmit the message indicating the playback command was sent for execution in the playback zone to the network microphone device via another computing device, such as computing device 504 within cloud network 502.

In yet another case, computing device 506 may transmit the message indicating the playback command was sent for execution in the playback zone to the network microphone device via a playback device in the media playback system. For instance, computing device 506 may transmit the message indicating that the playback command was sent for execution to PMD 536 via communication path 544, and PMD 536 may relay the message to NMD 512 via local communications means 546.

The playback device relaying the message indicating the playback command was sent for execution may be a playback device executing the media playback command. For instance, the computing device 506, when transmitting to the playback zone, the message indicating the media playback command, may further cause a playback device in the identified playback zone to transmit to the corresponding network microphone device, upon receiving the message indicating the media playback command, a message indicating that the media playback command was sent for execution.

Additionally, or alternatively, the computing device 506 may determine that the media playback command has been executed, or is being executed, and responsively transmit to computing device 504 and/or the network microphone device, either directly or via another device, a message indicating that the media playback command has been executed or is being executed.

Further, the computing device 506, when transmitting to the playback zone, the message indicating the media playback command, may further cause a playback device in the identified playback one to transmit to the corresponding network microphone device, upon completing execution or during execution of the media playback command, a message indicating that the media playback command has been executed or is being executed. Other examples are also possible.

IV. Example Systems and Methods Relating to Audio Response Playback

Some embodiments described herein involve playing an audio response to a voice command in a media playback system and selecting a response device to play the audio response to the voice command. In one embodiment, the response device may be predetermined, and in another embodiment, the response device may be dynamically selected based on pairing information.

As indicated above, the examples provided herein involve determining one or more devices to play an audio response to a voice command in a media playback system. In one aspect, a method is provided. The method may involve receiving a voice command via a microphone device assigned to a zone which includes one or more playback devices. At least one playback device of the one or more playback devices may be selected to play the audio response based on at least one of pairing information or capabilities of the zone, and the selected at least one playback device is caused to play the audio response.

In another aspect, a non-transitory computer-readable medium is provided. The non-transitory computer readable medium has stored thereon instructions executable by a computing device to cause the computing device to perform functions. The functions include receiving a voice command via a microphone device assigned to a zone which includes one or more playback devices, selecting at least one playback device of the one or more playback devices to play the audio response based on at least one of pairing information or capabilities of the zone, and causing the selected at least one playback device to play the audio response.

In yet another aspect, an apparatus is provided. The apparatus includes a processor and a memory. The memory has stored thereon instructions executable by the apparatus to cause the apparatus to perform functions. The functions include receiving a voice command via a microphone device assigned to a zone which includes one or more playback devices, selecting at least one playback device of the one or more playback devices to play the audio response based on at least one of pairing information or capabilities of the zone, and causing the selected at least one playback device to play the audio response.

Figure 10:
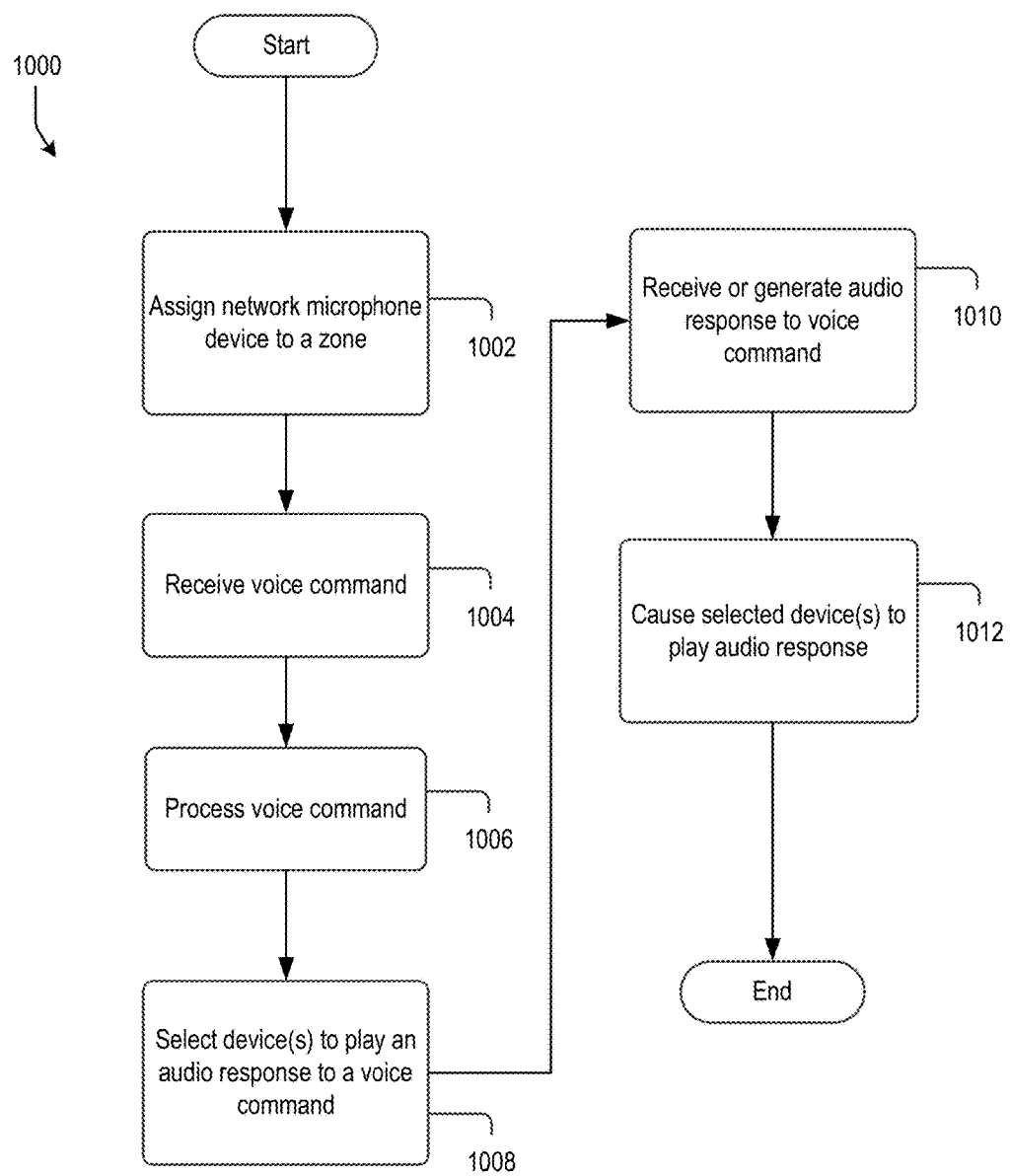
FIG. 10 shows a flow diagram of an example method of playing an audio response according to aspects described herein.
Figure 11:
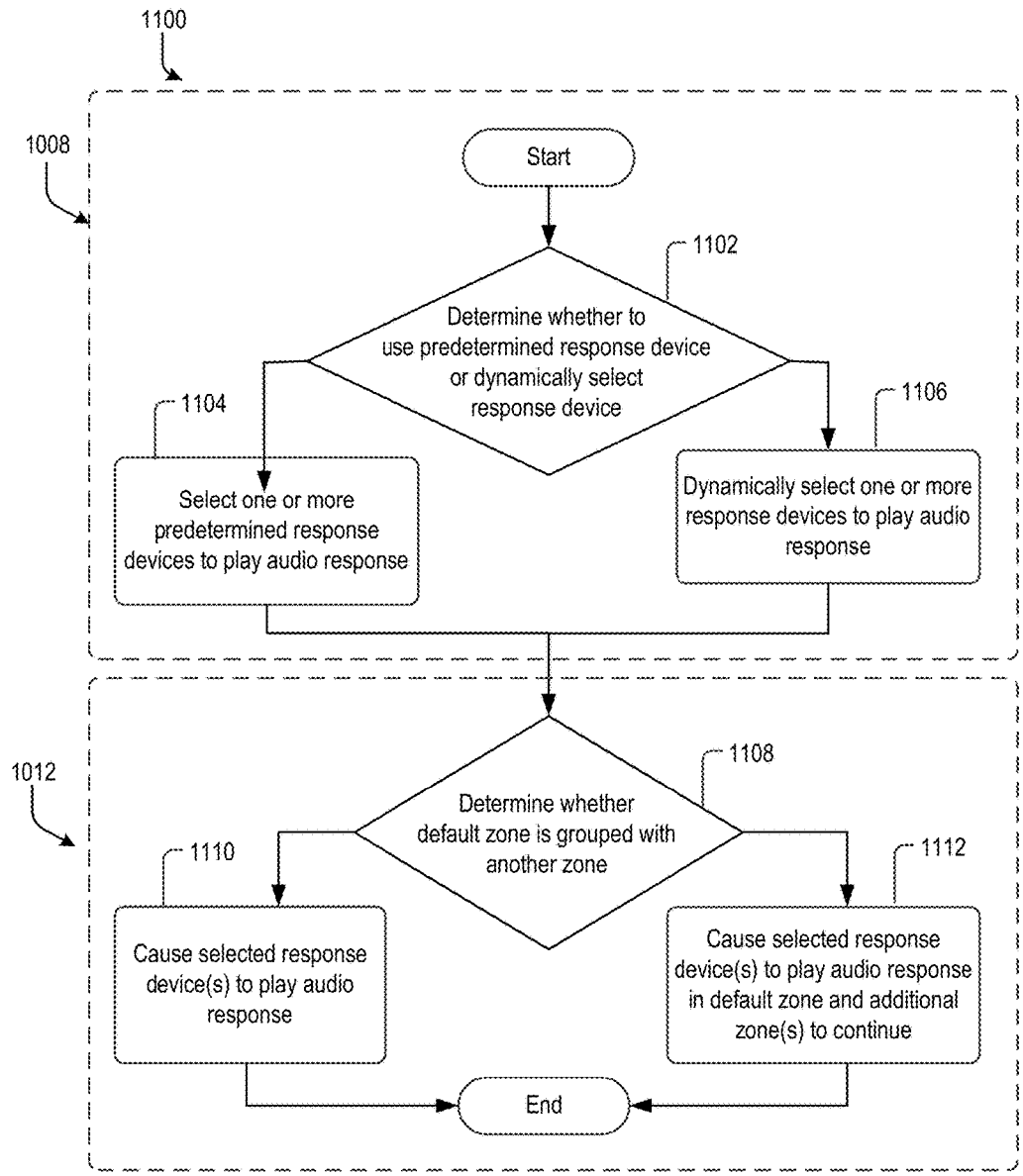
FIG. 11 shows a flow diagram of blocks 1008 and 1012 of FIG. 11 in more detail according to aspects described herein.

As discussed above, embodiments described herein may involve playing back an audio response to a voice command. FIG. 10 shows an example flow diagram 1000 of a method for playing an audio response, and FIG. 11 shows an example flow diagram 1100 presenting aspects of blocks 1008 and 1012 of FIG. 10 in more detail. Methods 1000 and 1100 present embodiments of methods that can be implemented within an operating environment involving, for example, the media playback system 100 of FIG. 1, one or more of the playback device 200 of FIG. 2, one or more of the control device 300 of FIG. 3, and one or more of the plurality of devices in system 500 of FIG. 5. Methods 1000 and 1100 may include one or more operations, functions, or actions. Although the blocks in FIGS. 10 and 11 are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 1000 and 1100 and other processes and methods disclosed herein, the flow diagrams show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods 1000 and 1100 and other processes and methods disclosed herein, each block in FIGS. 10 and 11 may represent circuitry that is wired to perform the specific logical functions in the process.

As discussed above, FIG. 10 depicts a flow diagram of a method 1000 for playing an audio response. At block 1002 of method 1000, a network microphone device 512, 514, 516 may be assigned (e.g., paired or bonded) to a zone comprising one or more playback devices such as playback devices 532, 534, 536, 538. Network microphone devices may be assigned to a zone as described elsewhere herein. At block 1004, a user may provide a voice command to one or more devices of the plurality of devices 500 which contain a microphone (e.g., NMD 512, 514, 516, PBD 532, 534, 536, 538, CR 522). The one or more microphone devices may pass the voice command to other devices of the plurality or system of devices 500 (e.g., one or more computing devices 504, 506, 508 in cloud network 502, NMD 512, 514, 516, PBD 532, 534, 536, 538) for processing. At block 1006, the one or more processing devices may process the voice command and return a response to be played back. The response to be played back may be returned in the form of a voice response message comprising the audio clip to be played, text to be converted to speech, and/or an identifier of a pre-recorded response to be played that may be stored locally on a device of system 500). The response may be returned via one or more communication paths 542, 544, 546.

At block 1008, system 500 may select one or more devices to play the voice response. The determination or selection of which one or more devices to play the voice response may depend on a variety of factors including context information, pairing information, and/or user settings. Block 1008 will be discussed in more detail with respect to FIG. 11.

At block 1010, system 500 may receive the voice response message indicating the response to play. Block 1010 may occur before, in conjunction with, or after block 1008. At block 1012, the system 500 may cause the one or more device (s) selected in block 1008 to play the voice response. The default zone may be grouped for synchronous playback with another zone and playback of the audio response may be adjusted based on the grouping which will be described in more detail with respect to FIG. 11.

FIG. 11 shows an illustrative flow diagram of selecting one or more devices to play the voice response to the voice command according to aspects described herein. At block 1102, a computing device (e.g., NMD, playback device, control device, computing device) can determine whether to use a predetermined response device or dynamically select a response device to play the voice response. A predetermined response device may be determined during initial system setup or configuration (e.g., assignment, pairing, bonding) when adding new devices to system 500. For example, initial setup or configuration may be to add a new playback device to system 500 and/or to add or assign a new NMD to a zone (e.g., default zone). The predetermined response device may be selected by the user and/or automatically selected by the system 500. A response device may be dynamically selected based on various information such as pairing information (e.g., pairing dependent on location of a user, pairing dependent on location of microphone device) and/or capability information (e.g., available sensors, available devices, available networks, available processing power).

The decision of whether to use a predetermined device or to dynamically select an audio response device may be based on the capabilities of system 500 to dynamically select a response device and/or for an efficient determination of the response device. Certain devices and/or hardware may be used in order to make a dynamic selection, and if the certain devices and/or hardware are not available to participate in the dynamic selection, system 500 may default to using a predetermined response device. For example, the system 500 might not have the capability to determine location information related to the user's position and/or the position of a microphone device (e.g., NMD, PBD, CR) receiving or having responsibility of processing a voice command spoken by the user, and/or the system 500 might not have previously determined location information of devices in system 500. In such an example, a determination to use a predetermined device may be the most expedient avenue to provide the user with an immediate acknowledgement or response to the voice command.

In some instances, location information may be determined or processed by transmitting information detected by devices in the system 500 to cloud network 502 for processing via communication paths 542, 544, and/or 546. Cloud network 502 may possess more processing power than the devices NMD 512, 514, 516, CR 522, and PBD 532, 534, 536, 538. In the event the cloud network 502 is not available, the system 500 may use one of the predetermined devices and may defer to a user's preferences stored in a user profile for the specific predetermined device (e.g., default response device) to speak or play an audio response. In some aspects, the location information may be processed locally by one or more of the NMDs, CRs, PBDs.

If the system 500 has determined at block 1102 to select one or more predetermined response devices to play the audio response to the voice command, method 1100 may proceed to block 1104. If the system 500 has determined at block 1102 to dynamically select one or more response devices to play the audio response, method 1100 may proceed to block 1106.

At block 1104, a processing device (e.g., any of the plurality of devices 500) may determine which one or more predetermined devices to select. For example, a user may designate one or more devices to play the audio response to any voice command during initial setup or configuration (e.g., assignment, pairing or bonding), and the user designation may be saved as a default setting in a user profile associated with the user. The user profile may be stored in any device of the plurality of devices 500. In response to receiving a voice command, the receiving device or any other device in system 500 may retrieve the user profile stored locally or in another device to determine which predetermined speaker(s) to use as the device (s) to play the audio response to the voice command.

In one example, a network microphone device may include a speaker, and the speaker of the networked microphone device may be used to play the voice response.

In another aspect, a speaker in an audio response device (e.g., NMD(s), playback device (s), control device) may be configured during initial setup with the NMD to play audio responses. For example, a user may select a particular device in the default zone to be a default response device. In other instances, the default zone may include one playback device, and the one playback device may be identified as the default response device.

In some aspects, the NMD may be usually stationary such that a relative location may be configured during initial setup. In one aspect, a user may identify a response device nearest to the NMD. The response device may be part of the default zone or another zone. In another aspect, the response device nearest to the NMD may be identified automatically by nearby responses devices and/or the NMD. For example, proximity detection may be performed using the microphone (s) of the nearby response devices and/or NMD. For example, one or more playback devices in the default zone may emit or play a predetermined tone. The predetermined tone may be played at the same power level or volume at each playback device. The microphone (s) of the NMD may receive the test tone and determine based on highest power level which playback device is closest to the NMD.

In some aspects, the default response device may be determined based on orientation of the playback devices relative to the NMD. For example, playback devices which are facing towards the NMD may have higher priority for the default response device over a playback device which is physically nearer to the NMD. Similar to using a test tone to determine a nearest playback device, a test tone picked up by the microphone (s) of the NMD may be used to determine orientation of playback devices relative to the NMD. The NMD may pick up or detect a tone played from a playback device positioned so that speakers or facing towards the NMD more loudly or at a higher power than a speaker directed away from the NMD. Other techniques for proximity or location determination are possible including those described herein.

As another example, all playback devices may be selected to play the audio response to the voice command. For example, all playback devices in a default zone (e.g., zone to which the NMD is assigned) may play any or all audio responses which are responsive to an audio or voice command.

After determining one or more predetermined response devices, the method may proceed to block 808 and determine whether the default zone is grouped with another zone. The default zone may be grouped with another zone for synchronous playback of media items (e.g., audio content, video clips, radio).

Returning to block 1106, the system 500 may dynamically select one or more response devices to play the audio response to the audio command. The dynamically selected audio response device (s) may be selected based on pairing information (e.g., NMD dynamic pairing based on user location and/or device location) and/or context information (e.g., orientation of user).

As discussed above, a NMD may be paired or assigned to a zone or a device. The dynamically selected audio response device may be the device to which a NMD is paired where the pairing between the NMD and another device may change dynamically based on (e.g., change in response to a change in) a user's location which can be determined at any time, in response to a particular event (e.g., user requests a particular zone) and/or a location of the NMD relative to another device (e.g., NMD, PBD, CR). For example, at the time voice command is received or at the time the audio response is to be played to the user. The user's location may be determined using one or more of the plurality of devices 500. For example, microphones in two or more different devices of the plurality of devices 500 may be used in determining the location of the user relative to the two or more different devices. Two or more different devices may be listening for a user's voice and determine a closest speaker by comparing a magnitude (e.g., volume, power level) of the user's voice. As an example, a first device (e.g., PBD 532) and a second device (e.g., PBD 534) may be located in the same zone as the user, and the microphones of these playback devices may be able to pickup the user's voice command. The devices may be able to record and/or analyze the user's speech or voice when the user speaks the voice command. The recording may be done by any of the devices 500 which include a microphone (e.g., NMD, PBD CR), and the analysis may be done by any of the devices of the plurality of devices 500. The analysis may include receiving the recorded user's speech or voice from one or more other devices and comparing based on timestamp and/or by spoken word and/or by syllable of the user's speech. In some aspects, the comparison may be performed after each word, syllable, and/or phrase and need not wait until the user has completed speaking the voice command.

The recording or analysis of the user's speech may by one or more device may be initiated by another device. For example, a NMD or other device containing a microphone (e.g., CR, PBD) may always be listening for a voice command, and when the NMD or other microphone device detects that the user has started speaking a command, the NMD may alert other microphone devices (e.g., NMD, CR, PBD) to begin receiving, recording, and/or analyzing the user's voice command by transmitting an alert (e.g., message) over a communication connection (e.g., 542, 544, 546) to other microphone devices which may or might not be in the same zone as the NMD.

Similarly, the analysis of the user's speech may be used to determine a user's orientation relative to the speaker. For example, a user may be facing towards a first speaker and have a second speaker directed to the user's back. In some instances, the system 500 may select the first speaker to play the audio response even though the user is closer to the second speaker since it may be desirable to have a speaker in front of the of user play the audio response rather than a speaker behind the user. A microphone in a device (e.g., PBD, CR, NMD) in front of the user may pick up or detect a user's voice more loudly or at a higher power than a microphone in a device (e.g., PBD, CR, NMD) to the side or behind the user.

In some aspects, location information can include location of the microphone device (e.g., NMD, PBD, CR) relative to a speaker. For example, one or more playback device in the default zone may emit or play a predetermined tone. The predetermined tone may be played at the same power level or volume at each playback device. The microphone (s) of the NMD may receive the test tone and determine based on highest power level which playback device is closest to the NMD.

In some aspects, NMD 512 may include a microphone array 606. Using the microphone array 606, the NMD may be able to generally identify direction, distance, and/or orientation of the user by determining which microphone of microphone array 606 detects the loudest volume or highest power of the user's voice. In some aspects, the system or NMD 500 may have previously determined relative positions of playback devices and/or been programmed with relative positions of the playback devices, and the NMD may be able to use the microphones of the playback devices in combination with its own microphone (s) to determine general direction, distance, and/or orientation of a user using the user's voice when the voice command is spoken. Each determination of the user's location may be stored in one or more of the devices 500 and may be referenced in response to later voice commands for a quicker determination of a user's location and/or orientation.

In some aspects, the NMD may become unpaired with a zone and re-paired with the zone. Such an unpairing may occur if the NMD leaves the environment associated with the media playback system (e.g., leaves the home environment, leaves the zone), moves outside of the range of a communication path (e.g., communication path 542, 544, and/or 546) (e.g., moves outside of wireless signal range of the communication paths), and/or disconnects from the communication path (e.g., disconnects from a network, logs out of a system or service, disables a communication interface, enters airplane mode). The NMD may later re-pair with the zone, for example, if the NMD returns to the environment associated with the media playback system (e.g., re-enters the home environment), returns to within range of a communication path (e.g., moves into wireless signal range of the communication paths), and/or reconnects to the communication path (e.g., establishes connection to a network, enables a communication interface, exits airplane mode).

As an example, a user may be carrying the NMD and may remove the NMD from the premises of the user's home. Consequentially, the NMD may lose connection with a zone or device to which the NMD was paired. The NMD may store this last-known connection or pairing and automatically attempt to re-connect or re-pair with this last-known connection or pairing upon returning to the user's home. In some aspects, the NMD may dynamically pair based on location information as described herein, and the dynamic pairing may occur automatically by the NMD once the NMD determines that the NMD is able to pair with a zone or device.

Any voice commands spoken by the user and received by the NMD while the NMD is unpaired may be processed and/or executed immediately or queued for processing and/or execution upon re-pairing, and any audio responses to the voice commands may be played on a dynamically selected device as described herein. For example, the user may play a playlist outside of the home and speak a voice command to continue playing the same playlist after returning home. The NMD may begin the processing of the voice command (e.g., begin processing locally, transmit to another device in system 500 for processing) prior to the user entering the home, prior to re-pairing with any devices or zones in the home, after entering the home, or after re-pairing with any devices or zones in the home. The audio response to the voice command may be played by the first zone or device with which the NMD is paired which may be according to dynamic pairing aspects described herein. The same unpairing and re-pairing features may apply to a user or NMD moving between different zones. In shifting the pairing between different zones or un-pairing and re-pairing with a particular zone or device, state information of currently playing content or last-played content may be transferred with or separately from the pairing procedure.

In some instances, the voice command may include a particular zone in which to execute a command (e.g., play music in the Kitchen). In response to the request in the voice command of a particular zone (e.g., Kitchen), the NMD can automatically change its pairing to the Kitchen zone. A request for a particular zone in the voice command may override dynamic pairing selections that the NMD may have otherwise made based on the detected location of the user or NMD.

Other techniques to determine location information related to a user or other device are described in U.S. patent application Ser. No. 13/340,126 filed Dec. 29, 2011 issued as U.S. Pat. No. 9,084,058, U.S. patent application Ser. No. 13/536,250 filed Jun. 28, 2012 issued as U.S. Pat. No. 9,225,307, U.S. patent application Ser. No. 13/568,993 filed Aug. 7, 2012 issued as U.S. Pat. No. 8,930,005, U.S. patent application Ser. No. 13/777,780 filed Feb. 26, 2013 issued as U.S. Pat. No. 9,195,432, U.S. application Ser. No. 14/475,191 filed Sep. 2, 2014, and U.S. patent application Ser. No. 14/681,735 filed Apr. 8, 2015, which are all incorporated by reference in their entireties.

The method may proceed to block 1108 to determine whether the default zone is grouped with an additional zone as discussed above. If the default zone is not grouped with another zone, the system 500 can cause the selected one or more response devices to play the audio response at block 1110. The audio response may be generated or stored in the device playing the audio response and/or the audio response may be transmitted from any other device in system 500 over any of communication paths 542, 544, 546 to the device playing the audio response. The audio response may be received in message from other devices and/or the selected response device (s) may receive a message from a device processing the voice command (e.g., any device in system 500) containing an identifier that corresponds to the particular audio response to play.

In some aspects, the system may determine that the default zone is grouped with another zone and proceed to block 1112. For example, the default zone and the additional zone grouped with the default zone may be playing audio content synchronously (e.g., playing the same audio content simultaneously in sync). While receiving the voice command processing the voice command, and/or playing the audio response to the voice command, playback of currently playing media items or audio content (e.g., songs, playlist, radio station, video) may continue uninterrupted while the audio response is played from device (s) of the default zone. Meanwhile, any media item or audio content which is to be played as a result of an audio or voice command may be played in the default zone in addition to any other zones grouped with the default zone. For example, the voice command may be a request to play a particular song, and while the voice command is processed and the song is requested, audio playback of any currently playing audio content may continue while audio responses are played by the dynamically selected or predetermined response device (s). Once the voice command is processed and the requested identified and retrieved, playback by all playback devices of the default zone and any zones grouped with the default zone may change to the requested song.

In some aspects, more than one audio response may be provided for a single voice command. For example, a first audio response may be played in response to a device of the plurality of devices 500 receiving a voice command to provide acknowledgment or notification to the user that the voice command has been received, and a second audio response may be played in response to processing and/or completion of processing of the voice command. The first audio response and second audio response may be played on any combination of one or more predetermined devices or dynamically selected devices. For example, a user may speak a voice command of playing to play a "Top 40 Playlist," and a default audio response device may play a first audio response (e.g., tone, ringtone, notification sound, sound clip) indicating that the voice command has been received by a NMD (e.g., NMD associated with the default zone). In response to receiving an indication that the voice command is being processed or processing is complete, a second audio response, such as "The Top 40 Playlist is now being played," may be generated and/or received. The second audio response may be played on a dynamically selected device. The various blocks of FIGS. 10 and 11 may be repeated, as needed, for additional audio commands and/or audio responses.

V. Example Systems and Methods for Room-Corrected Voice Detection

Some embodiments described herein relate to providing to a network microphone device acoustics of an environment in which the network microphone device operates. The network microphone device may use the acoustics of the environment in interpreting voice input received by the network microphone device.

The network microphone device may be a device which receives voice input, e.g., speech, via a microphone array and performs a function based on the voice input. For example, the network microphone device may receive a voice command. The network microphone device may interpret the voice command that is received. Then, the network microphone device may perform a function based on the voice command. As an example, the network microphone device may receive a voice command "Play "Track 1' by 'Artist 1' from 'Streaming Service 1', determine that the voice input is a command to play audio content, and then facilitate playing the requested track 1 of audio by 'Artist 1' from 'Streaming Service 1'. Other arrangements are also possible.

The environment in which the network microphone device operates may have certain acoustics. The acoustics define how sound travels within the environment. The acoustics of an environment may be determined in many ways. As one example, a playback device with a speaker and microphone may output test tones via the speaker, receive the test tones via the microphone, and analyze the received test tones to determine the acoustics of the environment. In another example, another network device (such as a control device, a first playback device, or even the network microphone device itself) may include a microphone that receives test tones output by the speaker of a second playback device, and analyzes the received test tones to determine the acoustics of the environment. The test tones may be audio sounds at different frequencies. These acoustics may be stored on the playback device or on a computing device in a communication network for use by the playback device in the playback of audio content.

In other examples, the acoustics may be inferred based on known characteristics of the environment such as a size of the room, height of the ceiling of a room, and furniture in the room. A database may store acoustics for rooms with different characteristics. The acoustics stored in the database may have been determined based on a previous analysis of the room with the particular characteristics. A user may input the characteristics of the room and the database may output the acoustics of the environment. The acoustics may also be stored for use by the playback device on the playback device itself or also in the database.

U.S. patent application Ser. No. 14/481,511, entitled "Playback Device Calibration", Ser. No. 14/216,306 entitled "Audio Settings Based on Environment", Ser. No. 14/805,140 entitled "Hybrid Test Tone for Space-Averaged Rom Audio Calibration Using a Moving Microphone", and Ser. No. 14/825,961 entitled "Multi-Channel Pairing in Media System", and U.S. Pat. No. 9,106,192 entitled "System and Method for Device Playback Calibration" also describe various examples for calibration of playback devices, the contents of which are each herein incorporated by reference in their entirety.

The network microphone device may typically process voice input via a microphone response. The microphone response is an indication of sensitivity of the microphone with respect to frequency. In embodiments, the network microphone device may also use the acoustics of the environment to process the voice input to correct for distortions in the voice input. This way the voice input can be better interpreted.

The playback device may provide the acoustics of the environment to the network microphone device. As a media playback system may have a plurality of playback devices, the playback device that provides the acoustics may be that which is closest to the network microphone device. As another example, the playback device that provides the acoustics may be that which is a same zone. In some instances, a playback device may be bonded (grouped or paired) with the network microphone device. The bond may indicate that the playback device and the network microphone device are in close proximity to each other, such as in a same room or zone, and/or playing content in synchrony. When the network microphone device is bonded with a playback device, the network microphone device may be arranged to receive the acoustics of the environment from the bonded playback device. Moreover, if the network microphone device is moved and bonded to another playback device, the other playback device it is bonded to may provide new acoustics for the environment which the network microphone device is in.

The network microphone device may use the acoustics of the environment in which it is in to improve its operation. For example, the network microphone device may define a filter based on the acoustics. The network microphone device may apply the filter to the voice input received by the network microphone device to correct for the acoustics of the environment, e.g., spectral, spatial, and temporal distortions in the voice input. This way the voice input can be better interpreted.

In many situations, the network microphone device may be placed in proximity to a media playback system. The media playback system may include a plurality of playback devices that play back audio content. These playback devices may be distributed in various locations within a home, and these locations may be referred to as zones such as a bedroom or living room of the home. As a result, the network microphone device may need to interpret voice input in the presence of audio content such as music also being played back by the media playback system.

In some situations, the playback device may provide to the network microphone device an indication of the content being played back such that the network microphone device may apply not only the filter to the voice input to correct for the acoustics of the environment but also use the audio content being played back to better isolate the voice input.

Additionally, or alternatively, the network microphone device may be capable of determining directionality of the voice input. The directionality may define a direction from which the voice input comes from. This directionality may be provided to the media playback system. The media playback system includes a plurality of speakers. The media playback system may use this directionality to adjust the audio output of the plurality of speakers. For example, the media playback system may direct the audio sound produced from one or more playback devices also in the direction of where the voice input comes from. This may be where a listener is located. Other arrangements are also possible.

In many situations, the network microphone device may be placed in proximity to a playback device. For instance, the playback device may be placed in the same room as a network microphone device.

Embodiments described herein involve providing to a network microphone device acoustics of an environment in which the network microphone device operates. The environment may be a room of a home, such as a bedroom or living room. The acoustics of the environment may define how sound travels in the room. The acoustics of the environment may be used by the network microphone device in order to interpret voice input spoken to the network microphone device.

The acoustics are typically defined by surfaces in the environment. For example, hard surfaces in a room may reflect sound. On the other hand, soft surfaces may absorb sound. The presence and arrangement of these different types of surfaces in the environment will affect the acoustics of the room and the ability of the network microphone device to interpret the voice input.

The network microphone device may need to accurately recover voice input spoken in view of these acoustics. Additionally, in some instance, audio content may be simultaneously played back by the playback device at the same time that the network microphone device receives a voice input. The knowledge of the acoustics of the environment and/or content playback may be used by the network microphone device to interpret the voice input.

FIGS. 12-16 present embodiments that can be implemented within the disclosed operating environment. Methods and the other process disclosed herein may include one or more operations, functions, or actions. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, each block in the figures may represent circuitry that is wired to perform the specific logical functions in the process.

Figure 12:
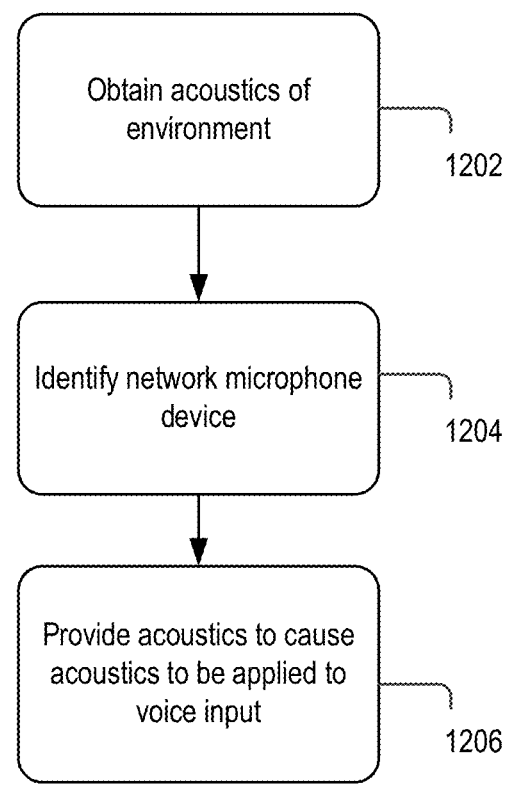
FIG. 12 is an example flow diagram related to providing acoustics of an environment to a network microphone device.

FIG. 12 is flow chart of functions that may be performed to improve interpretation of voice input received by the network microphone device. In some examples, one or more of these functions described may be performed by a playback device. In other example, computing device such as 504-508 may also perform one or more of these functions in conjunction with the playback device or instead of the playback device. The computing device may be associated with a playback device and perform processing associated with the playback device.

At 1202, acoustics of an environment may be obtained. The acoustics may be associated with an environment in which in a playback device is operating. The acoustics may have been determined in a variety of ways. For example, a playback system may have already determined the acoustics of the environment through some calibration phase. A playback device of a media playback system may have a microphone and speaker. The speaker may output one or more tones and one or more speakers may receive the tone using a respective microphone. The tone may be one or more frequencies of audio. Each of the playback devices may output tones. Based on the tones received by the plurality of playback devices, the acoustics of the environment can be determined. In another example, another network device (such as a control device, first playback device, or even the network microphone device itself) may include a microphone that receives test tones output by the speaker of a second playback device. The other network device may analyze the received test tones to determine the acoustics of the environment, rather than or in addition to a playback device. Other arrangements are also possible.

The acoustics may be defined by a spectral response, spatial response, and a temporal response of the tones. The spectral response may be an analysis of sound energy received at a microphone. The spatial response may be an analysis of a direction of the sound energy received at the microphone. The temporal response may be an analysis of reverberations of sound energy received at the microphone. The playback system may analyze these responses and perhaps also accounting for the direction from where the tones are received to determine the acoustics of the environment. An indication of this acoustic characteristic may be stored on a playback device and/or one or more of the computing devices 504-508.

In another example, the acoustics may be predefined based on known characteristics of the environment such as size of the room, height of the ceiling of a room, and furniture in the room. A database maintained by one or more of the computing device 504-508 may store acoustics for rooms with different types of characteristics. The acoustics stored on the computing device may have been determined based on a previous analysis of the room with the particular characteristics. A user may input the characteristics of the room on the controller device of the media playback system and the controller device may access this database to determine the acoustics of the room. These acoustics may be then provided to the playback device located in the environment or stored on the computing device.

As an example, the acoustics may indicate that a room has a hard surface on a left side, a soft surface on the right side and be a rectangular shape. In essence, the acoustics may characterize the room from an acoustical perspective.

The media playback system may include a plurality of playback devices. Each of the playback devices may have acoustics of the environment in which the playback device operates. At 1204, one or more network microphone devices may be identified. The one or more network microphones device may be in a same environment. In some examples, the playback device which sends the acoustics to the network microphone device may be the playback device that is closest to the network microphone device. In other examples, the playback device which sends the acoustics to the network microphone device may be the playback device that is in a same zone as the network microphone device. The proximity may be indicated during some calibration process during setup of the playback device and/or network microphone device. For example, the network microphone device may send an indication of its presence to the playback device. This presence may be indicated by a state variable in the playback device. The playback device may access this state variable to identify the network microphone device. Similarly, the network microphone device may have a similar state variable that identifies presence of the playback device.

In other examples, a playback device of the media playback system may be bonded (paired or grouped) with the network microphone device. The bond may also indicate that the playback device and the network microphone device are in close proximity to each other, such as in a same room or zone, or playing audio content in synchrony. The bonding between a playback device and network microphone device may be similar in some respects to how playback devices may be bonded. This bonding may be reflected in the state variable stored by the playback device. When the network microphone device is bonded with a playback device, the playback device may be arranged to identify network microphone device. Moreover, if the network microphone device is moved and bonded to another playback device, the state variable in the other playback device may be updated to reflect the bonding with the network microphone device. Similarly, the network microphone device may update its state variable to reflect presence of the new playback device.

In some examples, the bonded playback device and network microphone device may use various networking techniques to reduce the latency between themselves. For example, a local rather than WAN network connection (LAN or Bluetooth) may be used for communication. As another example, communications might revert to a different frequency range in the local network, e.g., switch from a "typical" 2.4 Ghz communication to a 5 Ghz communication while the playback device is bonded to the network microphone device. As yet another example, communications might switch to a reserved channel on either the 2.4 or 5 Ghz spectrum or other network traffic may be reduced when the playback device and network microphone device is bonded, e.g., the playback device might stop serving as a relay node for other network traffic. Other arrangements are also possible.

At 1206, the acoustics may be provided to cause the acoustics to be applied to voice input. In one embodiment, the acoustics may be sent as a message from the playback device over one or more of the communication network 546 to the network microphone device. In other embodiments, the playback device may cause the acoustics on a computing device to be sent to the network microphone device via communication link 542. In still other embodiments the acoustics may be on a computing device associated with the playback device and the playback device may cause the computing device associated with the network microphone device to have access to the acoustics. Other arrangements are also possible.

In some embodiments, the playback device might not need to provide the acoustics to the network microphone device. Instead, the network microphone device may be able to retrieve the acoustics from the computing device, itself. The network microphone device may provide an indication of the playback device in proximity to it (bonded, paired, or otherwise) and the computing device may provide the acoustics for the environment. Other arrangements are also possible.

The network microphone device may typically process voice input via a microphone response. The microphone response is an indication of sensitivity of the microphone with respect to frequency.

In embodiments, the network microphone device may apply acoustics to the voice input that it receives to correct for distortions in the voice input. This way the network microphone device may be able to better interpret the voice input. The network microphone device may apply this acoustics itself and/or offload processing to the computing device in which case the processing on the network microphone device may be cloud-based.

The network microphone device may define a filter based on the acoustics in applying the acoustics to the voice input. The filter may include the spectral, spatial, and temporal responses of the environment. The network microphone device may apply the filter to the voice input received by the network microphone device to correct for distortion prior to interpreting the voice input. The filter may be determined based on the following derivation:

$$Xa(w) \times P(w) \times h(w) \times m(w) = Ya(w)$$

Where Xa is a calibration tone, P is a speaker response of the playback device, h is a room response (e.g., acoustics of the room), m is a microphone response, and Ya is a processed response which may be the received tone corresponding to the tone sent during a calibration process. The symbol x represents a convolution function in a frequency domain. As Xa, P, m, and Ya are known, the room response (e.g., filter) may be calculated as:

$$h^{-1}(w) : Xa(w) \times P(w) \times m(w) = Ya(w) \times h^{-1}(w)$$

Then, if a voice input Yb is received, the room response h (e.g., filter) may be applied to determine the voice input Xb as:

$$Xb(w) = Yb(w) \times h^{-1}(w) \times P^{-1}(w) \times m^{-1}(w)$$

In some embodiments, the playback system may determine the acoustics of the environment periodically to account for changes in the environment. In this case, one or more playback devices may perform the operations 1202-1206 periodically such that the network microphone device may apply current acoustics to the received voice input to properly interpret it.

Figure 13:
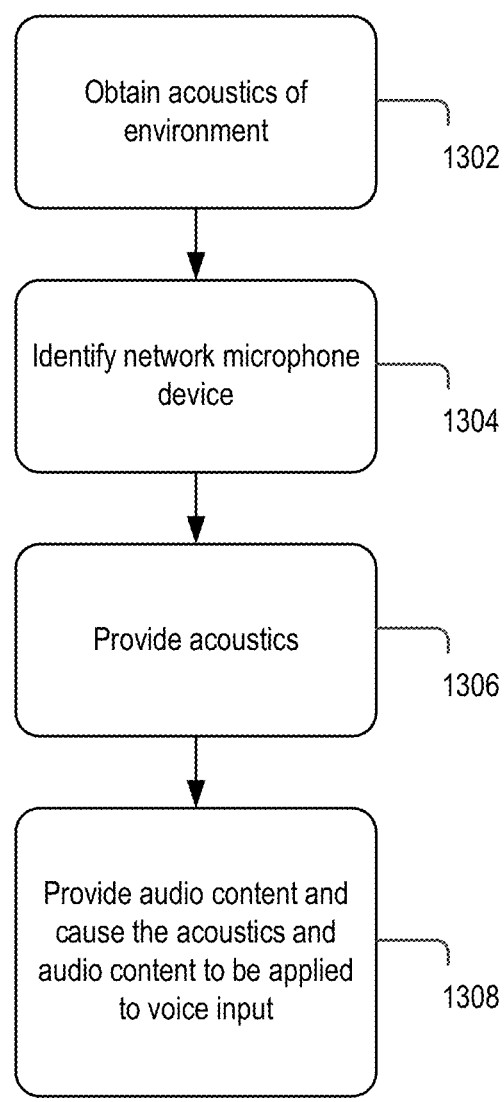
FIG. 13 is another example flow diagram related to providing acoustics of an environment to a network microphone device.

FIG. 13 is another flow chart of functions that may be performed improve recovery of voice input by the network microphone device. In some examples, one or more of these functions described may be performed by a playback device. In other example, computing device such as 504-508 may also perform one or more of these functions in conjunction with the playback device or instead of the playback device. The computing device may be associated with a playback device and perform processing associated with the playback device.

At 1302, acoustics of the environment may be obtained, at 1304, a network microphone device may be identified, and at 1306, acoustics may be provided. The acoustics may be provided to a network microphone device and/or computing device associated with the network microphone device.

In some situations, the network microphone device may be operating in an environment where the media playback system is also playing back audio content. The network microphone device may receive voice input while the audio content is also being played.

At 1308, audio content may be provided. The audio content may be provided to the network microphone device and/or computing device associated with the network microphone device. The content may be, for instance, a stream of the music being played by the playback device. A playback device may provide the audio content to the network microphone device which is proximate to the network microphone device, in a same zone as the network microphone device, or that which may be bonded (or grouped) to the network microphone device. In some embodiments, the content may be provided to the network microphone device by way of the computing device, for instance, when processing by the network microphone device is cloud-based. In yet other embodiments, the content may be provided to the computing device associated with the network microphone device by way of the computing device associated with the playback device, for instance, when processing by the network microphone device and/or playback device is cloud-based.

At 1308, the acoustics (and optionally audio content) may be applied to the voice input. For example, the network microphone device (or computing device associated with the network microphone device) may apply a filter to voice input received by the network microphone device to interpret the voice input. For example, the network microphone device (or computing device associated with the network microphone device) may use the audio content being played back along with the voice input to as to better isolate the voice input. For purposes of interpreting the voice input, the audio content being played by the playback device may be effectively noise. In this regard, the audio content may be subtracted out from the received voice input so as to better isolate the received voice input.

Figure 14:
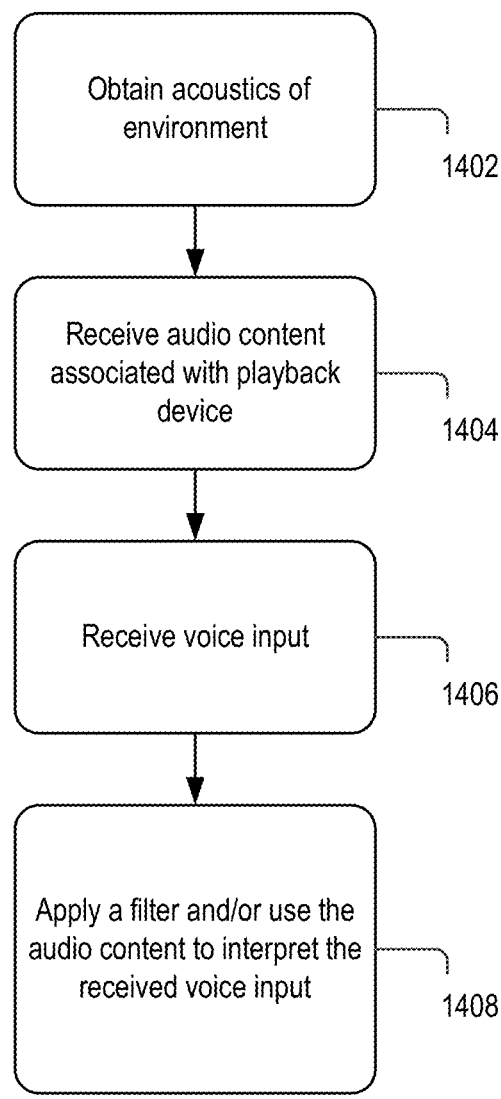
FIG. 14 is an example flow diagram related to interpreting voice input received by the network microphone device.

FIG. 14 is a flow chart of functions performed by the network microphone device and/or associated computing device in interpreting voice input. At 1402, an indication of the acoustics of the environment may be obtained. At 1404, the the audio content being played by a playback device may also be optionally received. The playback device may be in a same zone, in the presence of the network microphone device, or bonded to the network microphone device. At 1406, voice input may be received, e.g., by the network microphone device. The voice input may be a voice command. The network microphone device might know it has received voice input through some button press on the network microphone device or command word in the voice input indicative of it being a voice input. At 1408, one or more of a filters and/or the audio content being played by the playback device may be applied/used to interpret the received voice input.

Figure 15:
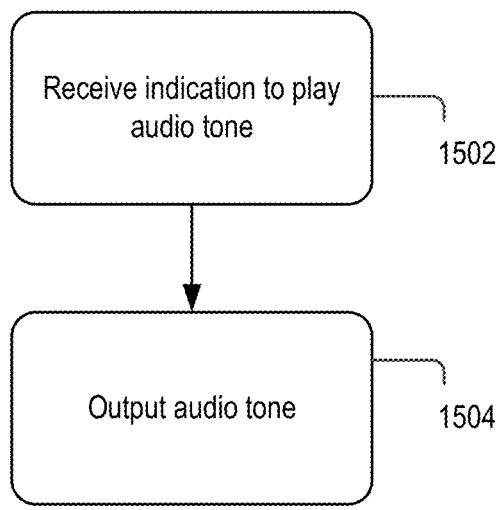
FIG. 15 is an example flow diagram related to determining acoustics of an environment.

FIG. 15 is a flow chart of functions to enable the network microphone device to determine the acoustics of an environment rather than this being provided by the playback device, for instance. The functions may be performed by the playback device and/or computing devices associated with the playback device.

The network microphone device may send an indication for one or more playback devices to play a tone. The playback devices that the network microphone device sends the indication to may include those playback devices in proximity to the network microphone device and/or those playback devices that are bonded (or grouped) to the network microphone device or in the same zone.

At 1502, an indication may be received to play an audio tone. The indication may be received from the network microphone device or computing device associated with the network microphone device. In response, at 1504, an audio tone may be output by the playback device. The network microphone device may receive the tone using the microphone array 606. The microphone array 606 may provide an indication of a magnitude of the tone. Additionally, the microphone array 606 may provide an indication of a direction of the tone. The direction may be determined based on receiving tones from a plurality of playback devices. Based on receiving tones from a plurality of playback devices, the network microphone device and/or associated computing device may then determine the acoustics of the environment. This way the network microphone device may not need to obtain this acoustics from a playback device.

The microphone array 606 may enable the network microphone device to determine a direction from where voice input is coming from. This direction could be used by a playback device to improve playback of audio content. For example, the media playback system may direct the audio sound produced from one or more playback devices in the same direction from where voice input comes from. This may be where a listener is located. Other arrangements are also possible.

Figure 16:
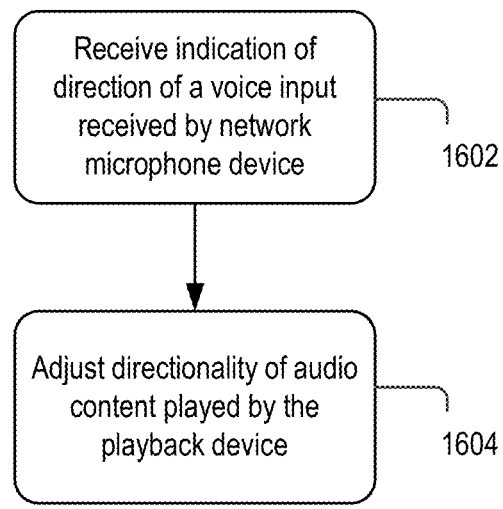
FIG. 16 is another example flow diagram related to applying directionality to audio content played by a playback device.

FIG. 16 is a flow chart of functions performed by the playback device and/or associated computing device associated with using directionality determined via the network microphone device.

At 1602, an indication of a direction may be received. This may be received from the network microphone device and/or associated computing device. The direction may indicate where the network microphone device received voice input and therefore where a user may be located in the environment. The playback device may have a plurality of speakers whose output may be controlled to affect directionality of audio content played back by the playback device. At 1604, the playback device may use this directionality to adjust audio output of the plurality of speakers. The audio output may be playback of music content. The playback device may adjust phase of the audio signals output by the speakers to produce directionality in the audio output in accordance with the directionality indicated by the network microphone device. In this regard, the audio content might be directed to the user and therefore improve the listening audio experience. Additionally, or alternatively, the playback device might also adjust a magnitude of the audio output (e.g., volume). The network microphone device in some instances might also produce audio output. The audio output may be a voice response to the voice input or some type of other sound such as a beep or tone. Still additionally, or alternatively, the directionality may be used by the playback system to identify a playback device that might be suited for outputting this audio output instead of or in addition to the network microphone device. For example, the identified playback device might be directly in front of a listener, making it easier for the listener to hear the audio output. Other arrangements are also possible.

Methods and the other process disclosed herein may include one or more operations, functions, or actions. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, each block in the figures may represent circuitry that is wired to perform the specific logical functions in the process.

VI. Example Systems and Methods for Content Mixing

Some embodiments described herein involve, inter alia, adjusting a volume for audio content played back by a playback system when content different from the audio content is output by a network microphone device or by the playback system.

The network microphone device (NMD) may be a device which receives voice input via a microphone array and outputs content via a speaker. The voice input may be a query, for example, in the form of human speech and the content output may be a response to the query. The voice input may be in the form of human speech and the content output may take a variety of forms including voice output, a tone, an alarm, or music responsive to the voice input. The content output by a network microphone device may be referred to herein as NMD output.

As an example, the network microphone device may receive a voice input spoken as "Who is 'Artist 1' of 'Track 1' from 'Streaming Service 1'. The network microphone device may determine that the voice input is a command, and then provide a voice output in response to the voice input. The voice output may be a spoken response that identifies the Artist (e.g., Prince) queried in the voice input.

In many situations, the network microphone device may be placed in proximity to a media playback system. The media playback system may include a plurality of playback devices that play back audio content. These playback devices may be distributed in various locations within a home, and these locations may be referred to as zones such as a bedroom or living room. The playback devices may be playing back audio content at the same time a network microphone device outputs content. As a result, the content output from the network microphone device might not be heard while the audio content is also playing.

In one embodiment, the playback device may be arranged to decrease its volume to a level below that of a volume that the network microphone device would use when the network microphone device outputs the content. This way a listener may be able to better hear the content output from the network microphone device. The process of decreasing volume of a playback device to below a volume of another content may be referred to herein as ducking.

The playback devices that are ducked may be all of the playback devices in the media playback system. In another example, the media playback devices that are ducked may be a subset of the playback devices. The subset of the playback devices that are ducked may be based on whether the network microphone device is in the same zone or zones. Alternatively, the subset of the playback devices that are ducked may be based on whether the network microphone device is bonded (grouped or paired) with the playback device.

These playback devices which are also playing back audio content may directly impact whether the content output by the network microphone device is heard. For example, if a media playback system has a playback device in a kitchen and in the bedroom and the network microphone device is located in the kitchen, then the kitchen playback device may be bonded with the network microphone device. Both the kitchen playback device and the bedroom playback device may be playing back audio. But when the network microphone device outputs content, the kitchen playback device may be ducked, but the bedroom playback device might not be ducked. But if the environment in which the playback devices is operating is an open area having with different zones, all of the playback devices in the different zones may still be ducked. Otherwise, the content output from the network microphone device may be still difficult to hear in the open area.

In other embodiments, the playback device itself may play back the NMD content. Given that the playback device may also be playing audio content, e.g., music, the playback device may output the NMD content in a variety of ways. As one example, the playback device may be arranged to receive an indication of the NMD content from the network microphone device and mix the NMD content with the audio content played by the playback device. As another example, the audio content being played back may be muted and the NMD content may be output on a playback device. As yet another example, the audio content being played back may be paused and the NMD content may be output on a playback device. Other arrangements are also possible.

In many situations, the network microphone device may be placed in proximity to a playback device 532-538. For instance, the playback device may be placed in the same room as a network microphone device making hearing of the content output difficult when audio content is being played back by a playback device. Embodiments described herein involve, inter alia, adjusting a volume for audio content played back by a playback system when content different from the audio content is output by a network microphone device or by the playback system.

Figure 17:
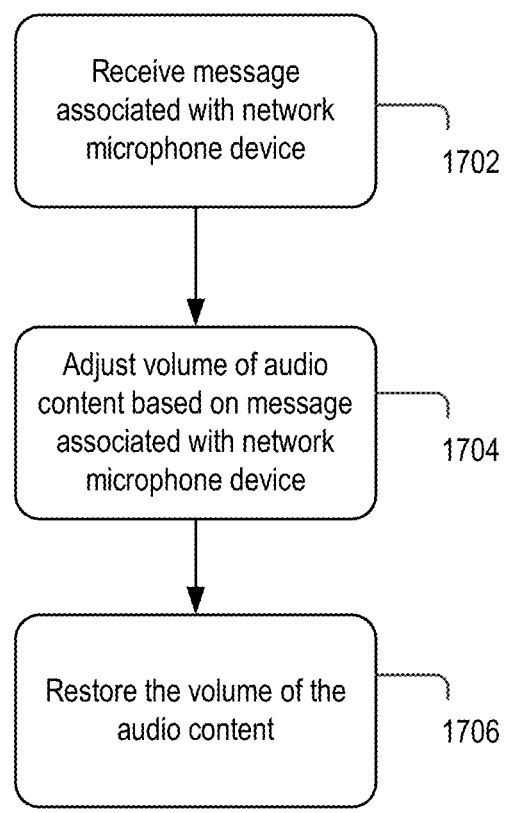
FIG. 17 is an example flow diagram related to a playback device adjusting of volume of audio content in the presence of content output.
Figure 18:
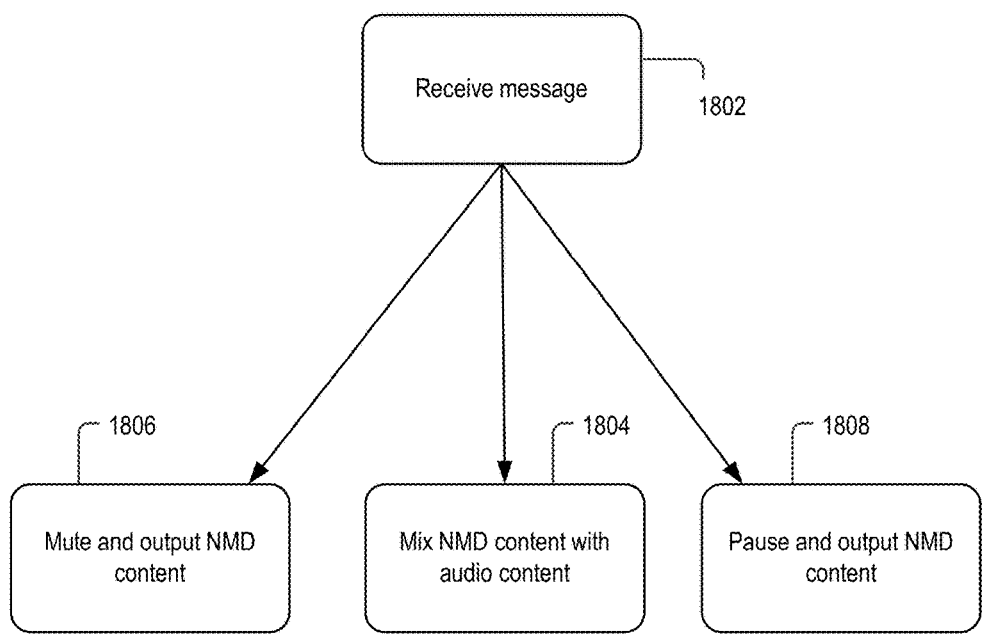
FIG. 18 is another example flow diagram related to playback of content output and/or audio content by a playback device.

FIGS. 17-18 present embodiments that can be implemented within the disclosed operating environment. Methods and the other process disclosed herein may include one or more operations, functions, or actions. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, each block in the figures may represent circuitry that is wired to perform the specific logical functions in the process.

FIG. 17 is a flow chart of functions performed to enable the content output by a network microphone device to be heard while a playback device is also playing back audio content. In some examples, one or more of these functions described may be performed by a playback device. In other example, computing device such as 504-508 may also perform one or more of these functions in conjunction with the playback device or instead of the playback device. The computing device may be associated with a playback device and perform processing associated with the playback device.

At 1702, a message may be received. The message may be associated with a network microphone device. The message may be received from a network microphone device via the communication network 546. Alternatively, the message may be received from a computing device, e.g., 504-508, associated with the network microphone device via communication link 544, 546. Other arrangements are also possible.

The message may be indicative of content to be output by the network microphone device, determined by the network microphone device to be output, and/or determined by the computing device associated with the network microphone device to be output (herein referred to collectively as NMD content). The NMD content may take a variety of forms, examples of which may include voice output, speech, music, a tone, or an alarm. The message may specify that the network microphone device may output content at a particular time defined by a clock reference in common with the playback device and the network microphone device. The message may also specify a duration of the content output by the network microphone device. Other arrangements are also possible for indicating when the network microphone device may output content.

The message may be sent to one or more of the playback devices in the playback system. In some instances, the message may be sent to all of the playback devices in the media playback system. In another example, the message may be sent to a subset of the playback devices. The subset of the playback devices may be based on whether a network microphone device is in the same zone or zones with the playback device.

Additionally, or alternatively, the subset of the playback devices may be based on whether the network microphone device is bonded with the playback device. The bond may indicate that the playback device and the network microphone device are in close proximity to each other, such as in a same room or zone or playing audio content in synchrony. In this regard, these playback devices may directly impact whether the NMD content can be heard over music, for instance, being played by the playback devices.

In some examples, the bonded playback device and network microphone device may use various networking techniques to reduce the latency between themselves. For example, a local rather than WAN network connection (LAN or Bluetooth) may be used for communication. As another example, communications might revert to a different frequency range in the local network, e.g., switch from a "typical" 2.4 Ghz communication to a 5 Ghz communication while the playback device is bonded to the network microphone device. As yet another example, communications might switch to a reserved channel on either the 2.4 or 5 Ghz spectrum or other network traffic may be reduced when the playback device and network microphone device is bonded, e.g., the playback device might stop serving as a relay node for other network traffic. Other arrangements are also possible.

At 1704, the playback device may adjust, e.g., decrease its volume, at the time specified in the message to a level below that of a volume that the network microphone device would use when it outputs content. The volume may be specified in the message received by the playback device or the volume may be already predefined by the playback device. The volume may be reduced for a period of time defined by the duration of the NMD content. The purpose for decreasing the volume may be so that a listener may be able to better hear the content output by the network microphone device while audio content continues to play on the playback device. The process of decreasing volume of audio content as compared to NMD content is known as ducking.

As an example, consider a media playback system with a playback device in a kitchen and in the bedroom and a network microphone device is located in the kitchen. The kitchen playback device may be bonded with the network microphone device. The kitchen playback device and the bedroom playback device may be playing back audio. The bonding may result in the kitchen playback device being ducked but not the bedroom playback device when the network microphone device outputs content.

As another example, all of the playback devices may be in different zones. But the environment in which the playback devices is operating in may be an open area such as a living room and dining room combo space having a living room zone and a dining room zone. In this case, the network microphone device may be aware of the nature of the area (perhaps when the network microphone device was configured). In this case, all of the playback devices may be ducked because the content output by the network microphone device may otherwise be still difficult to hear in the open area.

At 1706, the playback device may then restore a volume of audio content being played back. The volume may be restored, for instance, after the content is output by the network microphone device. The message sent by the network microphone device may indicate a duration of the NMD content. In this regard, the playback device may be able to determine that the NMD content has been output and then restore a volume of the audio content being played back. Alternatively, the network microphone device may send a message to the playback device when the playback device is to restore the volume of audio content rather than the playback device making this determination. In some embodiments, the playback device may store the volume of the content being played back prior to adjustment at 704 so that the volume can be restored.

Instead of or in addition to the network microphone device outputting audio content, the media playback system may output the NMD content. In this case, the network microphone device might not output the NMD content or might output the NMD content in conjunction with the playback device. FIG. 18 is a flow chart of functions that may be performed in playing audio content as well as outputting the NMD content. In some examples, one or more of the functions described may be performed by a playback device. In other example, computing device such as 504-508 may also perform one or more of these functions in conjunction with the playback device or instead of the playback device. The computing device associated with the playback device may perform processing associated with the playback device.

At 1802, a message may be received. The message may be associated with a network microphone device and come from the network microphone device or from a computing device associated with the network microphone device. The message may be received from a network microphone device via the communication network 546. Alternatively, the message may be received from a computing device, e.g., 504-508, associated with the network microphone device via communication link 544. Other arrangements are also possible.

The message may include an indication of NMD content. The indication may be an audio file which defines the content output. For example, the audio file may include digital samples representative of the NMD content. The message may be sent to the playback device that is bonded to the network microphone device and/or all of the playback devices in the media playback system.

The NMD content output on the playback device may be handled in a variety of ways. As one example, at 804, the playback device may be arranged to mix the NMD content with the audio content being played by the playback device, e.g., a song. The playback device may play back audio content at a fixed sample rate. The playback device may mix the audio content with the NMD content by reducing the sampling rate of the audio content and the sample rate of the NMD content so that the playback device may be able to still play back the mixed audio content and NMD output at a same fixed sample rate. During this mixing process, the volume of the audio content and/or NMD content may be adjusted to facilitate hearing the NMD content on the playback device.

As another example, at 1806, the audio content being played back on the playback device may be muted and the NMD content may be output on the playback device. If there are other playback devices 502 also playing the same audio content in synchrony, those playback devices 502 may continue to play back the audio content. When the playback device is done outputting the NMD content, the the playback device may continue to play back the audio content in synchrony with the other playback devices. For instance, a left channel of a speaker may mute and output NMD content and a right channel may continue to play the audio content. The playback device may be able to then continue to play back the audio content by using presentation time stamps in the audio content. The presentation timestamp may indicate timing of playback of the audio content. Based on when the NMD content is output by the playback device and a duration of the NMD content output, the playback device may be able to determine using the presentation time stamps the audio content to start playing after the NMD content is output. During this process, the volume of the audio content and/or NMD content output may be adjusted to facilitate hearing the NMD content output on the media playback system.

As yet another example, at 808, the audio content being played back on the playback device may be paused and the NMD content may be output on a playback device. When the playback device is released from paused, the audio content may be played back at the point where the playback device left off playback. In this case, any other playback devices 502 also playing the audio content in synchrony when the playback device outputs the NMD content may be paused. Again, during this process, the volume of the audio content and/or NMD content output may be adjusted to facilitate hearing the NMD content output on the media playback system.

As noted above, the NMD content output by the playback device may be at a baseline volume. This may be an appropriate volume that may have been previously set for the playback device or indicated in a message by the network microphone device. In some embodiments, the volume of the NMD content output and/or audio content output by the playback device may be adaptively adjusted.

For example, the volume of the NMD content output may be adjusted relative to the volume of the audio content played back by the playback device before and after ducking with respect to the baseline volume. The volume of the NMD content output may be decreased substantially from the baseline volume when the volume of the audio content is ducked substantially. On the other hand, the volume of the NMD content output may change slightly from the baseline volume if the volume of the audio content played back by the playback device is changed slightly. Similarly, the volume of the audio content may be adjusted relative to the volume of the NMD content.

If the network microphone device is outputting the content, then the playback device may send an indication of the determined volume of the NMD content to the network microphone device so that the network microphone device may output the NMD content at that volume. Alternatively, the playback device may send an indication of the volume of the audio content played by the playback device (either before or after ducking) during when the NMD content is output so that the network microphone device may determine the volume of the NMD content output. Other arrangements are also possible.

Accordingly, if the audio content being played back by the playback device is already loud, then the NMD content output may not be loud. Similarly, if the audio content being played back is already soft, then NMD content output may not be soft. Still further, in some embodiments, the playback device or network microphone device might not adjust the volume of the audio content or the volume of the NMD content at all. The volumes may be acceptable such that adjustment is not needed.

Methods and the other process disclosed herein may include one or more operations, functions, or actions. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, each block in the figures may represent circuitry that is wired to perform the specific logical functions in the process.

VII. Example Systems and Methods Relating to Music Service Selection

Some embodiments described herein relate to identifying and accessing suitable streaming services (e.g. streaming audio tracks) based on commands.

Streaming services may be identified and accessed based upon voice commands provided by a network microphone device. The network microphone device may be a device which receives speech via a microphone and performs a function based upon the speech. As an example, the microphone network may receive a voice command "play Pandora® 70's rock radio," determine that the speech is a command play a specific station from a specific streaming service, and then facilitate the playback of the station from that service. In other implementations, the selection of streaming service may be based upon commands input (e.g. textual input) via a user interface of a controller device. Other types of commands are also possible.

In another example, the commands may not explicitly specify which streaming service a user desires to be accessed. For example, a user may issue more generic commands such as "play Queen" or "play 70's rock." In such an instance, existing systems are limited in their ability to distinguish what content type a user desires to be played (i.e. the artist or the album Queen, a 70's rock radio station or a "best of" album.) Additionally, such systems are unable to match a user's intended content type to the content type capabilities of the various streaming services (i.e. which services are capable of playing radio station, artists, albums.)

Given the ever increasing amount of content and number of streaming services available there is a need for a system that is capable of intelligently selecting the desired streaming service that matches the content type to provide to the user based upon the user command.

In embodiments, selection of the streaming services may be accomplished by a network configuration including a plurality of network capable devices. The network configuration may include network microphone devices, playback devices, computing devices and/or controller devices (e.g. tablet, smartphone) receiving, processing, and analyzing commands. The configuration may further involve retrieving and/or requesting audio content from one or more music content servers based on the processing and analysis of the received commands. The audio content then may then be obtained by a network microphone device, controller, and/or any number of playback devices to provide an audio playback experience based on the commands. The network configuration may take other forms as well.

In example implementations, selection of a streaming service based on a command may be determined by a number of criteria, individually or in combination. In one example, the selection of a streaming service may be dependent on the content type (e.g. song, genre, radio station) indicated by the command and whether a particular streaming service supports the indicated content type. In such a case, content type logic may be utilized to correlate the command or portions of the command to content types. The content type (s) identified via the logic may then be mapped to a streaming services having the available content types. Analysis of content types indicated via a command may be performed in various other ways.

In another instance, the selection of a streaming service may be based in part upon a user history which may take into account a user's streaming service preferences. The user preferences may be on a per zone basis, content type most played, among various other. Additionally, various forms of "external" data may be incorporated, including but not limited to, geographic, demographic, and weather type data. Other types of selection influencing criteria may exist.

In addition to selecting a music service to provide audio, the processing of the user command may cause alternate indications to be output. In such examples, the system may output a suggestion of a streaming service capable of playing a content type indicated by a command. In another example, the system may output an indication that "the content is unavailable." Such indications may be output at a network microphone device, controller, or at one or more playback devices via the network microphone device or controller.

In another aspect, the various selection criteria may serve as inputs of an algorithm to determine confidence metrics for various streaming services. A confidence metric may be an indication whether the particular music service is what the user may desire to listen to. For example, the confidence level may be a probability value or percentage (e.g. 1-100) assigned to streaming services. In one example, the streaming service with the highest confidence metric may be provided for streaming. In another instance, an error state may be triggered if the highest calculated confidence metric does not exceed a threshold confidence value or if the top N confidence levels are within a specified range of one another. In such a case, an error state may cause the network microphone device to (1) output an indication that "the content is unavailable," (2) ask the user to repeat/further specify the command, (3) cause audio to be played by a preferred partner or default service, among other possibilities. The confidence metric may be used in a variety of many other manners.

As discussed above, embodiments described herein may involve identifying and accessing suitable streaming services (e.g. streaming audio tracks) based on commands.

Figure 19:
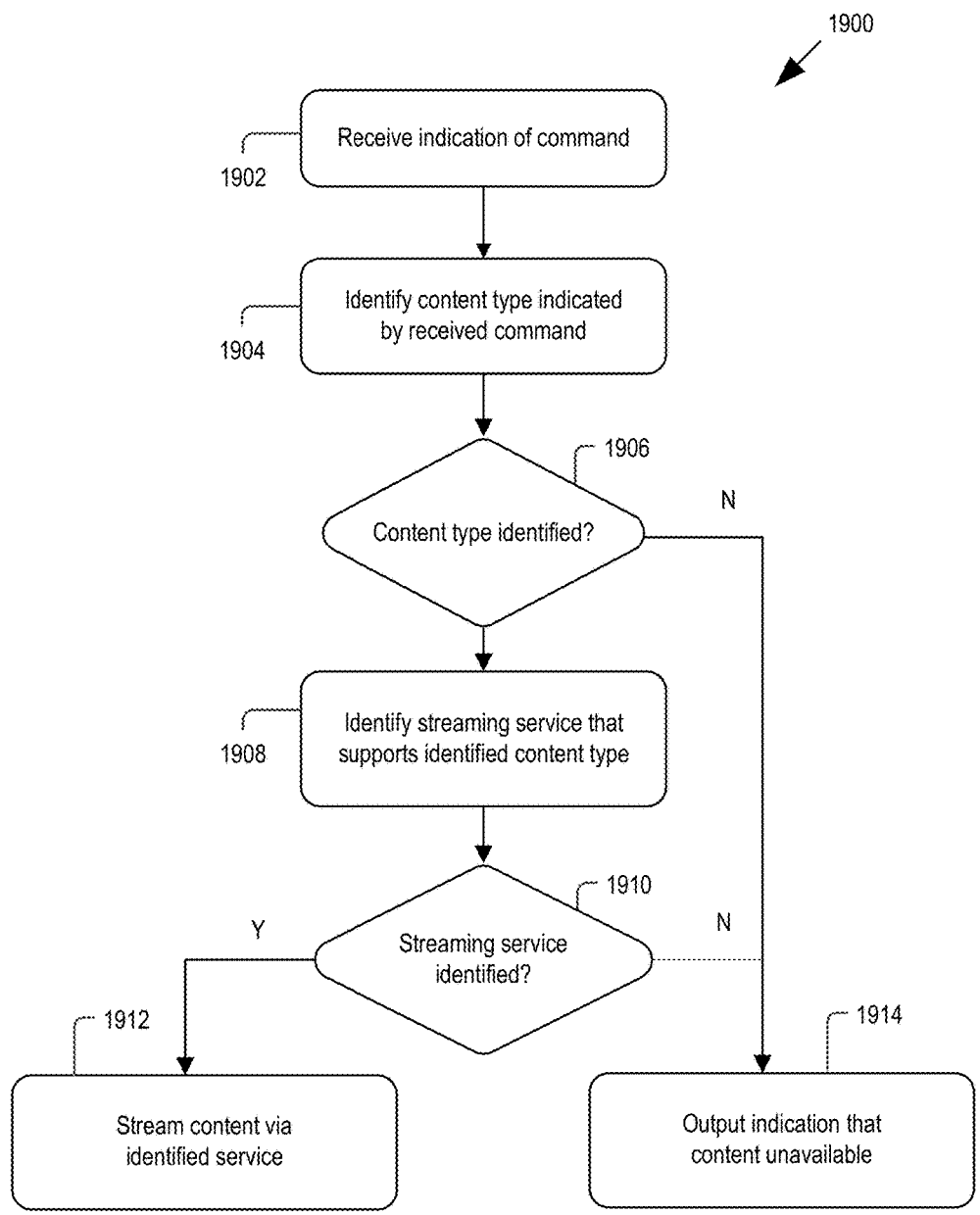
FIG. 19 is an example flow diagram related to identifying a streaming music service via a network microphone device.
Figure 20:
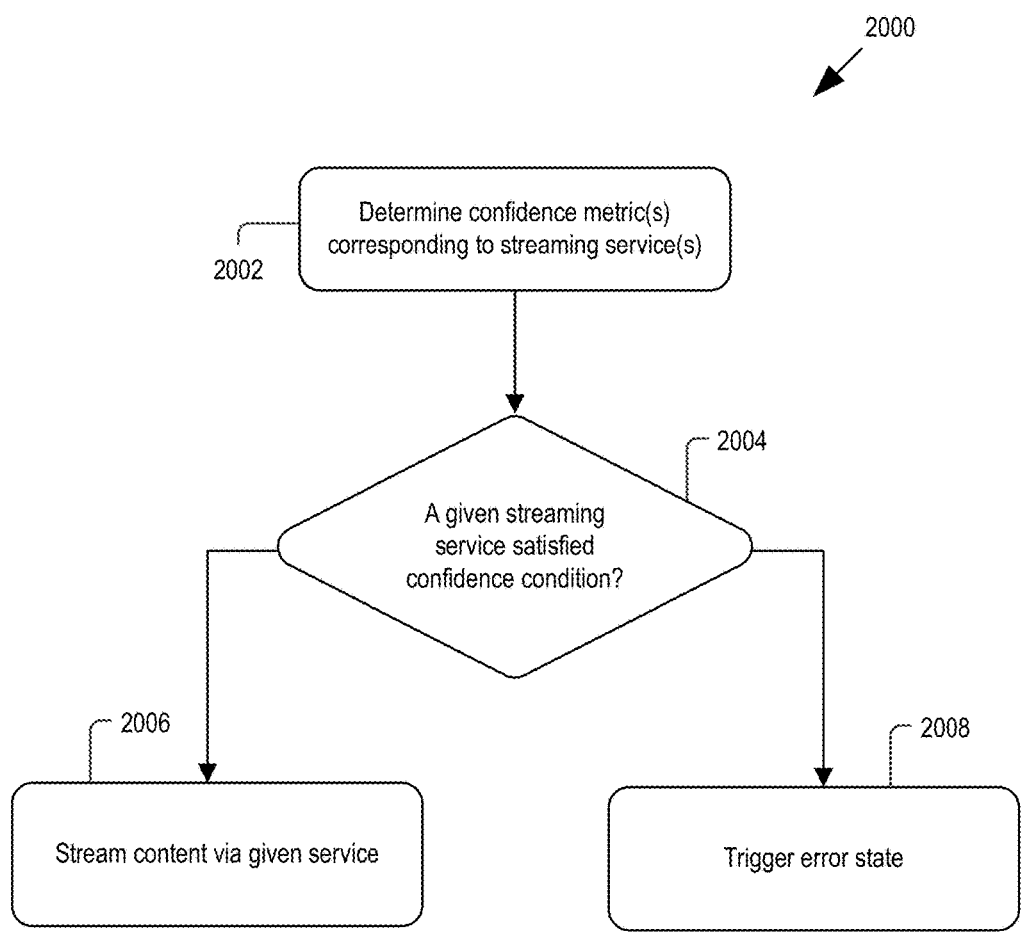
FIG. 20 is another example flow diagram related to identifying a streaming music service via a network microphone device.

Methods 1900 and 2000 shown in FIGS. 19 and 20 present embodiments of methods that can be implemented within an operating environment involving, for example, the media playback system 100 of FIG. 1, one or more of the playback device 200 of FIG. 2, and one or more of the control device 300 of FIG. 3. Methods 700 and 800 may include one or more operations, functions, or actions as illustrated by one or more of blocks 1902-1914 and 2002-2008. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 1900, 2000, and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods 1900, 2000 and other processes and methods disclosed herein, each block in FIGS. 5 and 6 may represent circuitry that is wired to perform the specific logical functions in the process.

FIG. 19 is an example flow diagram related to a process for identifying a music service for streaming.

At 1902, NMDs 512-516 or CR 522 may receive an indication of a command which may indicate audio content to be provided for playback from a streaming service. In some instances, a command received by NMDs 512-516 may take the form of a voice command, whereas a command received by CR 522 may be a textual command input on a user interface.

Typically, the received command may include information relating to one or more audio content types. In some cases, the command may include the name of an artist, song, album, or genre (i.e. "play Led Zeppelin," "play 70's rock".) Additionally, the command may include pre-fix and/or suffix type information (e.g. "best of . . . ," " . . . radio," " . . . playlist") that may be further indicative of content type. For example, a command "play Led Zeppelin radio" may indicate a user's desire to listen to a specific artist's music in a radio format. The received command may include various other forms of information indicative of content type as well.

The received indication of a command at 1902 may be processed in various ways. In one implementation, the processing of a command may be accomplished via cloud network 502. In such a case, a voice command received by NMDs 512-516 may cause the voice input to be transmitted via communication network 546 to one or more of computing device 504-508 for processing. The cloud computing device may convert the voice input to an equivalent text command and parse the text command to identify the command. In another configuration the cloud computing device may only convert the voice input to an equivalent text format and send the equivalent text to a second computing device for parsing and command identification. In other instances, the NMDs 512-516 may convert the voice input to text prior to transmission via communication network 546 or both convert a voice input to text and perform the parsing to identify the command. In the case of CR 522 receiving a textual command, the text input may be transmitted via communication network 546 to one of computing devices 504-508 for parsing and command identification. In another instance, CR 522 may perform the parsing of the text input to identify the command.

In another implementation, the processing of a command may be accomplished locally over a local network. In such a case, a voice command received by NMDs 512-516 may cause the voice input to be transmitted via a local network to one or more local computing devices for processing. The local computing device may convert the voice input to an equivalent text command and parse the text command to identify the command. In another configuration local computing device may only convert the voice input to equivalent text format and send the the equivalent text format to a second local computing device for parsing and command identification. In other instances, the NMDs 512-16 may convert the voice input to text prior to transmission via the local network or both convert a voice input to text and perform the parsing to identify the command. In the case of CR 522 receiving a textual command, the text input may be transmitted via the local network to a local computing device for parsing and command identification. In another instance, CR 522 may perform the parsing of the text input to identify the command. Other configurations for processing a command may exist.

At 1904, a computing device may identify a content type indicated by the command. The identification of content type may be accomplished via cloud network 502 or locally over a local network.

In one implementation a computing device may use content type logic to correlate the commands or portions of the commands to content type (s). Using the aforementioned example of "Play Led Zeppelin radio," a computing device may identify the content type as "Artist/Radio Station." In another example, the command "Play Electronic Dance Music" may cause the content type to be identified as "Genre." Similar identifications may be made for the various other content types. The identification of content type may be accomplished for instance through inputting a keyword of the command such as "Dance Music" and the database may map the keyword to an indication for content type such as the Genre. The database may reside on the computing device or on the network microphone device in some examples.

If it is determined that no content type is identified at 1908 the method may proceed directly to 1914. A content type may be unidentifiable for a number of reasons including user input error, poor speech input quality, background noise, or simply no such content type is known. For example, the content type of a command indicating an obscure artist name may be unable to be identified.

At 1914, an indication may be output by a computing device and transmitted via the communication network 546 to any or all of NMDs 512-516, PBDs 532-538, or CR 522 indicating that "the content is unavailable". The indication that no content is available may then be presented audibly or visually to a user. For example, the NMDs and PBDs may output audible indications, whereas the CR may be capable of outputting both audible and visual indications. The indication sent may, additionally or alternatively, cause a suggestion to be output to a user instructing he or she to re-input the command. For instance, the suggestion might be for the user to specify some additional identifying characteristic so as to assist in identifying the content type.

However, if it is determined at 1906 that a content type has been identified the method may proceed to 1908 to identify a streaming service that is able to play the content type identified at 1904. Generally, particular streaming services may vary significantly from other streaming services not only in what audio content they provide but also in how they present the content. For instance, each streaming service may possess relatively exclusive rights to stream the music content of certain artists or albums. In another instance, some streaming services, such as Pandora®, may only stream in radio station format, whereas others like Spotify® may be capable of streaming music on demand by artist, song, album, or radio station. In view of this fact, it is apparent that not all streaming services may be capable of streaming a content type identified at 1904.

In one instance, a computing device may identify a suitable streaming service by comparing metadata of the identified content type to a look-up table (s) that may contain entries for the content available and in what format the content is capable of being provisioned for various streaming services. In some cases, the computing device may direct the query to the entire universe of streaming services available. In other cases, the computing device may only query a sub-set of available streaming services. Such a sub-set may be chosen by the computing device based on a number of factors alone or in combination including streaming services a user is registered with, the amount of days since a user has last used a streaming service, streaming service popularity, user settings, among others. For example, if a user has only registered with Pandora®, Spotify®, and Deezer®, the computing device may only query those streaming services to determine which are suitable.

Such look-up table (s) may be stored in memory on a computing device or at an external location such as the computing device or at the music service. Given that the various look-up tables may be distributed amongst a variety of music services, a computing device may query each music service simultaneously or sequentially in order to find a match. Other manners of identifying a suitable streaming service are possible.

In one implementation the identification of a streaming service at 708 may further involve determining a currently available playback capacity of a streaming service that a user is registered with. Generally, some streaming services may limit the number of active streams available for a registered account at any given time. For example, Spotify® may only allow a single active stream per a registered account. In one instance, a computing device may determine the currently available playback capacity by querying the services a user is registered with for a usage status (i.e. how many active streams) and then comparing the usage status to capacity restriction data (i.e. Spotify=1 active stream only). In another example, the streaming services may output a binary value in response to the query to indicate whether or not a stream is available. The available playback capacity may be determined in other ways.

In this implementation, the computing device at 1908 may identify a registered service as supporting the content type indicated by the command and further determine the registered service does not have a stream available. For example, if a user and their spouse both share a Spotify® account and music is being streamed to the spouse's smartphone device at the gym when the user issues the command "Play Eye of the Tiger," the computing device may identify Spotify® as being able to play the song and also that a stream is unavailable. Such a case may cause the computing device to identify another streaming service capable of supporting the content type, such as Apple Music®

In another instance, the computing device may be unable identify another streaming service that may support the content type. This may occur for example, if a user requests content exclusively provided by a single streaming service, the computing device only considers sub-set of streaming services, among other examples. In such an instance, the computing device may cause a currently active stream to be "stolen" for use in providing the content corresponding to the command. Using the aforementioned, example if no other streaming service is capable of supporting "Eye of the Tiger," the stream to spouse at the gym may be cancelled and provided to the user.

In one instance, on the occurrence that an available streaming service is identified at 1910 as capable of supporting the identified content type, the process may proceed to 1914 to cause any combination of PBDs 532-538 to playback the audio content. The music service may be accessed, in one instance through querying the service API for content and causing the content to be streamed. The audio content may be streamed directly from computing device 508 or from various other computing devices associated with streaming music services directly to PBDs 532-538 upon a request from either PBDs 532-538 or computing devices 504-506. Other ways of initiating and causing the playback of streaming media content also exist.

In another instance, if a streaming service identified at 1910 is not presently available (i.e. application not installed, user not registered) a computing device may cause, at 1914, the output of an indication pertaining to a suggestive course of action to enable the music service to used. The indication may be sent any combination of NMDs 512-516, PBDs 532-538, or CR 522 and may cause an audible and/or visual suggestion indicating the identified music service capable of supporting the content type and/or present instructions on how to sign up for, download, or otherwise utilize the music service.

FIG. 20 is another example flow diagram related to an example process for identifying a streaming music service in blocks 1910 and 1912 of FIG. 19.

At 2002 a computing devices may cause a confidence metrics or metrics to be determined for streaming service (s) based at least in part on the content type identified by the command. In general, a confidence metric may be a numerical or percentage value (e.g. 1-100) calculated for a streaming service or services. Such confidence metric(s) may reflect the likelihood that a selection of a particular music service for providing streaming audio will result in providing the user with the content he or she desires. For example, a streaming service assigned a confidence metric of 80 may be more suitable for content provision than a streaming service with a confidence metric of 45, where a higher number indicates a higher confidence level of suitability.

The calculated confidence metrics for streaming services may be based on a number criterion such as content type, playback capacity, usage history, external data, among others. Such criteria may be constituted by various data types and may be retrieved from various sources such as the NMDs, CRs, PBDs, computing devices, music services, and various external sources. The data may be aggregated and stored in a central location such as a database associated with computing devices 504 or 506 or in a distributed fashion.

In one instance, the confidence metric may take into account a streaming service's suitability to support the content type indicated by a command. Determining suitability of various streaming services to provide a content type may involve mapping metadata relating to an identified content type to a look-up table or querying the tables of the various music services and assigning a value to the number of fields that match. As an example, a command that specifies "play Jackson 5 playlist" may have the content type "Artist/playlist." In such a case, the look-up table (s) of two streaming services such as Pandora® and Spotify® may both contain references to Jackson 5 in an artist field. However, only Spotify® may contain a playlist field identifying Jackson 5, as Pandora® does not support the content type playlist. In such a case, Pandora® may be afforded content type value of 2 and Spotify® a value of 1.

Additionally, or alternatively, strength of field matching may be employed. Using the aforementioned example and assuming that the Spotify® service does not contain an artist field corresponding to Jackson 5 but have artist entry for Michael Jackson, who may be identified by a computing device utilizing music metadata as having been a former member of Jackson 5. In such, a case the Spotify® service may not be given a value of 0 for the artist field, but rather the service may be afforded an adjusted value less than 1. Other forms of determining streaming service content type suitability value are possible.

In another instance, the confidence metrics may be calculated in part on various forms of historical usage data. The various historical data types may be retrieved from various sources such as the NMDs, CRs, PBDs, computing devices, music services, and various external sources. The data may be aggregated and stored in a central location such as a database associated with computing devices 504 or 506 or in a distributed fashion.

For example, the usage data may indicate how frequently a user accesses a given streaming service. As another example, the usage data may include time based data to identify the service a user normally uses at various times of the day, days of the week, and months of the year. For example, a user may prefer to listen to iHeartRadio® in the morning and to Tidal® in the evenings. As another example, in a multi-zone environment such usage data may indicate user preferences regarding streaming services on a per zone basis. For example, if a user typically accesses Spotify® 90% of the time in a bathroom zone and Deezer® 80% of the time in a living area zone the confidence metrics corresponding to Spotify® and Deezer® may vary significantly depending on which zone the user intends to stream audio to. In such, a case if the user desired to listen to music in the bathroom, Spotify® would be the much better choice. Various other types of historical usage data may exist as well.

Additionally, the confidence metrics may be determined in part based on various "external" data types. Such data may include macro type data that may take into account geographic location or demographic data, among other possibilities. For example, such macro data may indicate that a particular streaming service is not available or is unpopular in certain regions of the world or sub-regions of a country, which may result in a lower confidence metric. In such a case, the confidence metric for that streaming service may vary dependent on the geographic location. Types of "external" data may further include weather data, which may be taken into account, for example a user's preference to listen to Spotify® on the patio on cool, dry summer evenings. Additionally, calendar data may be considered to identify holidays and the music service typically streamed on those days. Other forms of external data may exist.

Furthermore, it is possible to combine the various criteria to determine a confidence metric for a given streaming service. For instance, a user may prefer to use Pandora® to listen to a wide variety of classical music in the living room but may exclusively use Apple Music® to listen to full albums of their favorite artist in the bedroom. In such a case, content type (s) (genre, artist) may be combined with a user history relating to location of use of particular music services to determine a confidence metric for a particular music service. Numerous other combinations may exist.

A computer implemented algorithm may map the criterion described above to a confidence metric for streaming service. For instance, one or more criterion may be mapped into a table which outputs the confidence metric. In some embodiments, the algorithm may involve weighting of various criteria such as content types, usage history, and/or "external data." The algorithm may assign different weights to the various criteria based on relative importance. For example, a user preference may be deemed more influential and afforded more weight than demographic data. The weighting of inputs may be defined by the system, by user settings, or adjustable dynamically based on user feedback. Each of weighted inputs may be input into a table, for example, for mapping to confidence metrics which are then combined to form an aggregated confidence metric for a music service as a whole.

At 804 either computing device 504 or 506 may determine whether a given streaming service satisfies a confidence condition. The confidence condition may be satisfied in a number of ways. In one instance, the confidence condition may be satisfied if the confidence metric for a given streaming service exceeds a confidence level threshold, which may be a default system setting or adjustable by a user. For example, if three confidence metrics are calculated as Service1=85, Service2=83, Service3=25 with the threshold confidence level being 80, may cause Service1 to be output for streaming or suggested to a user at 2006 (as discussed above in reference to 1914).

In another instance, the confidence condition may only be satisfied upon (1) a streaming service with a calculated confidence metric above the threshold confidence level and (2) the two highest calculated confidence metrics are not within a threshold range of one another. For example, if the confidence level range were 3 in the case mentioned directly above the confidence condition would not be satisfied due to confidence metrics of Service1 and Service2. The confidence condition may additionally or alternatively incorporate various other rules.

At 2008 an error state may be triggered by either computing device 504 or 506 if the confidence condition is found not to be satisfied at 2008. An error state may trigger certain events to be caused, such as outputting an indication that the content is unavailable, as discussed in reference to 1916. In another instance, a triggered error state may cause content to be streamed via a default streaming service or a preferred partner service. In yet another instance, the error state may cause a computing device to output an indication to one or all of NMDs 512-516, PBDs 532-538, or CR 522 to cause an audible or visual presentation of an instruction or query directed at obtaining more information in relation to the already received command.

In one instance, a user may be instructed to provide an additional content type such as artist or album. For example, if an initial command were "Play radio station" a user may be instructed "Please provide genre."

In another instance, a user may be asked a question or series of questions that may help further tune the initial command and thereby the confidence metrics for the various streaming services. For example, if an initial command were directed to the the broad genre of "Electronic," the user may be asked whether they prefer certain sub-genres such as "Drum and Bass" or "Trance." Additionally or alternatively, the user may be asked questioned unrelated to music such as "What are you doing?" or "How do you feel?" to infer what sub-genre a user may want to listen to. For example, if the user answered "Reading" and/or "Relaxed" to the aforementioned questions it may be inferred that the user is interested in the sub-genre Trance. Various other examples of queries are possible.

The user responses to the instructions or questions may take the form of speech input which may be received by an NMD or a textual input via a graphical interface of a CR. The user responses may cause process 1900 to repeat which may result in the confidence condition being satisfied or an additional error state being triggered.

VIII. Example Systems and Methods for Metadata Exchange Involving a Networked Playback System and a Networked Microphone System When a media playback device is configured to be controlled by voice commands received via a networked microphone system, it is sometimes advantageous for the media playback system to share metadata with the networked microphone system, and vice versa, for the purpose of effectuating voice control of the media playback system via the networked microphone system. For example, when the networked microphone system receives a voice command to "Play this song in my office now," the networked microphone system needs to know what "this song" is and which media playback device (s) is in the user's office. One way for the networked microphone system to figure out what "this song" is and which media playback device (s) is in the user's office is for the networked microphone system to obtain metadata from the media playback system relating to (i) the song that the media playback system is currently playing and (ii) the configuration of the media playback devices in the media playback system.

Some embodiments described herein include a media playback system (or perhaps one or more components thereof) providing metadata to a networked microphone system (or perhaps one or more components thereof) to facilitate voice control of the media playback system by the networked microphone system.

One aspect includes establishing a metadata exchange channel between a media playback system and a networked microphone system. In some embodiments, the media playback system includes one or more media playback devices alone or in combination with a media playback system server, and the networked microphone system includes one or more networked microphone devices alone or in combination with a networked microphone system server. In some embodiments, one or both of the media playback system server and/or the networked microphone system server are cloud-based server systems.

In operation, the metadata exchange channel may be any type of communication channel between one or more components of the media playback system and one or more components of the networked microphone system as described herein. In some embodiments, the metadata exchange channel is a communication session between one or more components of the media playback system and one or more components of the networked microphone system. The communication session may or may not be especially configured for the exchange of metadata. In practice, the media playback system and the networked microphone system may use any type of communications mechanism now known or later developed to exchange metadata between the two systems, including but not limited to communication paths, links, channels, and/or sessions (e.g., one or more paths, links, and/or channels may support a session).

After establishing the metadata exchange channel, or at a minimum, after configuring the media playback system to share or otherwise provide metadata to the networked microphone system, the media playback system provides metadata associated with the media playback system to the networked microphone system in response to a metadata exchange triggering event. In some embodiments, the metadata exchange triggering event is any one or more of (i) the media playback system playing back a new media content item (e.g., a new audio track), (ii) the media playback system receiving a context-specific playback command via the networked microphone system, (iii) the media playback system receiving a context-specific request for information via the networked microphone system, and/or (iv) passage of a defined time period of time.

Some embodiments include the networked media playback system providing the metadata to the networked microphone system via the metadata exchange channel. For example, the media playback system may provide metadata associated with the media playback system to the networked microphone system via the metadata exchange channel by one or both of: (i) transmitting metadata from one or more components of the media playback system to one or more components of the networked microphone system via the metadata exchange channel and/or (ii) granting one or more components of the networked microphone system access to metadata stored on one or more components of the media playback system via the metadata exchange channel.

In some embodiments, the metadata that the media playback system provides to the networked microphone system includes one or more of: (i) one or more configuration parameters of the media playback system, (ii) information about audio content currently playing via the media playback system, (iii) historical information about audio content played by the media playback system, (iv) user preference information relating to audio content, (v) user preference information relating to media playback system configuration, and/or (vi) any other metadata, including but not limited to other metadata disclosed and/or described herein.

Some embodiments may additionally include the networked microphone system providing metadata to the media playback system via the metadata exchange channel. For example, the networked microphone system may provide metadata associated with the networked microphone system via the metadata exchange channel by one or both of (i) transmitting metadata from one or more components of the networked microphone system to one or more components of the media playback system via the metadata exchange channel and/or (ii) granting one or more components of the media playback system access to metadata stored on one or more components of the networked microphone system via the metadata exchange channel.

In some embodiments, the metadata that the networked microphone system provides to the media playback system includes one or more of (i) one or more configuration parameters of the networked microphone system, (ii) configuration parameters of individual networked microphone devices of the networked microphone system, (iii) historical information about who has used (e.g., which user or users) the networked microphone system to control the media playback system and when, (iv) the voice commands received by the networked microphone system, and/or (v) any other metadata, including but not limited to other metadata disclosed and/or described herein.

To facilitate voice control of the media playback system, it is desirable in some instances for the media playback system to share, exchange, or otherwise provide metadata to the networked microphone system and/or vice versa. In some embodiments, the media playback system includes one or more of PBDs 532, 534, 536, and 538 and computing device 506 (which is configured as a media playback system server), and the networked microphone system includes one or more of NMDs 512, 514, and 516 and computing device 504 (which is configured as a networked microphone system server).

Examples of metadata shared from the media playback system to the networked microphone system include any one or more of: (i) one or more configuration parameters of the media playback system, (ii) information about audio content currently playing via the media playback system, (iii) historical information about audio content played by the media playback system, (iv) user preference information relating to audio content, (v) user preference information relating to media playback system configuration, and (vi) other metadata, including but not limited to any of the metadata disclosed or described herein. Examples of metadata shared from the networked microphone system to the media playback system may include any one or more of: (i) one or more configuration parameters of the networked microphone system, (ii) which users have used the networked microphone system and perhaps when, (iii) the types of commands and/or requests for information received by the networked microphone system, (iv) information from other information sources, e.g., local weather, sports scores, news, local concert information, whether a user purchased an album via the networked microphone system that was previously playing via the media playback system, and/or (v) other metadata, including but not limited to any of the metadata disclosed or described herein. The metadata shared between the networked microphone system and the media playback system may involve any characteristic, configuration, or other type of information pertaining to one or more of the media playback system and the networked microphone system, and so other examples of such metadata may exist.

Examples of configuration parameters of the media playback system include zones where individual PBDs 532-538 are located (e.g., kitchen, balcony, living room, bedroom, and so on, as shown in FIG. 1) or names given to individual PBDs. Configuration parameters may also include information about which PBDs have been grouped in synchrony groups, grouped into a consolidated playback device, and/or grouped into a bonded group of playback devices. Configuration parameters may also include information about what channel or channels of audio a particular PBD is configured to play (e.g., "left channel," or "rear left channel," among other examples). Configuration parameters may also include equalization settings for individual PBDs or groups of PBDs. In some embodiments, the equalization settings for individual PBDs or groups of PBDs may include Sonos Trueplay™ settings for individual PBDs or groups of PBDs. Configuration parameters may also include orientation state information for individual PBDs, e.g., whether a particular PBD is standing right side up, upside down, or on its side. Configuration parameters may also include networking information, e.g., whether a particular PBD is operating as a group coordinator (e.g., a "master") in a group of playback devices or is operating as a group member (e.g., a "slave") in a group of playback devices. Configuration parameters may also include a variety of other physical state information such as a battery level of a PBD, whether the PBD is physically attached to an electrical power outlet, whether the PBD is attached to a base, and/or whether the PBD is currently in motion (i.e., being moved).

Configuration parameters may also include available (e.g., previously stored) zone scenes into which the individual PBDs can be configured. An individual zone scene may include a particular grouping of PBDs configured with a particular set of configuration parameters. For example, an "Evening Jazz" zone scene may (i) group PBDs in the kitchen, dining room, living room, and balcony (see FIG. 1) into a synchrony group so that all of the PBDs 102-114 are configured to play the same media content in synchrony, (ii) configure the volume and/or equalization settings for the individual PBDs 102-114 to account for the fact that all of the PBDs 102-114 are playing together, (iii) configure the equalizer settings for the individual PBDs 102-114 to a "jazz" setting, and/or (iv) load jazz tracks into the playback queue for the synchrony group of PBDs 102-114 from one or more playlists and/or music subscription services. Zone scenes are described in more detail in U.S. Pat. No. 8,483,853 titled "Controlling and manipulating groupings in a multi-zone media system," and pending application Ser. No. 14/737,199 titled "Multiple Groupings in a Playback System." The entire contents of the U.S. Pat. No. 8,483,853 patent and the Ser. No. 14/737,199 application are incorporated herein by reference for all purposes.

Examples of information about audio content currently playing via the media playback system include (i) the track, (ii) the title, (iii) the artist, (iv) the performer, (v) the author, (vi) the album, (vii) the genre, (viii) the year, (ix) the audio information source/media service providing the track to the media playback system, (x) how many times the track has been played, (xi) whether the track is a user "favorite", (xii) the playlist (if any) that the track appears in, (xiii) the user who initiated playback of the track, (xiv) a current playback progression (e.g., playback time stamp) of the track, (xv) whether and how many times the track has been "liked" by listeners (and perhaps when), and/or (xvi) any other information about the currently playing track. Examples of historical information about audio content played by the media playback system include any or all of the above-described metadata about audio content in combination with dates and times when individual audio content was played by the media playback system as well as perhaps the particular PBD or PBDs that played the content. Information about the audio currently or previously played may also include other contextual information regarding the playback such as "played during Larry's party," "played on Christmas day," or "played while raining outside," among other examples.

Examples of user preference information relating to audio content include (i) preferred audio information source or music service to obtain music from (e.g., Spotify, Pandora, local library of tracks, and so on), (ii) preferred versions of songs (e.g., a live version versus a studio version, a version of the song by a particular artist or group), (iii) preferred styles or genres of music, and (iv) other user preferences relating to audio content.

Examples of user preference information relating to media playback system configuration include (i) preferred playback volume, (ii) preferred equalization settings, (iii) preferred synchrony group arrangements, (iv) preferred zone scenes, and/or (v) other media playback system settings.

In some embodiments, sharing any of the above-described metadata (and perhaps other metadata) between the media playback system and the networked microphone system includes first establishing a metadata exchange channel between the media playback system and the networked microphone system. In operation, the metadata exchange channel may be any type of communication channel between one or more components of the media playback system and one or more components of the networked microphone system as described herein.

In some embodiments, the metadata exchange channel is a communication session occurring between one or more components of the media playback system and one or more components of the networked microphone system, and establishing the metadata exchange channel includes establishing the communication session. The communication session may or may not be especially configured for or otherwise adapted to the exchange of metadata. In practice, the media playback system and the networked microphone system may use any type of communications mechanism now known or later developed to exchange metadata between the two systems, including but not limited to communication paths, links, channels, and/or sessions (e.g., one or more paths, links, and/or channels may support a session).

In some embodiments, the metadata exchange channel can be any of (i) a one way connection from the media playback system to the networked microphone system, (ii) a one way connection from the networked microphone system to the media playback system, (iii) a two-way connection between (i.e., to and from) the media playback system and the networked microphone system, or (iv) a multi-way connection between multiple components of the media playback system and multiple components of the networked microphone system.

In some embodiments, any one or more of PBDs 532-538, CR 522, and computing device 506 may transmit metadata via one or more separate or perhaps shared metadata multicast channels, where any other of PBDs 532-538, CR 522, computing device 506, NMDs 512-516, and computing device 504 can subscribe to one or more of the metadata multicast channels to receive metadata transmitted from components of the media playback system. Similarly, any one or more of NMDs 512-513 and computing device 504 may transmit metadata via one or more separate or shared metadata multicast channels, where any of other NMDs 512-516, computing device 504, PBDs 532-538, CR 522, and computing device 506 can subscribe to one or more of the metadata multicast channels to receive metadata transmitted from components of the networked microphone system. In some embodiments, the collection of metadata multicast channels may form a metadata mesh network via which components of the networked microphone system and components of the media playback system share metadata with each other.

In some embodiments, establishing a metadata exchange channel comprises configuring one or more components of the media playback system (i.e., any one or more of PBDs 532, 534, 536, 538, CR 522, and/or computing device 506, which is configured as a media playback system server) to communicate with one or more components of the networked microphone system (i.e., any one or more of NMDs 512, 514, 516, and/or computing device 504, which is configured as a networked microphone system server) via a communication path, link, channel, and/or session. Establishing the metadata exchange channel may additionally or alternatively include configuring one or more components of the networked microphone system (i.e., any of NMDs 512, 514, 516, and/or computing device 504) to communication with one or more components of the media playback system (i.e., any of PBDs 532, 534, 536, 538, CR 522, and/or computing device 506) via a communication path, link, channel, and/or session.

As described earlier, in some embodiments, the metadata exchange channel is a separate and also perhaps dedicated metadata exchange channel. However, in other embodiments, the metadata exchange channel may include one or more communication paths, connections, links, or similar communications connections between the media playback system and the networked microphone system which can be used to exchange metadata or any other information, content, or other data between components of the media playback system and components of the networked microphone system in a unidirectional, bidirectional, and/or multi-directional manner.

For example, with reference to FIG. 5, establishing a metadata exchange channel between the media playback system and the networked microphone system may include establishing a communication session between one or more components of the media playback system (i.e., any of PBDs 532-538 and/or computing device 506) to communicate with one or more components of the networked microphone system (i.e., any of NMDs 512-513 and/or computing device 504) via one or more of (i) local network 546, (ii) communications path 544, (iii) communications path 542, (iv) cloud network 502, and/or (v) any other type of communications path, link, or other connection now known or later developed.

In operation, after establishing the metadata exchange channel, the media playback system provides metadata associated with the media playback system to the networked microphone system via the metadata exchange channel in response to experiencing a metadata exchange triggering event.

In some embodiments, the metadata exchange triggering event comprises one or more of the PBDs of the media playback system playing back a new media content item. For example, in such embodiments, the media playback system (i.e., any of the PBDs 532-538 or the computing device 506) sends any of the above-described metadata to the networked microphone system (i.e., any of NMDs 512-516 or computing device 504) whenever any one of the PBDs 532-538 of media playback system begins playing a new media track. In this manner, playback of the new media track is the metadata exchange triggering event causing the media playback system to send metadata to the networked microphone system. In such embodiments, the media playback system sends metadata to the networked microphone system as each new track is played, regardless of whether the networked microphone system has specifically requested any metadata. This implementation can be advantageous in scenarios where the networked microphone system (or perhaps a component thereof, e.g., computing device 504) is configured to store historical metadata and/or other metadata about the media playback system and/or the media played by the media playback system.

In some embodiments, the media playback system may initiate playback of a media track in response to a voice command to play the media track received via the networked microphone system. Additionally or alternatively, the media playback system may initiate playback of a media track in response to a command to play the media track received via a computing device configured to control the media playback system, such as CR 522. In either instance, initiating playback of the media track may cause the media playback system (i.e., any one or more of the PBDs 532-538 playing the media track, the computing device configured to control the media playback system (e.g., CR 522), and/or computing device 506, individually or in combination) to transmit metadata to the networked microphone system (i.e., any one or more of the NMDs 512-516 or computing device 504, individually or in combination).

In some embodiments, the metadata exchange triggering event additionally or alternatively comprises the media playback system receiving a request for metadata in response to the networked microphone system receiving a context-specific command (or perhaps other types of command) from a user. An example of a context-specific command is "Save this song to my favorites playlist." The command is context specific because the networked microphone system needs to know what "this song" is so that the networked microphone system can instruct the media playback system to add "this song" to the user's favorites playlist.

To determine what "this song" is, the networked microphone system requests metadata about the audio track that the media playback system is currently playing. If the media playback system has multiple PBDs where different PBDs located in different zones are playing different audio tracks (see FIG. 1), then functions directed to determining what "this song" is may be required. For instance, if the NMD of the networked microphone system that received the context-specific command is paired with a kitchen zone (or otherwise connected to or associated with the kitchen zone), then the networked microphone system can retrieve metadata for the audio track currently played by the PBD (or PBDs) in the kitchen zone. Thus, in this example, processing the context-specific command requires the networked microphone system to obtain metadata about the configuration of the media playback system (i.e., which PBDs are in the kitchen zone), metadata about the audio content that the PBD (or PBDs) in the kitchen is currently playing, and also perhaps metadata about the user's playlists (i.e., user preference metadata).

Another example of a context-specific command is "Play the songs that were playing in the Living Room last Friday night." The command is context specific because the networked microphone system needs to know what songs that the media playback system was playing in the living room zone last Friday evening so that the networked microphone system can instruct the media playback system to play those songs again now.

To determine the "songs that were playing in the Living Room last Friday night", the networked microphone system requests metadata about the history of the audio tracks that the PBD (or PBDs) in the living room zone played on the most-recent Friday. If the media playback system has multiple PBDs where different PBDs located in different zones can play different audio tracks (see FIG. 1), then determining which PBD (or PBDs) should play the "songs that were playing in the Living Room last Friday night" can pose an additional challenge. But if the NMD of the networked microphone system that received the context-specific playback command is paired with the office zone (or otherwise connected to or associated with the office zone), then the networked microphone system can retrieve metadata about the audio tracks that the PBD (or PBDs) in the living room zone played on the most-recent Friday, and then instruct the PBD (or PBDs) in the office to play those audio tracks now. Thus, in this example, processing the context-specific command requires the networked microphone system to obtain metadata about the historical configuration of the media playback system (i.e., which PBDs are in the living room zone, or at least were in the living room zone last Friday), metadata about the audio content that the PBD (or PBDs) in the living room played last Friday, and also perhaps metadata about which PBD (or PBDs) are currently in the office zone.

Another example of a context-specific command is "Add this song to the queue in my bedroom." The command is context specific because the networked microphone system needs to know what "this song" is and which bedroom is "my bedroom" so that the media playback system can add the correct song to the playback queue on the correct PBD in the media playback system.

To determine what "this song" is, the networked microphone system requests metadata about the audio track that the media playback system is currently playing. If the media playback system has multiple PBDs where different PBDs located in different zones are playing different audio tracks (see FIG. 1), then functions directed to determining what "this song" is may be required. For instance, if the NMD of the networked microphone system that received the context-specific command is paired with an office zone (or otherwise connected to or associated with the office zone), then the networked microphone system can retrieve metadata for the audio track currently played by the PBD (or PBDs) in the office zone.

To determine which bedroom is "my bedroom," the networked microphone system may perform voice recognition on the voice command to determine who spoke the voice command, access metadata about the user (from the user profile for example) stored by the media playback system to determine which bedroom zone corresponds to that particular user, access metadata about the configuration of the media playback device to determine which PBD (or PBDs) are in the bedroom zone corresponding to the user, access metadata about the configuration of the PBD (or PBDs) in the bedroom zone to determine which PBD is the master zone player for the bedroom zone that stores the playback queue for the PBD (or PBDs) in the bedroom zone, and finally metadata about the playback queue for that PBD in the bedroom zone corresponding to the user.

Thus, in this example, processing the context-specific command requires the networked microphone system to obtain metadata about registered users of the media playback system, metadata about the configuration of the media playback system (i.e., which PBDs are in the office and bedroom zones), metadata about the audio content that the PBD (or PBDs) in the office is currently playing, metadata about the playback queue for the PDB (or PBDs) in the bedroom zone, and/or perhaps other metadata in order to add the song playing in the office to the playback queue for the user's bedroom.

In yet another example of a context-specific command (or information request) is "When is this band playing in town next?" The command is context specific because the networked microphone system needs to know what "this band" and this "town" are so that the networked microphone system can provide the user with an answer, or perhaps instruct the media playback device to provide the user with an answer.

To determine what "this band" is, the networked microphone system requests metadata about the audio track that the media playback system is currently playing. If the media playback system has multiple PBDs where different PBDs located in different zones are playing different audio tracks (see FIG. 1), then functions directed to determining what "this band" is may be required. For instance, if the NMD of the networked microphone system that received the context-specific command is paired with an office zone (or otherwise connected to or associated with the office zone), then the networked microphone system can retrieve metadata for the audio track currently played by the PBD (or PBDs) in the office zone.

To determine what this "town" is, the networked microphone system may request metadata about the location of the media playback system, or the networked microphone system may use its own configuration information. Either way, once the networked microphone system knows "this band" and the "town," the networked microphone system can query one or more third-party information sources to obtain tour dates for "this band" and provide the next date to the user, or perhaps instruct the media playback system to inform the user.

For example, in some embodiments, the networked microphone system may instruct the media playback system (or at least a particular PBD of the media playback system) to provide an audible response to the question of "When is this band playing in town next?" In operation, one or more PBDs of the media playback system may provide an audible answer that "The Rolling Stones play in Chicago next on November 15th." In some embodiments, the media playback device, under the control the networked microphone system, may additionally ask the user "Would you like to purchase tickets?", and if the user replies, "Yes," then the networked microphone system may email the user a link to purchase tickets. This follow on interaction with the user may also require the networked microphone system to access metadata about registered users of the media playback system to obtain the email address to use for sending the link for purchasing the concert tickets.

Another example of a context-specific information request is "What band is this?" The information request is context specific because the networked microphone system needs to know what song is currently playing so that the networked microphone system can either (i) inform the user of the artist of the currently playing track or (ii) instruct the media playback system to inform the user of the artist for the currently playing track. And like the earlier examples, if the media playback system has multiple PBDs where different PBDs located in different zones can play different audio tracks (see FIG. 1), then determining which PBD (or PBDs) is playing the song of interest can pose an additional challenge. But if the NMD that received the context-specific information request is paired with the living room zone (or otherwise connected to or associated with the living room zone), then the networked microphone system can retrieve metadata about the audio track that the PBD (or PBDs) in the living room zone is currently playing. Thus, in this example, to process and respond to the context-specific information request, the networked microphone system must obtain metadata about the configuration of the media playback system (i.e., which PBDs are in the living room zone) and metadata about the audio content that the PBD (or PBDs) in the living room is playing.

In some embodiments, the metadata exchange triggering event comprises passage of a defined time period. For example, in some embodiments, the media playback system may be configured to send any (or perhaps all) of the types of metadata described herein to the networked microphone system every 1 second, 10 seconds, 1 minute, 15 minutes, every 30 minutes, every hour, or some other timeframe.

In some embodiments, the media playback system may be configured to send metadata to the networked microphone system whenever there is any change to the media playback system. For example, the media playback system may be configured to send metadata to the networked microphone system whenever (i) there is a configuration change to the media playback system, such as creating or removing a synchrony group, establishing a zone scene, adding or removing a media playback device to the media playback system, raising or lowering the volume, changing equalization settings, or any other configuration change, (ii) starting or stopping playback of a media track, advancing to a next track, skipping a track, repeating a track, or other playback commands, (iii) receiving an indication that a user "likes" or "dislikes" (e.g., a thumbs up or thumbs down indication) a currently playing track, album, or playlist, (iv) adding a track or album to or removing a track or album from a playlist, and/or (v) adding a track, album, or playlist to or removing a track, album, or playlist from a playback queue. In some embodiments, the media playback system may send metadata to the networked microphone system in a continuous, substantially continuous, or semi-continuous fashion as different PBDs in the media playback system are configured and reconfigured while playing tracks and performing other media management functions.

In some embodiments, the media playback system providing metadata associated with the media playback system (and/or media played by media playback system) to the networked microphone system via the metadata exchange channel comprises the media playback system (or perhaps one or more components of the media playback system) transmitting metadata to the networked microphone system (or perhaps one or more components of the networked microphone system). For example, the media playback system transmitting metadata to the networked microphone system may include any one or more of (i) one of the PBDs (i.e., any of PBDs 532-538) sending metadata to any of the NMDs (i.e., any of NMDs 512-516) via local network 546; (ii) computing device 506 sending metadata to computing device 504; (iii) the CR 522 sending metadata to any of the NMDs 512-516 via network 546; (iv) the CR 522 sending metadata to computing device 504; (v) one of the PBDs 532-538 sending metadata to computing device 506 via communications link 544, and the computing device 506 in turn sending the metadata to computing device 504; and (vi) one of the PBDs 532-538 sending metadata to one of the NMDs 512-516 via network 546, and one of the NMDs 512-516 sending the metadata to computing device 504 via communication link 546. Every other scenario where any one or more components (PBDs 532-538 and computing device 506) of the media playback system sends, shares, transfers, transmits, or otherwise provides metadata to any one or more components (NMDs 512-516 and computing device 504) of the networked microphone system via any of the communications paths (544, 542, 546) shown in FIG. 5 (or any other communications path) is possible and is contemplated herein.

In some embodiments, the media playback system providing metadata associated with the media playback system (and/or media played by media playback system) to the networked microphone system via the metadata exchange channel comprises the media playback system (or perhaps one or more components of the media playback system) granting the networked microphone system (or perhaps one or more components of the networked microphone system) access to metadata via the metadata exchange channel. For example, the media playback system granting the networked microphone system access to metadata may include any one or more of (i) one of the PBDs (i.e., any of PBDs 532-538) granting any of the NMDs (i.e., any of NMDs 512-516) access to metadata via local network 546; (ii) computing device 506 granting computing device 504 access to metadata; (iii) the CR 522 granting any of the NMDs 512-516 access to metadata via network 546; (iv) the CR 522 granting computing device 504 access to metadata; (v) one of the PBDs 532-538 granting computing device 506 access to metadata via communications link 544, and the computing device 506 in turn granting computing device 504 access to metadata; and (vi) one of the PBDs 532-538 granting one of the NMDs 512-516 access to metadata via network 546, and one of the NMDs 512-516 sending the metadata to computing device 504 via communication link 546. Every other scenario where any one or more components (PBDs 532-538 and computing device 506) of the media playback system grants any one or more components (NMDs 512-516 and computing device 504) of the networked microphone system access to metadata via any of the communications paths (544, 542, 546) shown in FIG. 5 (or any other communications) is possible and is contemplated herein.

Figure 21:
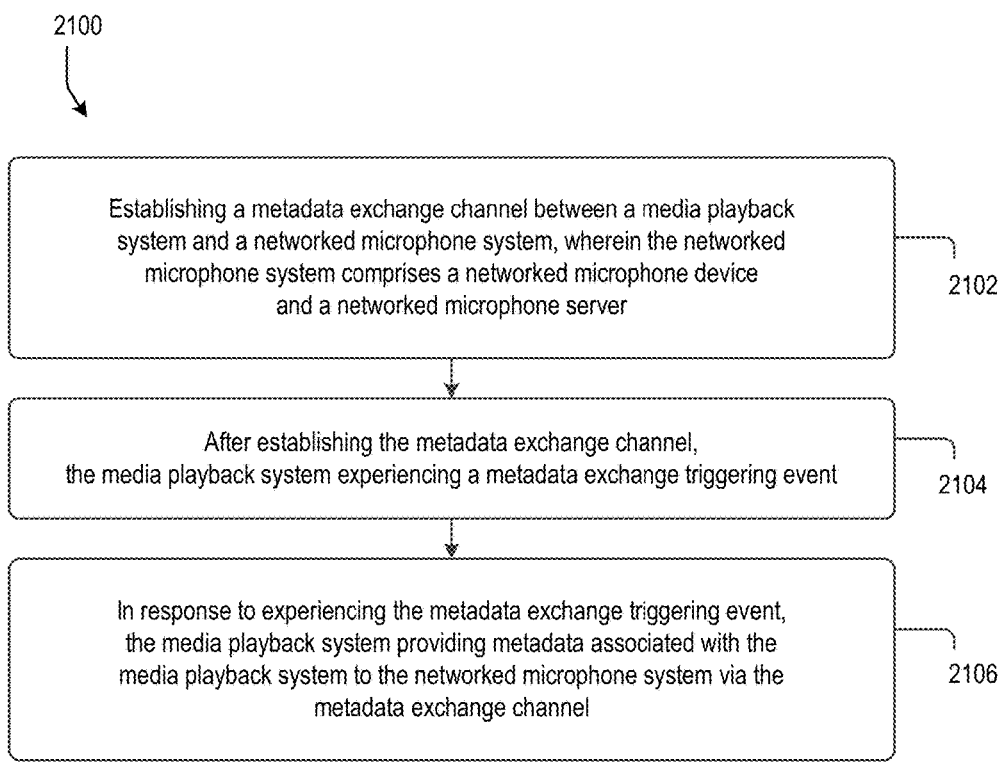
FIG. 21 shows aspects of an example method for metadata exchange involving a networked playback system and a networked microphone system according to some embodiments.

Method 2100 shown in FIG. 21 presents an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, and/or the NMD shown in FIG. 6. Method 2100 may include one or more operations, functions, or actions as illustrated by one or more of blocks 2102-2106. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 2100 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 2100 and other processes and methods disclosed herein, each block in FIG. 21 may represent circuitry that is wired to perform the specific logical functions in the process.

Method 2100 begins at block 2102, which includes establishing a metadata exchange channel between a media playback system and a networked microphone system, wherein the networked microphone system comprises a networked microphone device and a networked microphone server.

The metadata exchange channel may be any type of communication channel between one or more components of the media playback system and one or more components of the networked microphone system as described herein. In some embodiments, the metadata exchange channel is a communication session between one or more components of the media playback system and one or more components of the networked microphone system. In some embodiments, the communication session may be especially configured for the exchange of metadata. However, in other embodiments, the media playback system and the networked microphone system may use any type of communications mechanism now known or later developed to exchange metadata between the two systems.

In some embodiments, the media playback system comprises at least one media playback device, and establishing a metadata exchange channel between a media playback system and a networked microphone system comprises establishing the metadata exchange channel between the at least one media playback device and at least one of (i) the networked microphone device and (ii) the networked microphone server.

In alternative embodiments, the media playback system further comprises a media playback server connected to the at least one media playback device, and establishing a metadata exchange channel between a media playback system and a networked microphone system comprises establishing the metadata exchange channel between the media playback server and at least one of (i) the networked microphone device and (ii) the networked microphone server.

Next, method 2100 advances to block 2104, which includes, after establishing the metadata exchange channel, the media playback system experiencing a metadata exchange triggering event. In operation, the metadata exchange triggering event may include any of (i) the media playback system playing back a new media content item, (ii) the media playback system receiving a context-specific playback command via the networked microphone system, (iii) the media playback system receiving a context-specific information request via the networked microphone system, (iv) passage of a defined period of time, and/or (v) other configuration changes, state changes, actions, inputs, or requests that could be used to trigger metadata exchange. In some embodiments, the media playback system may send metadata to the networked microphone system on an ongoing basis.

Block 2104 may additionally or alternative include, after establishing the metadata exchange channel, the networked microphone system experiencing a metadata exchange triggering event. In operation, the metadata exchange triggering event may include any of (i) the networked microphone system receiving a new voice command, including but not limited to a context-specific voice command, (ii) the networked microphone system receiving a new voice request for information, including but not limited to a context-specific voice request for information, (iii) a configuration change of the networked microphone system, (iv) passage of a defined period of time, and/or (v) other configuration changes, state changes, actions, inputs, or requests that could be used to trigger metadata exchange. In some embodiments, the networked microphone system may send metadata to the media playback system on an ongoing basis.

Finally, method 2100 advances to block 2106, which includes in response to experiencing the metadata exchange triggering event, the media playback system providing metadata associated with the media playback system to the networked microphone system via the metadata exchange channel.

In operation, the metadata comprises at least one of (i) one or more configuration parameters of the media playback system, (ii) information about audio content currently playing via the media playback system, (iii) historical information about audio content played by the media playback system, (iv) user preference information relating to audio content, (v) user preference information relating to media playback system configuration, and/or (vi) any other metadata disclosed and/or described herein.

In some embodiments, the media playback system providing metadata associated with the media playback system to the networked microphone system via the metadata exchange channel comprises at least one of (i) the media playback system transmitting metadata to the networked microphone system via the metadata exchange channel or (ii) the media playback system granting the networked microphone system access to selected metadata via the metadata exchange channel.

In some embodiments, block 2106 may additionally or alternatively include, in response to experiencing the metadata exchange triggering event, the networked microphone system providing metadata associated with the networked microphone system to the media playback system via the metadata exchange channel.

In operation, the metadata comprises at least one of (i) one or more configuration parameters of the networked microphone system, (ii) information about voice commands and requests received via the networked microphone system, (iii) historical information about voice commands and requests received via the networked microphone system, (iv) user preference information relating to the networked microphone system, (v) user preference information relating to the networked microphone system configuration, and/or (vi) any other metadata disclosed and/or described herein.

In some embodiments, the networked microphone system providing metadata associated with the networked microphone system to the media playback system via the metadata exchange channel comprises at least one of (i) the networked microphone system transmitting metadata to the media playback system via the metadata exchange channel or (ii) the networked microphone system granting the media playback system access to selected metadata via the metadata exchange channel.

VIII. Example Systems and Methods for Handling Loss of Pairing Between Networked Devices When a media playback system is configured to be controlled by voice commands received via a networked microphone system, it is advantageous for the media playback system to execute the voice commands and to perhaps also provide feedback in response to a voice command received via the networked microphone system.

For example, in response to the networked microphone system receiving a voice command to "Add this song to my favorites playlist," it is advantageous for the media playback system (or at least one media playback device of the media playback system) to add the song to the favorites playlist and also to confirm that the song has been added to the user's favorite's playlist via some audio feedback, such as "[Song name] has been added to the favorite's playlist" or some similar feedback. Similarly, in response to the networked microphone system receiving a voice command of "What is the name of this song?", it may be desirable for the media playback system (or at least one media playback device of the media playback system) to inform the user of the name of the song via some audio feedback, such as "This song is "All You Need is Love" by The Beatles," or some similar feedback.

However, sometimes one or more media playback devices may be unavailable or otherwise unable to execute a voice command (e.g., a command to play back media, reconfigure the media playback system, and so on) or to provide feedback in response to the networked microphone system receiving a voice command. In such circumstances, it may be desirable to have a fallback device to play back media, perform media playback system reconfigurations, and/or provide feedback in response to a voice command received via the networked microphone system.

Some embodiments described herein include (i) receiving a voice command via a networked microphone device configured to receive voice commands for a media playback system to perform a function (e.g., play back media content, add or remove a song from a playlist, purchase a song, and so on), wherein the media playback system comprises a primary media playback device configured to perform the function in response to voice commands received via the networked microphone device, (ii) determining that the primary media playback device is not available to perform the function in response to the voice command, and (iii) in response to determining that the primary media playback device is not available to perform the function in response to the voice command, instructing a fallback device to perform the function in response to the voice command.

Some embodiments described herein may additionally or alternatively include (i) receiving a voice command via a networked microphone device configured to receive voice commands for a media playback system, wherein the media playback system comprises a primary media playback device configured to provide a first feedback in response to voice commands received via the networked microphone device, (ii) determining that the primary media playback device is not available to provide the first feedback in response to the voice command, and (iii) in response to determining that the primary media playback device is not available to provide the first feedback in response to the voice command, instructing a fallback device to provide a second feedback in response to the voice command.

Additionally, sometimes one or more networked microphone devices of a networked microphone system may be unavailable or otherwise unable to receive voice commands. In such circumstances, it may be desirable to configure a fallback microphone (perhaps temporarily) to receive voice commands for the media playback system.

Some embodiments described herein include (i) determining that a primary networked microphone device of a networked microphone system is not available to receive voice commands for a media playback system, wherein the media playback system comprises one or more media playback devices, and (ii) in response to determining that the primary networked microphone device is not available to receive voice commands, designating a fallback microphone to receive voice commands for the media playback system.

In some embodiments, it is desirable for one of the media playback devices (such as any of PBDs 532-538) of the media playback system to perform functions and/or provide feedback in response to a voice command received via a networked microphone device (any of NMDs 512-516) of the networked microphone system.

In the context of this disclosure, performing a function may include any action taken by any one or more components of the media playback system in response to a voice command. For example, in response to a voice command to "Play Led Zeppelin" received via the networked microphone system, the media playback system (or perhaps one or more PBDs of the media playback system) performs the function of playing a song by the band Led Zeppelin. In another example, in response to a voice command to "Combine the kitchen and living zones into a synchrony group" received via the networked microphone system, the media playback system (or perhaps one or more PBDs of the media playback system, individually or in combination with CR 522 and/or computing device 506) may configure the PBDs in the kitchen zone and the living room zone into a synchrony group, wherein after configuring the PBDs in the kitchen and living room zones into a synchrony group, the PBDs in the kitchen zone and the PBDs in the living room zone are configured to play back media in synchrony with each other, as described herein.

In the context of this disclosure, feedback is some audible, visual, tangible, or other type of response to a voice command. For example, in response to a voice command of "What is the current temperature outside?", the networked microphone system may instruct one or more of the PBDs in the media playback system to respond with the current outdoor temperature. In some embodiments, this feedback may be an audible statement of "The current temperature is 75 degrees" that is played by one of the PBDs of the media playback system. Similarly, in response to a voice command of "What is the name of this song?", the networked microphone system may instruct one or more of the PBDs of the media playback system to respond with the title of the song. In some embodiments, this feedback may be an audible statement of "The current song is All You Need is Love by The Beatles" that is played by one of the PBDs of the media playback system. Instead of audible feedback, in some embodiments, the feedback may be visual or tangible/haptic, as described herein.

In some embodiments, a particular PBD of the media playback system is designated as a primary PBD for a particular NMD of the networked microphone system. In operation, the primary PBD for a particular NMD is the PBD that is configured to perform functions and/or provide feedback to voice commands received by that particular NMD. In some embodiments, different NMDs may have different corresponding primary PBDs. For example, the primary PBD for an NMD located in the kitchen zone might be a PBD also located in the kitchen zone. Similarly, the primary PBD for an NMD located in the bedroom zone might be a PBD also located in the bedroom zone. In other embodiments, a single PBD may be the primary PBD for the networked microphone system. In still further embodiments, a computing device configured to control the media playback system may act as the primary PBD in terms of performing functions and/or providing feedback to voice commands received via one or more NMDs of the networked microphone system.

In operation, an NMD of the networked microphone system receives a voice command. The voice command may be any type of command or request for information. If a response (i.e., feedback) to the voice command is desirable or perhaps even required, then the networked microphone system instructs the media playback system to provide feedback (and perhaps also the content of the feedback) in response to the voice command.

In some embodiments, to instruct the media playback system to provide feedback in response to a voice command, the networked microphone system first determines whether the primary PBD associated with the NMD that received the voice command is available to provide feedback in response to the voice command. Alternatively, some embodiments may include the networked microphone system instructing the primary PBD associated with the NMD that received the voice command to provide the feedback in response to the voice command without first checking whether the primary PBD is available to provide feedback in response to the voice command.

In operation, determining whether the primary PBD associated with the NMD that received the voice command is available to provide feedback in response to the voice command may include determining whether the primary PBD associated with the NMD that received the voice command is one or more of: (i) muted, (ii) in a do not interrupt state, (iii) in a power save mode, (iv) unreachable via a network configured to support communications between the media playback system and the NMD, (v) unplugged, or (vi) powered off. The primary PBD may alternatively be unavailable if the primary PBD has been moved from its typical location so that providing feedback in response to the voice command might not be helpful. For example, if the primary PBD for a particular NMD in the kitchen was moved from the kitchen to the bedroom, then it may not be helpful for the primary PBD to provide feedback in response to voice command received via the NMD in the kitchen because a user in the kitchen might not hear feedback from the primary PBD while the primary PBD is in the bedroom. In some embodiments, the networked microphone system may determine that the primary PBD is unavailable after the networked microphone system instructs the primary PBD to perform a function or provide feedback, but then the networked microphone system fails to receive a confirmation from the primary PBD that the primary PBD has performed the desired function or provided the desired feedback.

In some embodiments, the media playback system may inform the networked microphone system of the state (available vs. unavailable) of particular PBDs in the media playback system. For example, if the media playback system knows that PBD 534 is in a "do not interrupt" state because, for example, PBD 534 is playing audio content associated with a movie, then the media playback system may inform the networked microphone system that PBD 534 is unavailable but that PBDs 532, 536, and 538 are available. In some embodiments, the media playback system may inform the networked microphone system of the availability (or unavailability) of PBDs whenever a PBD changes state from available to unavailable or vice versa. In some embodiments, the media playback system may periodically or semi-periodically inform the networked microphone system as to which PBDs in the media playback system are available or not available. For example, the media playback system may inform the networked microphone system as to which PBDs are available or unavailable every few seconds, every few minutes, or on some other regular or semi-regular basis.

In operation, one or more components of media playback system (i.e., any of PBDs 532-538, CR 522, and/or computing device 506) may send state messaging to any one or more components of the networked microphone system (i.e., any of NMDs 512-516 and/or computing device 504) via any communication path between the media playback system and the networked microphone system. For example, PBD 532 may inform computing device 504 that PBD 532 is now available to perform functions and/or provide feedback in response to voice commands by sending state change messaging to one or more components of the networked microphone system via networks 546 and/or 542. In another example, computing device 506 may inform computing device 504 as to state (available vs. unavailable) of individual PBDs 532-538. In yet another example, CR 522 may inform one or more components of the networked microphone system as to the state (available vs. unavailable) of individual PBDs 532-538. The media playback system may inform the networked microphone system of PBD state changes in other ways too.

In some embodiments, the media playback system may inform the networked microphone system of the state (available vs. unavailable) of particular PBDs in the media playback system on an PBD by PBD and an NMD by NMD basis. For example, the media playback system may indicated that active PBDs in the kitchen are available to provide feedback in response to voice commands received from NMDs in the kitchen, but that active PBDs in other rooms are not available to provide feedback in response to voice commands received from NMDs in the kitchen.

In response to determining that the primary PBD associated with the NMD that received the voice command is available to perform a function and/or provide feedback in response to the voice command, the networked microphone system (e.g., any of NMDs 512-516 or computing device 504, individually or in combination) instructs the primary PBD to perform the function and/or provide a first feedback in response to the voice command.

In operation, the networked microphone system may instruct the primary PBD to perform the function called for in the voice command either directly or indirectly. For example, in some embodiments, one of the NMDs 512-516 may instruct the primary PBD directly via network 546 to perform the desired function. In other embodiments, one of the NMDs 512-516 may instruct CR 522 via network 546 to perform the function called for in the voice command, and CR 522 may then instruct the primary PBD to perform the function. In still further embodiments, computing device 504 may instruct computing device 506 to perform the function called for by the voice command, and computing device 506 may then instruct the primary PBD via network 544 to perform the function. In still further embodiments, computing device 504 may instruct CR 522 to perform the function called for by the voice command, and computing device 504 may then instruct the primary PBD to perform the function. In still further embodiments, computing device 504 may directly instruct the primary PBD to perform the function called for by the voice command. The networked microphone system may instruct the primary PBD to perform functions in other direct or indirect ways as well Similarly, in operation, the networked microphone system may instruct the primary PBD to provide the first feedback either directly or indirectly. For example, in some embodiments, one of the NMDs 512-516 may instruct the primary PBD directly via network 546 to provide the first feedback. In other embodiments, one of the NMDs 512-516 may instruct CR 522 via network 546 to provide feedback, and CR 522 may then instruct the primary PBD to provide the feedback. In still further embodiments, computing device 504 may instruct computing device 506 to provide feedback, and computing device 506 may then instruct the primary PBD via network 544 to provide the feedback. In still further embodiments, computing device 504 may instruct CR 522 to provide feedback, and computing device 504 may then instruct the primary PBD to provide the feedback. In still further embodiments, computing device 504 may directly instruct the primary PBD to provide the feedback. The networked microphone system may instruct the primary PBD to provide the first feedback in other direct or indirect ways as well.

In some embodiments, the networked microphone system instructing the primary PBD to provide the first feedback in response to the voice command may also include the networked microphone system providing the primary PBD with the content of the first feedback. For example, in response to the voice command of "What is the name of this band?", the networked microphone system (i.e., any of NMDs 512-516 or computing device 504, individually or in combination) may access metadata from the networked media system (i.e., from any of the PBDs 532-538 and computing device 506, individually or in combination) about the audio track that the media playback system is currently playing to determine the name of the band performing the currently playing track, and then instruct the primary PBD to provide audio feedback of "The name of the band is The Beatles."

But in response to determining that the primary PBD associated with the NMD that received the voice command is not available to perform functions or provide feedback in response to the voice commands, the networked microphone device may instruct a fallback device to perform the function or provide a second feedback in response to the voice command.

For example, if a particular NMD's primary PBD is unavailable to play back audio for some reason, then the networked microphone system (individually or in combination with the media playback system) may instruct a fallback PBD to play back the audio.

In some embodiments, when the voice command calls for feedback, the second feedback may be the same as the first feedback. For example, in response to the voice command of "What is the name of this band?", rather than the networked microphone system instructing the primary PBD to provide audio feedback of "The name of the band is The Beatles," the networked microphone system may instead instruct the fallback device to provide audio feedback of "The name of the band is The Beatles." In operation, the first feedback may be one or more of (i) an audio feedback, such as a voice response (e.g., "The name of the band is The Beatles"), a beep, or other audio indication, (ii) a visual feedback, such as a flashing light or other visual indication, and (iii) a haptic feedback, such as a vibration or other haptic indication.

But in other embodiments, the second feedback may be different than the first feedback. In operation, the second feedback may be any one or more of (i) an audio feedback, such as a voice response (e.g., "The name of the band is The Beatles"), a beep, or other audio indication, (ii) a visual feedback, such as a flashing light or other visual indication via the fallback device (e.g., a text message or application notification), and (iii) a haptic feedback, such as a vibration or other haptic or physical indication. Whether the second feedback is the same as or different than the first feedback may depend on whether the fallback device has the same output capabilities as the primary PBD. For example, some fallback devices may not have a speaker to provide audio feedback. In some embodiments, the content of the second feedback may be different than the first feedback because the primary PBD is unavailable. For example, in the earlier scenario where the voice command is "What is this band?", the second feedback may be an audio indication from the fallback device that states "The primary playback device is offline; the name of the band is The Beatles."

In some embodiments, the fallback device that performs the function and/or provide the second feedback (depending on the content of the voice command) is at least one of (i) another PBD in the media playback system, (ii) a computing device configured to control the media playback system, such as CR 522, (iii) the NMD that received the voice command, and/or (iv) another NMD of the networked microphone system.

In some embodiments, the networked microphone system (i.e., any of NMDs 512-516 and computing device 504, individually or in combination) may select a fallback device from a set of one or more fallback devices. In other embodiments, the media playback system (i.e., any of PBDs 532-538, CR 522, and computing device 506, individually or in combination) may select a fallback device from a set of one or more fallback devices. In either scenario, selecting a fallback device from a set of one or more fallback devices comprises one of (i) selecting a fallback device according to a pre-defined hierarchy of fallback devices, (ii) selecting a fallback device from one or more media playback devices configured to playback media content in synchrony with the primary media playback device, (iii) selecting a fallback device from one or more media playback devices that were previously configured to playback media content in synchrony with the primary media playback device, or (iv) selecting a secondary media playback device as the fallback device, wherein the primary media playback device is configured to play back a first channel of media content and wherein the secondary media playback device is configured to play back a second channel of the media content.

For example, some embodiments may have a pre-defined hierarchy of fallback devices to select from. In some embodiments, the pre-defined hierarchy may be user configurable. In some embodiments, the pre-defined hierarchy may be configured by the manufacturer of the components of the media playback system and/or the manufacturer of the components of the networked microphone system. In some embodiments, the computing device 506 (or perhaps the computing device 504) may change the hierarchy of fallback devices from time to time as the configuration of the networked microphone system and/or the configuration of the media playback system changes over time.

According to one example hierarchy, one or both of the networked microphone system or the media playback system, individually or in combination, may first determine whether the primary PBD is a member of a bonded pair of PBDs, and if so, select the other PBD in the bonded pair as the fallback device.

But if the primary PBD is not a member of a bonded pair, then one or both of the networked microphone system or the media playback system, individually or in combination, may determine whether the primary PBD is a member of a synchrony group, and if so, select a fallback device from the other PBD(s) in the synchrony group.

But if the primary PBD is not a member of a bonded pair or a synchrony group, then one or both of the networked microphone system or the media playback system, individually or in combination, may determine whether the media playback device includes any other PBDs, and if so, select a fallback device from one of the other PBDs in the media playback system.

Then, if the primary PBD is not a member of a bonded pair or a synchrony group, and if the primary PBD is the only PBD in the media playback system, then one or both of the networked microphone system or the media playback system, individually or in combination, may determine whether the computing device configured to control the media playback system (e.g., CR 522) is active, and if so, select the computing device as fallback device. In operation, CR 522 may provide audio feedback from its own speakers, visual feedback on the screen (e.g., via the user interface application controlling the media playback system, via an application notification, via a text message, or via some other visual feedback), or haptic feedback (e.g., a vibration).

And finally, if the primary PBD is not a member of a bonded pair or a synchrony group, and if the primary PBD is the only PBD in the media playback system, and if the computing device configured to control the media playback system is not active, then one or both of the networked microphone system or the media playback system, individually or in combination, may determine whether other network devices outside of the media playback system are available to provide feedback, e.g., the NMD that received the voice command, other NMDs in the networked microphone system, networked televisions, networked clock radios, or other devices, and if so, select a fallback device from the set of available networked devices that are not part of the media playback system. Other pre-defined hierarchies of devices in any combination, order, or arrangement are possible as well.

Alternatively, rather than having a hierarchy of potential fallback devices, in some embodiments, one or both of the networked microphone system or the media playback system, individually or in combination, may be configured to select a fallback device from one or more other PBDs associated with the primary PBD, such as (i) one or more other PBDs in a consolidated media playback device with the primary PBD, (ii) one or more other PBDs in a bonded pair with the primary PBD, (iii) one or more other PBDs in a synchrony group with the primary PBD, (iv) one or more other PBDs that were previously in a consolidated playback device with the primary PBD, (v) one or more other PBDs that were previously in a bonded pair with the primary PBD, (vi) one or more other PBDs that were previously in a synchrony group with the primary PBD, (vii) one or more other PBDs that are in the media playback system with the primary PBD, (viii) one or more other PBDs that were previously in the media playback system with the primary PBD.

In some embodiments, the fallback device may additionally or alternatively indicate that the primary PBD is unavailable, such as via one or more of (i) an audio indication, (ii) a visual indication, and (iii) a haptic indication. For example, in addition to (or perhaps instead of) providing second feedback, the fallback device may indicate (e.g., inform the user) that the primary PBD that would ordinarily provide feedback in response to voice commands is currently unavailable to provide feedback in response to voice commands. In one example, the indication that the primary PBD is unavailable may be an audio indication that states, for example, "The primary playback device is currently unavailable." This indication could be an audio indication played out loud by any of (i) another PBD in the media playback system, (ii) a computing device configured to control the media playback system (e.g., CR 522), (iii) the NMD that received the voice command, (iv) another NMD in the networked microphone system, or (v) perhaps some other device in communication with the media playback system and/or the networked microphone system. Alternatively, the indication that the primary PBD is unavailable my be any other type of audible, visual, and/or haptic indication. For example, if the fallback device is CR 522, the indication that the primary PBD is unavailable may be a text message or application notification displayed on the screen of CR 522 and/or a vibration by the CR 522 device.

Some embodiments may additionally include the controller device (e.g., CR 522) and a PBD performing separate functions and/or providing separate feedback to the user when the primary PBD is not available to perform functions and/or provide feedback in response to voice commands. In one example, the networked microphone system receives a voice command to "Play All You Need is Love", and after determining that the primary PBD associated with the NMD that received the voice command is unavailable, the networked microphone system (alone or perhaps in combination with the media playback system) may both (i) instruct a fallback device to play the song and (ii) instruct the controller to display a message to the user that the primary PBD is unavailable. Thus, in this manner, the fallback device performs the function and another device provides feedback.

The above-described examples describe the networked microphone system (or perhaps the media playback system) selecting the fallback device. In operation, the networked microphone system selecting the fallback device may include any of the NMDs 512-516 or the computing device 504 (individually or in combination) selecting the fallback device. Similarly, the media playback system selecting the fallback device may include any of the PBDs 532-538, CR 522, or computing device 506 (individually or in combination) selecting the fallback device.

In addition to PBDs being available or unavailable to perform functions and/or provide feedback in response to voice commands, NMDs may also be available or unavailable to receive voice commands. Like the notion of individual NMDs having a primary PBD described above, in some embodiments, an individual PBD may have a corresponding primary NMD. For example, just like a particular NMD in the kitchen may have a corresponding primary PBD that is also in the kitchen, the PDB in the kitchen may have the NMD in the kitchen configured as its primary NMD. In this manner, a particular NMD might be paired with a particular PBD such that the NMD is the primary NMD for the PBD and the PBD is the primary PBD for the NMD. A formal software-based pairing between a NMD and a PBD is not required in all embodiments, but could be present in some embodiments.

Some embodiments include determining that a primary NMD of a networked microphone system is not available to receive voice commands for a media playback system having one or more PBDs. In operation, a primary NMD may be unavailable because the NMD is (i) in a do not interrupt state, (ii) in a power save mode, (iii) unreachable via a network configured to support communications between the media playback system and the NMD, (iv) unplugged, or (v) powered off. The primary NMD may alternatively be unavailable if it has been moved to a different room than its corresponding primary PBD (or if the NMD's corresponding primary PBD has been moved to a different room).

In response to determining that the primary NMD is not available to receive voice commands, one or both of the networked microphone system and the media playback system, individually or in combination, designates a fallback microphone to receive voice commands for the media playback system as a whole or for at least one PBD of the media playback system.

In some embodiments, determining that a primary NMD of the networked microphone system is not available to receive voice commands for the media playback system (or at least one PBD of the media playback system) includes the media playback system receiving a message from the networked microphone system indicating that the primary NMD is not available to receive voice commands. For some embodiments where individual PBDs in the media playback system each have corresponding primary NMDs in the networked microphone system, the networked microphone system may indicate which NMDs are available vs. unavailable to receive voice commands on a PBD by PBD basis.

In some embodiments, the networked microphone system may periodically or semi-periodically provide state information as to the availability or unavailability of individual NMDs of the networked microphone system to the media playback system.

In some embodiments, the networked microphone system may inform the media playback system of the state (available vs. unavailable) of particular NMDs in the networked microphone system. For example, if the networked microphone system knows that NMD 512 is in a "do not interrupt" state because, for example, NMD 512 is executing a software or firmware upgrade, then the networked microphone system may inform the media playback system that NMD 512 is unavailable but that NMDs 514 and 516 are available. In some embodiments, the networked microphone system may inform the media playback system of the availability (or unavailability) of NMDs whenever an NMD changes state from available to unavailable or vice versa. In some embodiments, the networked microphone system may periodically or semi-periodically inform the media playback system as to which NMDs in the networked microphone system are available or not available. For example, the networked microphone system may inform the media playback system as to which NMDs are available or unavailable every few seconds, every few minutes, or on some other regular or semi-regular basis.

In operation, one or more components of the networked microphone system (i.e., any of NMDs 512-516 and/or computing device 504) may send state messaging to any one or more components of the media playback system (i.e., any of PBDs 532-538, CR 522, and/or computing device 506) via any communication path between the networked microphone system and the media playback system. For example, NMD 512 may inform computing device 506 that NMD 512 is now available to receive voice commands by sending state change messaging to one or more components of the media playback system via networks 546 and/or 544. In another example, computing device 504 may inform computing device 506 as to state (available vs. unavailable) of individual NMDs 512-516. In yet another example, CR 522 may monitor the availability of NMDs 512-516 and inform one or more other components of the media playback system as to the state (available vs. unavailable) of individual NMDs 512-516. The networked microphone system may advise the media playback system of NMD state changes in other ways too.

In operation, one or both of the networked microphone system and the media playback system, individually or in combination, may designate one of a variety of available microphones as a fallback microphone to receive voice commands. For example, in some embodiments, the fallback microphone is a microphone on one of the PBDs in the media playback system. In other embodiments, the fallback microphone may be a microphone on a computing device configured to control the media playback system, such as CR 522 for example. In other embodiments, the fallback microphone may be a microphone on a secondary NMD of the networked microphone system. In still further embodiments, the fallback microphone may be a microphone on some other device in communication with one or both of the networked microphone system and/or the media playback system.

In some embodiments, one or both of the networked microphone system and the media playback system, individually or in combination, may select a fallback microphone according to a defined hierarchy. For example, in some embodiments, one or both of the networked microphone system and the media playback system, individually or in combination, may first determine whether the networked microphone system includes one or more additional NMDs, and if so, one or both of the networked microphone system and the media playback system, individually or in combination, may select one of the other NMDs of the networked microphone system as the fallback microphone for the media playback system (or select one of the other NMDs as the fallback microphone for one or more PBDs of the media playback system).

If the networked microphone system does not have any other NMDs, then one or both of the networked microphone system and the media playback system, individually or in combination, may select one of the PBDs of the media playback system to use its onboard microphone (if so equipped) as the fallback microphone for receiving voice commands for the media playback system (or for one or more PBDs of the media playback system). Next, if the networked microphone system does not have any additional NMDs, and if none of the PBDs in the media playback system have microphones, then one or both of the networked microphone system and the media playback system, individually or in combination, may select the computing device configured to control the media playback system (e.g., CR 522) to use its microphone as the fallback microphone for receiving voice commands for the media playback system (or at least for one or more PBDs of the media playback system).

And if the networked microphone system does not have any other NMDs, if none of the PBDs in the media playback system have a microphone (or if the microphones are not usable or if the PBDs are positioned in a location that makes its microphone unusable or at least undesirable for use because it is in a remote location of the house), and if the computing device configured to control the media playback system (e.g., CR 522) does not have a microphone (or if the microphone is in use by some other application running on CR 522, e.g., if CR 522 is engaged in a telephone call), then one or both of the networked microphone system and the media playback system, individually or in combination, may select some other device on the network with a microphone to use that microphone as a fallback microphone for receiving voice commands for the media playback system. Other hierarchies of fallback microphone selection could be used as well, including any combination of the above-described fallback microphones in any order. In some embodiments, the fallback microphone selection hierarchy may be user configurable.

In some embodiments, in response to determining that the primary NMD is not available to receive voice commands, one or both of the networked microphone system and the media playback system, individually or in combination, may additionally instruct another device to indicate that the primary NMD is unavailable. In operation, indicating that the primary NMD is unavailable comprises one or more of (i) an audio indication, (ii) a visual indication, and (iii) a haptic indication. In operation, the other device that indicates that the primary NMD is unavailable may include any of (i) any of the PBDs in the media playback system, (ii) another NMD in the networked microphone system, (iii) any computing device configured to control the media playback system, e.g., CR 522, or (iv) any other device in communication with the networked microphone system and/or the media playback system and configurable to provide or otherwise output an indication that the primary NMD is not available to receive voice commands.

Figure 22:
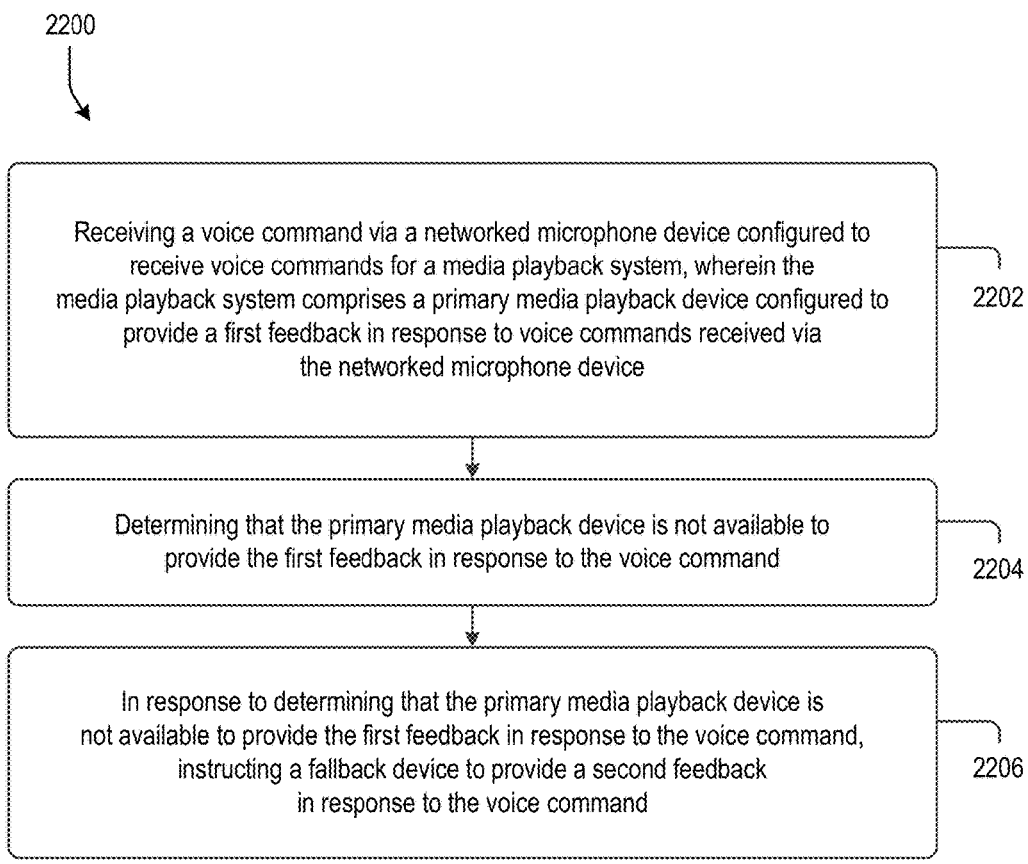
FIG. 22 shows aspects of an example method for handling of loss of pairing between networked devices according to some embodiments.

Method 2200 shown in FIG. 22 presents an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, and/or the networked microphone device of FIG. 6. Method 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 2200 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 2200 and other processes and methods disclosed herein, each block in FIG. 22 may represent circuitry that is wired to perform the specific logical functions in the process.

Method 2200 begins at block 2202, which includes receiving a voice command via a networked microphone device configured to receive voice commands for a media playback system, wherein the media playback system comprises a primary media playback device configured to provide a first feedback in response to voice commands received via the networked microphone device. In some embodiments, the first feedback is one or more of (i) an audio feedback, (ii) a visual feedback, and (iii) a haptic feedback as described herein.

In some embodiments, method block 2202 may additionally or alternatively include receiving a voice command via a networked microphone device configured to receive voice commands for a media playback system, wherein the media playback system comprises a primary media playback device configured to perform a function in response to voice commands received via the networked microphone device. In some embodiments, the function is one or more of (i) a playback function, e.g., start/stop playback, skip a track, (ii) a playlist function, e.g., add/remove a track from a playlist, (iii) a playback device configuration function, e.g., raise/lower volume, change equalizer settings, (iv) a media playback system configuration function, e.g., group playback devices into a synchrony group, activate a zone scene, and/or (v) any other function that can be performed by a playback device individually or by the media playback system as a whole.

Next, method 2200 advances to block 2204, which includes determining that the primary media playback device is not available to provide the first feedback in response to the voice command. In some embodiments, method block 2204 may additionally or alternatively include determining that the primary media playback device is not available to perform the function called for in the voice command.

In some embodiments, determining that the primary media playback device is not available to provide the first feedback and/or perform functions in response to the voice command comprises determining that the primary media playback device is one of (i) muted, (ii) in a do not interrupt state, (iii) in a power save mode, or (iv) unreachable via a network configured to support communications between the media playback system and the networked microphone device. In some embodiments, determining that the primary media playback device is not available to provide the first feedback and/or perform functions in response to the voice command comprises receiving a message from the media playback system indicating that the primary media playback device is not available.

In some embodiments, method 2200 additionally includes the optional step of selecting a fallback device from a set of one or more fallback devices. In some embodiments, selecting a fallback device from a set of one or more fallback devices comprises one of (i) selecting a fallback device according to a pre-defined hierarchy of fallback devices, (ii) selecting a fallback device from one or more media playback devices configured to playback media content in synchrony with the primary media playback device, (iii) selecting a fallback device from one or more media playback devices that were previously configured to playback media content in synchrony with the primary media playback device, or (iv) selecting a secondary media playback device as the fallback device, wherein the primary media playback device is configured to play back a first channel of media content and wherein the secondary media playback device is configured to play back a second channel of the media content. The fallback device may be any one of (i) another media playback device of the media playback system, (ii) a computing device configured to control the media playback system, or (iii) the networked microphone device.

Finally, method 2200 advances to block 2206, which includes, in response to determining that the primary media playback device is not available to provide the first feedback in response to the voice command, instructing a fallback device to provide a second feedback in response to the voice command. In some embodiments, the second feedback is one or more of (i) an audio feedback, (ii) a visual feedback, and (iii) a haptic feedback as described herein. In some embodiments, the second feedback is the same as the first feedback.

In some embodiments, block 2206 may additionally or alternative include, in response to determining that the primary media playback device is not available to perform functions in response to the voice command, instructing a fallback device to perform the function or functions called for in the voice command.

Some embodiments of method 2200 may additionally include in response to determining that the primary media playback device is not available to provide the first feedback and/or perform functions in response to the voice command, additionally instructing the fallback device to indicate that the primary media playback device is unavailable, wherein indicating that the primary media playback device is unavailable comprises one or more of (i) an audio indication, (ii) a visual indication, and (iii) a haptic indication, as described herein.

Figure 23:
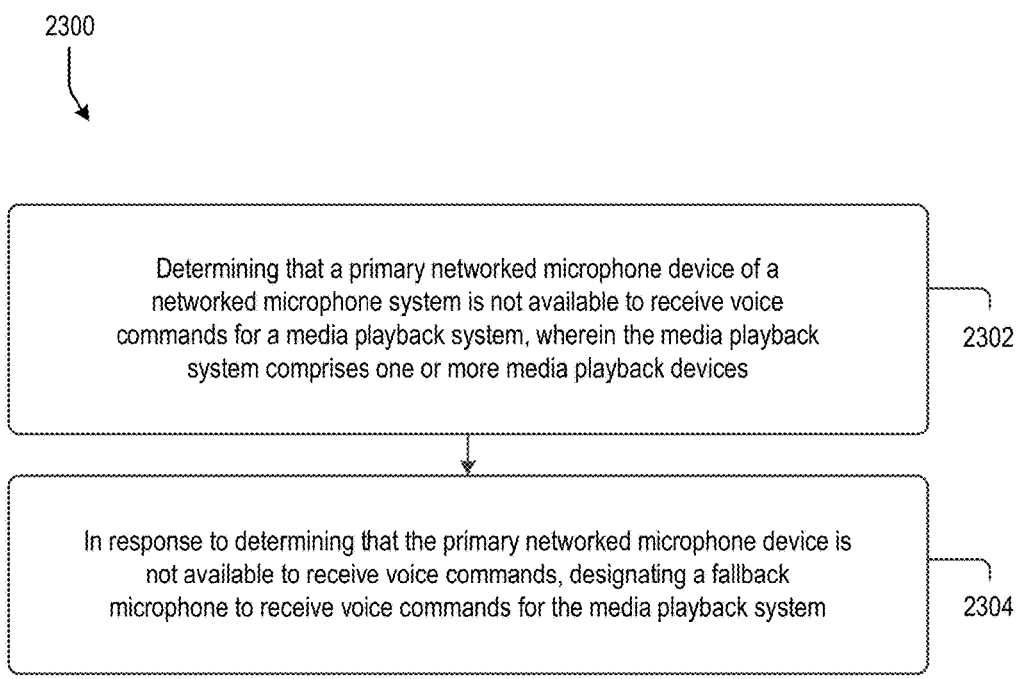
FIG. 23 shows aspects of an example method for handling of loss of pairing between networked devices according to some embodiments.

Method 2300 shown in FIG. 23 presents an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, and/or the networked microphone device of FIG. 6. Method 2300 may include one or more operations, functions, or actions as illustrated by one or more of blocks 2302-2304. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 2300 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

Method 2300 begins at block 2302, which includes determining that a primary networked microphone device of a networked microphone system is not available to receive voice commands for a media playback system, wherein the media playback system comprises one or more media playback devices.

In some embodiments, the primary networked microphone device may be unavailable to receive voice commands because the networked microphone device is (i) in a do not interrupt state, (ii) in a power save mode, (iii) unreachable via a network configured to support communications between the media playback system and the networked microphone device, (iv) unplugged, or (v) powered off. The primary networked microphone device may alternatively be unavailable if it has been moved to a different room than its corresponding primary media playback device (or if the networked microphone device's corresponding primary media playback device has been moved to a different room). In some embodiments, determining that a primary networked microphone device of a networked microphone system is not available to receive voice commands for a media playback system comprises receiving a message indicating that the primary microphone device is not available to receive voice commands.

Next, method 2300 advances to block 2304, which includes in response to determining that the primary networked microphone device is not available to receive voice commands, designating a fallback microphone to receive voice commands for the media playback system. In operation, the step of designating a fallback microphone to receive voice commands for the media playback system may be performed by any component(s) of the networked microphone system (e.g., with reference to FIG. 5, any of NMDs 512-516 or computing device 504, individually or in combination) or any component(s) of the media playback system (e.g., with reference to FIG. 5, any of PBDs 532-538, CR 522, or computing device 506, individually or in combination).

In operation, the fallback microphone may include any of (i) a microphone on a media playback device in the media playback system (e.g., a microphone on any of PBDs 532-538), (ii) a microphone on a computing device configured to control the media playback system (e.g., CR 522 in FIG. 5), (iii) a microphone on a secondary networked microphone device of the networked microphone system, or (iv) another microphone on another device in communication with the networked microphone system and/or the media playback system.

In some embodiments, method 2300 may additionally or alternatively include the step of in response to determining that the primary networked microphone device is not available to receive voice commands, additionally instructing a computing device configured to control the media playback system to indicate that the primary networked microphone device is unavailable, wherein indicating that the primary networked microphone device is unavailable comprises one or more of (i) an audio indication, (ii) a visual indication, and (iii) a haptic indication, as described herein. Also, in some embodiments, method 2300 may additionally or alternatively include the step of in response to determining that the primary networked microphone device is not available to receive voice commands, additionally instructing one or more media playback devices of the media playback system to indicate that the primary networked microphone device is unavailable, wherein indicating that the primary networked microphone device is unavailable comprises one or more of (i) an audio indication, (ii) a visual indication, and (iii) a haptic indication, as described herein.

X. Example Systems and Methods for Taking Action Based on User Identification Listening to media content out loud can be a social activity that involves family, friends, and guests. Media content may include, for instance, talk radio, books, audio from television, music stored on a local drive, music from media sources (e.g. Pandora® Radio, Spotify®, Slacker®, Radio, Google Play™, iTunes Radio), and other audible material. In a household, for example, people may play music out loud at parties and other social gatherings. In such an environment, people may wish to play the music in one listening zone or multiple listening zones simultaneously, such that the music in each listening zone may be synchronized, without audible echoes or glitches. Such an experience may be further enriched when people can use voice commands to control an audio playback device or system. For example, a person may wish to change the audio content, playlist, or listening zone, add a music track to a playlist or playback queue, or change a playback setting (e.g. play, pause, next track, previous track, playback volume, and EQ settings, among others).

Listening to media content out loud can also be an individual experience. For example, an individual may play music out loud for themselves in the morning before work, during a workout, in the evening during dinner, or at other times throughout the day at home or at work. For these individual experiences, the individual may choose to limit the playback of audio content to a single listening zone or area. Such an experience may be further enriched when an individual can use a voice command to choose a listening zone, audio content, and playback settings, among other settings.

Identifying the person trying to execute the voice command can also be an important element of the experience. It may be desirable to execute a voice command based on who the person is and what the person wants the media playback device or system to do. By way of illustration, at a party or a social gathering in a household, the host or household owner may want to prevent certain guests from using a voice command to change the audio content, listening zone, or playback settings. In some cases, the host or household owner may want to allow certain guests to use voice commands to change the audio content, listening zone, or playback settings, while preventing other guests from making such changes. User identification based on user profiles or voice configuration settings can help distinguish a household owner's voice from a guest's voice.

In another example, user identification can be used to distinguish an adult's voice from a child's voice. In some cases, the household owner may want to prevent a child from using a voice command to listen to audio content inappropriate for the child. In other cases, a household owner may want to prevent a child from changing the listening zone, or playback settings. For example, the household owner may want to listen to audio content at a certain volume and prevent a child from changing the volume of the audio content. User identification may help set parental control settings or restriction settings that would prevent a child from accessing certain content or changing the listening zone, or playback settings. For example, user identification based on user profiles or voice configuration settings may help determine who the child is, what the child is allowed to listen to, or what settings the child is allowed to change.

In yet another example, user identification may be used to prevent unintentional voice commands. For example, the household owner may want to prevent audio from the television or any other audio content from unintentionally triggering a voice command. Many other examples, similar and different from the above, are described herein and illustrate different types of actions based on voice recognition.

Some embodiments described herein include a media playback system (or perhaps one or more components thereof) receiving a voice command and determining an appropriate action for the media playback system to execute based on user identification.

One aspect includes receiving a voice command for a media playback system. In some embodiments, the media playback system includes one or more media playback devices alone or in combination with a computing device, such as a media playback system server. In some embodiments, the media playback system may include or communicate with a networked microphone system server and one or more network microphone devices (NMDs). In some embodiments, the media playback system server and/or the networked microphone system server may be cloud-based server systems. Any one or a combination of these devices and/or servers may receive a voice command for the media playback system.

In some embodiments, one or more functions may be performed by the networked microphone system individually or in combination with the media playback system. In some embodiments, receiving a voice command includes the networked microphone system receiving a voice command via one or more of NMDs, and transmitting the voice command to the media playback system for further processing. In some embodiments, the media playback system may then convert the voice command to an equivalent text command, and parse the text command to identify a command. In some embodiments, the networked microphone system may convert the voice command to an equivalent text command and transmit the text command to the media playback system to parse the text command and identify a command.

A voice command may be a command to control any of the media playback system controls discussed herein. For example, in some embodiments, the voice command may be a command for the media playback system to play media content via one or more playback devices of the media playback system. In some embodiments, the voice command may be a command to modify a playback setting for one or more media playback devices of the media playback system. Playback settings may include, for example, playback volume, playback transport controls, music source selection, and grouping, among other possibilities.

After receiving a voice command, the computing device of the media playback system determines whether the voice command was received from a registered user of the media playback system. In some embodiments, the media playback system may be registered to a particular user or one or more users in a household. In some embodiments, the computing device of the media playback system may be configured to link or associate a voice command to a registered user based on user profiles stored in the computing device. A registered user or users may have created a user profile stored in the computing device. The user profile may contain information specific to the user. For example, the user profile may contain information about the user's age, location, preferred playback settings, preferred playlists, preferred audio content, access restrictions set on the user, and information identifying the user's voice, among other possibilities.

In some embodiments, the computing device of the media playback system may be configured to link or associate a voice command to a user based on voice configuration settings set by a user. In some embodiments, the media playback system may ask a user to provide voice inputs or a series of voice inputs. The computing device of the media playback system may then process the voice inputs, associate the voice inputs to the user, and store the information so that the media playback system can recognize voice commands from the user.

In response to determining that the voice command was received from a registered user, the computing device of the media playback system may configure an instruction or a set of instructions for the media playback system. The instructions may be based on content from the voice command and information in a user profile for the registered user. Additionally or alternatively, the instructions may be based on content from the voice command and voice configuration settings stored on the computing device.

In some embodiments, the content from the voice command may include a command for one or more playback devices to play media content. In some embodiments, based on the command for one or more playback devices to play media content and information in a user profile for the registered user, the computing device of the media playback system may configure an instruction or a set of instructions to cause one or more playback devices to obtain media content from a preferred media source of a registered user. In some embodiments, based on the command for one or more playback devices to play media content and information in a user profile for the registered user, the computing device may configure an instruction or a set of instructions to cause the media playback system to play the media content via one or more playback devices of the media playback system. In some embodiments, based on the command for the one or more playback devices to play media content and information in a user profile for the registered user, the computing device may include instructions to (i) configure the one or more playback devices with one or more of the registered user's preferred playback settings and (ii) cause the one or more playback devices to play the media content via the media playback system with the registered user's preferred playback settings.

In some embodiments, the content from the voice command may include a command for one or more playback devices to play media content but may not identify a particular listening zone or playback zone of the media playback system. Based on the content from the voice command and information in a user profile for the registered user, the computing device may configure an instruction or a set of instructions to cause one or more playback devices to play the media content via one or more media playback devices within the particular playback zone of the media playback system.

In some embodiments, the content from the voice command may include a command for the media playback system to modify a playback setting. Based on the content from the voice command and information in a user profile for the registered user, the computing device may configure an instruction or a set of instructions to cause the media playback system to modify the playback setting for one or more playback devices of the media playback system.

After configuring an instruction or set of instructions for the media playback system, some embodiments of the computing device may send the instruction or set of instructions to one or more playback devices of the media playback system.

Some embodiments include the computing device of the media playback system determining whether the voice command was received from a child. In some embodiments, the computing device may distinguish between an adult and a child based on information in a user profile or a guest profile. In some embodiments, the computing device may distinguish between an adult and a child based on the tone or frequency of the user's voice.

In response to determining that the voice command was received from a child, some embodiments may prevent one or more playback devices from playing given media that may be inappropriate for the child. Some embodiments may prevent the computing device and/or one or more playback devices from modifying a playback setting based on the content of a child's voice command.

Some embodiments include actions based on determining whether a voice command was received from a guest user instead of a registered user of the media playback system. In some embodiments, a registered user may have created a guest profile for the guest user. The guest profile may include any information included in a user profile. In some embodiments, the computing device of the media playback system may determine that a voice command was not received from a registered user, and may then ask the registered user if the voice command came from a guest of the registered user.

In response to determining that the voice command was received from a guest user, the computing device of the media playback system may (1) assign a restriction setting for the guest user, (2) configure an instruction for one or more playback devices based on content from the voice command and the assigned restriction setting for the guest user, and (3) send the instruction to one or more playback devices. A restriction setting may be any setting that limits the control of the media playback system.

To execute a voice command to control the media playback system, it is desirable in some instances for the media playback system to receive a voice command and determine an appropriate action for the media playback system to execute based on user identification (or at least based on the user who spoke the voice command). In some embodiments, the media playback system includes one or more of PBDs 532, 534, 536, and 538 and computing device 506 (which is configured as a media playback system server). In some embodiments, the media playback system may include or communicate with a networked microphone system that includes one or more of NMDs 512, 514, and 516 and computing device 504 (which is configured as a networked microphone system server).

Generally, it should be understood that one or more functions described herein may be performed by the networked microphone system individually or in combination with the media playback system. It should be further understood that one or more functions performed by the computing device 506 may be performed by CR 522 and/or one or more of PBDs 532, 534, 536, and 538 of the media playback system.

Examples of voice commands include commands to control any of the media playback system controls discussed previously. For example, in some embodiments, the voice command may be a command for the media playback system to play media content via one or more playback devices of the media playback system. In some embodiments, the voice command may be a command to modify a playback setting for one or more media playback devices of the media playback system. Playback settings may include, for example, playback volume, playback transport controls, music source selection, and grouping, among other possibilities.

Examples of media content include, talk radio, books, audio from television, music stored on a local drive, or music from media sources, among others. Examples of media sources include Pandora® Radio, Spotify®, Slacker®, Radio, Google Play™, and iTunes Radio, among others.

Examples of user identification include identifying a user as a registered user, a guest user, a child, or an unknown user.

Example registered users include one or more users linked or associated with the media playback system by a user profile, and/or voice configuration settings, among other possibilities. Example user profiles may include information about a user's age, location, preferred playback settings, preferred playlists, preferred audio content, access restrictions set on the user, and information identifying the user's voice, among other possibilities. Example information identifying the user's voice includes the tone or frequency of a user's voice, age, gender, and user history, among other information. Example voice configuration settings may include settings that ask a user to provide voice inputs or a series of voice inputs for the media playback system to recognize and associate the user with.

Example guest users include one or more users linked or associated with the media playback system by a registered user's user profile, or a guest profile created by a registered user or a guest user with the registered user's permission. Example guest profiles may include any type of information included in a user profile.

In some embodiments, a guest with his or her own media playback system in his or her own house may have a user profile associated with his or her own media playback system stored in computing device 506, for example. In operation, when that guest arrives at the host's home and tries to use voice commands to control the host's media playback system, the computing device 506 connected to the host's playback system may be able to access user profile settings of the guest, including but not limited to (i) music services that the guest has user accounts with, (ii) the guest's playlists, (iii) whether the host has granted the guest access to control the host's media playback system, and/or (iv) perhaps other user information in the guest's user profile.

A child user may be identified by, for example, information in a user profile if the child is one of the registered users of the media playback system, information in a guest profile, and/or the tone or frequency of the user's voice.

In some embodiments, receiving a voice command includes the media playback system receiving a voice command via one or more of PBDs 532, 534, 536, and 538 and/or computing device 506 (which is configured as a media playback system server). In one example, computing device 506 may convert the voice command to an equivalent text command, and parse the text command to identify a command.

In some embodiments, one or more functions may be performed by the networked microphone system individually or in combination with the media playback system. In some embodiments, receiving a voice command includes the networked microphone system receiving a voice command via one or more of NMDs 512, 514, or 516, and transmitting the voice command to the computing device 506 and/or one or more of PBDs 532, 534, 536, and 538 for further processing. In some embodiments, the computing device 506 may convert the voice command to an equivalent text command, and parse the text command to identify a command. In some embodiments, the networked microphone system may convert the voice command to an equivalent text command and transmit the text command to the computing device 506 and/or one or more of PBDs 532, 534, 536, and 538 to parse the text command and identify a command.

After receiving a voice command, the computing device 506 and/or one or more of PBDs 532, 534, 536, and 538 determines whether the voice command was received from a registered user of the media playback system. In some embodiments, determining whether the voice command was received from a registered user may include the computing device 506 and/or one or more of PBDs 532, 534, 536, and 538 determining whether there is a user profile stored on the media playback system that is associated with the voice command. For example, the computing device 506 and/or one or more of PBDs 532, 534, 536, and 538 may try to match the voice command to information identifying a user's voice that may be included in a user profile stored on the media playback system. In some embodiments, the networked microphone system individually or in combination with the media playback system may determine whether the voice command was received from a registered user of the media playback system by communicating with computing device 506.

In some embodiments, determining whether the voice command was received from a registered user may include the computing device 506 and/or one or more of PBDs 532, 534, 536, and 538 determining whether the voice command matches the voice inputs in the media playback system's voice configuration settings. For example, a user may have previously configured the media playback system to recognize the user's voice by providing a voice input or a series of voice inputs for the media playback system to recognize and associate the user with. The voice input or series of voice inputs may be stored on the computing device 506 and/or one or more of PBDs 532, 534, 536, and 538. In some embodiments, the voice input or series of voice inputs may be stored on the networked microphone system.

In response to determining that the voice command was received from a registered user, the computing device 506 may configure an instruction or a set of instructions for one or more PBDs of the media playback system. The instructions may be based on content from the voice command and information in a user profile for the registered user. Additionally or alternatively, the instructions may be based on content from the voice command and voice configuration settings stored on the computing device 506, one or more of PBDs 532, 534, 536, and 538, or the networked microphone system.

In some embodiments, the content from the voice command may include a command for one or more PBDs of the media playback system to play media content. In some embodiments, based on the command for the media playback system to play media content and information in a user profile for the registered user, computing device 506 may configure an instruction or a set of instructions to cause one or more of PBDs to obtain media content from a preferred media source of a registered user.

In some embodiments, based on the command for the media playback system to play media content and information in a user profile for the registered user, computing device 506 may configure an instruction or a set of instructions to cause the media playback system to play the media content via one or more PBDs of the media playback system.

In some embodiments, based on the command for the media playback system to play media content and information in a user profile for the registered user, the computing device 506 may include instructions to (i) configure the media playback system with one or more of the registered user's preferred playback settings and (ii) cause one or more PBDs to play the media content with the registered user's preferred playback settings. Preferred playback settings may be preferred playback settings stored in a registered user's user profile. Additionally or alternatively, preferred playback settings may be based on user history stored in a registered user's user profile. User history may include commonly used or previously used playback settings by the user to play media content.

In some embodiments, the content from the voice command may include a command for the media playback system to play media content but may not identify a particular listening zone or playback zone of the media playback system. Based on this content and information in a user profile for the registered user, such as user history, the computing device 506 may (i) configure an instruction or a set of instructions to cause the media playback system to play the media content via one or more PBDs within the particular playback zone of the media playback system and (ii) implement the configured instruction or set of instructions to play the media content via the one or more PBDs.

In some embodiments, the content from the voice command may include a command for the media playback system to modify a playback setting. Based on the command for the media playback system to modify a playback setting and information in a user profile for the registered user, the computing device 506 may (i) configure an instruction or a set of instructions to cause the media playback system to modify the playback setting for one or more PBDs of the media playback system and (ii) implement the configured instruction or set of instructions to modify the playback setting via the one or more PBDs.

Some embodiments include the media playback system determining whether the voice command was received from a child. In some embodiments, the computing device 506 may distinguish between an adult and a child based on information in a user profile if the child is one of the registered users of the media playback system. In some embodiments, the computing device 506 may distinguish between an adult and a child based on the tone or frequency of the user's voice.

In response to determining that the voice command was received from a child, some embodiments may prevent one or more PBDs from playing given media that may be inappropriate for the child. Some embodiments may prevent the computing device 506 and/or one or more PBDs from modifying a playback setting based on the content of a child's voice command. For example, the computing device 506 and/or one or more PBDs may disregard a child's voice command to increase the volume of one or more PBDs.

Some embodiments include the media playback device taking actions based on determining whether a voice command was received from a guest user instead of a registered user of the media playback system. In some embodiments, computing device 506 may have stored a previously created guest profile that may be associated with a particular guest. In some embodiments, computing device 506 may determine that a voice command was not received from a registered user, and may then ask the registered user if the voice command came from a guest. The registered user may then have the option to prevent the computing device 506 and/or one or more PBDs from executing all or part of the contents of the voice command.

In response to determining that the voice command was received from a guest user, the computing device 506 may (1) assign a restriction setting for the guest user, (2) configure an instruction for one or more PBDs based on content from the voice command and the assigned restriction setting for the guest user, and (3) send the instruction to one or more PBDs for execution. In some embodiments, assigning a restriction setting for a guest user may include the computing device 506 matching the voice command to a particular guest profile stored on the computing device 506 and/or one or more PBDs. The guest profile may include restriction settings, and information regarding the voice of the particular guest user, such as frequency or tone of the guest's voice, among other information described previously. A restriction setting may be any setting that limits the control of the media playback system.

After configuring an instruction or set of instructions for the media playback system, some embodiments may send the instruction or set of instructions to one or more PBDs of the media playback system to execute the instructions. In some embodiments, the media playback system may send the instruction or set of instructions to computing device 506. In some embodiments, the media playback system may send the instruction or set of instructions to the networked microphone system.

Figure 24:
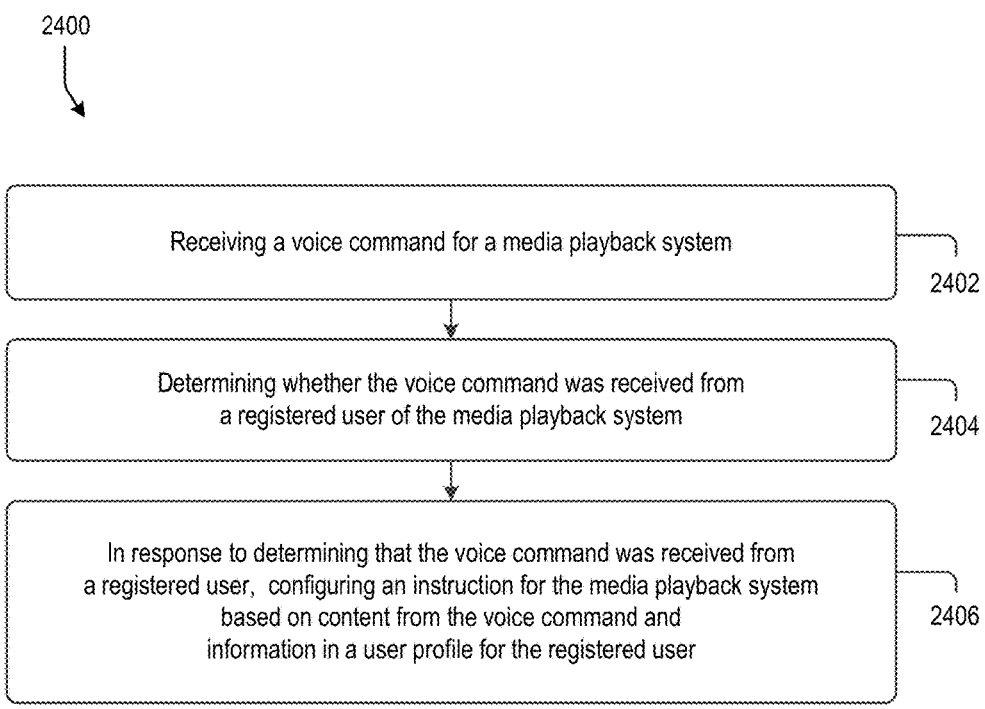
FIG. 24 shows of an example method for taking actions based on a user identification according to some embodiments.

Method 2400 shown in FIG. 24 presents an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, and/or the configuration shown in FIG. 5. Method 2400 may include one or more operations, functions, or actions as illustrated by one or more of blocks 2402-2406. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 2400 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 6 may represent circuitry that is wired to perform the specific logical functions in the process.

Method 2400 begins at block 2402, which includes receiving a voice command for a media playback system. In some embodiments, receiving a voice command includes the media playback system receiving a voice command via one or more of PBDs 532, 534, 536, and 538 and/or computing device 506 (which is configured as a media playback system server). In one example, the computing device 506 may convert the voice command to an equivalent text command, and parse the text command to identify a command.

In some embodiments, one or more functions may be performed by the networked microphone system individually or in combination with the media playback system. In some embodiments, receiving a voice command includes the networked microphone system receiving a voice command via one or more of NMDs 512, 514, or 516, and transmitting the voice command to computing device 506 and/or one or more of PBDs 532, 534, 536, and 538 for further processing. In some embodiments, computing device 506 and/or one or more of PBDs 532, 534, 536, and 538 may convert the voice command to an equivalent text command, and parse the text command to identify a command. In some embodiments, the networked microphone system may convert the voice command to an equivalent text command and transmit the text command to computing device 506 and/or one or more of PBDs 532, 534, 536, and 538 to parse the text command and identify a command.

Next, method 2400 advances to block 2404, which includes determining whether the voice command was received from a registered user of the media playback system. In some embodiments, determining whether the voice command was received from a registered user may include computing device 506 determining whether there is a user profile stored on the media playback system that is associated with the voice command. For example, computing device 506 may try to match the voice command to information identifying a user's voice in a user profile.

In some embodiments, determining whether the voice command was received from a registered user may include determining whether the voice command matches the voice inputs stored in the media playback system's voice configuration settings. For example, a user may have previously configured the media playback system to recognize the user's voice by providing a voice input or a series of voice inputs for the media playback system to recognize and associate the user with. Voice configuration settings may be stored on the computing device 506 and/or one or more of PBDs 532, 534, 536, and 538. Alternatively, the computing device 506 may communicate with the networked microphone system to store the voice configuration settings.

Finally, method 2400 advances to block 2406, which includes in response to determining that the voice command was received from a registered user, configuring an instruction for the media playback system based on content from the voice command and information in a user profile for the registered user.

In some embodiments, the content from the voice command may include a command for one or more PBDs of the media playback system to play media content. In some embodiments, based on the command for one or more PBDs to play media content and information in a user profile for the registered user, the computing device 506 may configure an instruction or a set of instructions to cause the media playback system to obtain media or audio content from a preferred media source of a registered user.

In some embodiments, based on the command for the media playback system to play media content and information in a user profile for the registered user, the media playback system may configure an instruction or a set of instructions to cause the media playback system to play the media content via one or more PBDs of the media playback system.

In some embodiments, based on the command for the media playback system to play media content and information in a user profile for the registered user, the computing device 506 may include instructions to (i) configure the media playback system with one or more of the registered user's preferred playback settings and (ii) cause one or more PBDs of the media playback system to play the media content with the registered user's preferred playback settings. Preferred playback settings may be preferred playback settings stored in a registered user's user profile. Additionally or alternatively, preferred playback settings may be based on user history stored in a registered user's user profile. User history may include commonly used or previously used playback settings by the user to play media content.

In some embodiments, the content from the voice command may include a command for one or more PBDs of the media playback system to play media content but may not identify a particular listening zone or playback zone of the media playback system. Based on this content and information in a user profile for the registered user, such as user history, computing device 506 may configure an instruction or a set of instructions to cause the media playback system to play the media content via one or more media playback devices within the particular playback zone of the media playback system.

In some embodiments, the content from the voice command may include a command for the media playback system to modify a playback setting. Based on the command for the media playback system to modify a playback setting and information in a user profile for the registered user, computing device 506 may (i) configure an instruction or a set of instructions to cause the media playback system to modify the playback setting for one or more PBDs of the media playback system, and (ii) implement the configured instruction or set of instructions to modify the playback setting via the one or more PBDs.

Some embodiments include the media playback system determining whether the voice command was received from a child. In some embodiments, the computing device 506 may distinguish between an adult and a child based on information in a user profile if the child is one of the registered users of the media playback system. In some embodiments, the computing device 506 may distinguish between an adult and a child based on the tone or frequency of the user's voice.

In response to determining that the voice command was received from a child, some embodiments may prevent one or more PBDs of the media playback system from playing given media that may be inappropriate for the child. Some embodiments may prevent the computing device 506 and/or one or more PBDs from modifying a playback setting based on the content of a child's voice command. For example, the computing device 506 may disregard a child's voice command to increase the volume of one or more PBDs.

Some embodiments include actions based on determining whether a voice command was received from a guest user instead of a registered user of the media playback system. In some embodiments, computing device 506 may have stored a previously created guest profile that may be associated with a particular guest. In some embodiments, computing device 506 may determine that a voice command was not received from a registered user, and may then ask the registered user if the voice command came from a guest.

In response to determining that the voice command was received from a guest user, computing device 506 may (1) assign a restriction setting for the guest user, (2) configure an instruction for one or more PBDs based on content from the voice command and the assigned restriction setting for the guest user, and (3) send the instruction to one or more PBDs for execution. In some embodiments, assigning a restriction setting for a guest user may include computing device 506 matching the voice command to a particular guest profile stored on the computing device 506. The guest profile may include restriction settings, and information regarding the voice of the particular guest user, such as frequency or tone of the guest's voice, among other information previously described. A restriction setting may be any setting that limits the control of the media playback system.

After configuring an instruction or set of instructions for the media playback system, some embodiments may send the instruction or set of instructions to one or more PBDs of the media playback system to execute the instructions. In some embodiments, the computing device 506 may send the instruction or set of instructions to the networked microphone system.

XI. Example Systems and Methods for Voice Control of a Media Playback System

Some embodiments described herein involve controlling a media playback system via voice input. As indicated above, the examples provided herein involve a method. The method may include receiving a voice input that includes a command word and one or more media variable instances and determining that the voice input corresponds to music control. The method may further involve determining a command that corresponds to the command word and processing the voice input to identify a media playback system command corresponding to the intent. The voice input may be processed to identify media content related to the one or more music variable instances, and one or more media items of the media content may be determined. The media playback system may be caused to execute the command on the one or more media items.

In another aspect, a non-transitory computer-readable medium is provided. The non-transitory computer readable medium has stored thereon instructions executable by a computing device to cause the computing device to perform functions. The functions include receiving a voice input that includes a command word and one or more media variable instances and determining that the voice input corresponds to music control. The functions may further involve determining a command that corresponds to the command word and processing the voice input to identify a media playback system command corresponding to the intent. The voice input may be processed to identify media content related to the one or more music variable instances, and one or more media items of the media content may be determined. The media playback system may be caused to execute the command on the one or more media items.

In yet another aspect, a system is provided. The apparatus includes a processor and a memory. The memory has stored thereon instructions executable by the apparatus to cause the system to perform functions. The functions include receiving a voice input that includes a command word and one or more media variable instances and determining that the voice input corresponds to music control. The functions may further involve determining a command that corresponds to the command word and processing the voice input to identify a media playback system command corresponding to the intent. The voice input may be processed to identify media content related to the one or more music variable instances, and one or more media items of the media content may be determined. The media playback system may be caused to execute the command on the one or more media items.

Figure 25:
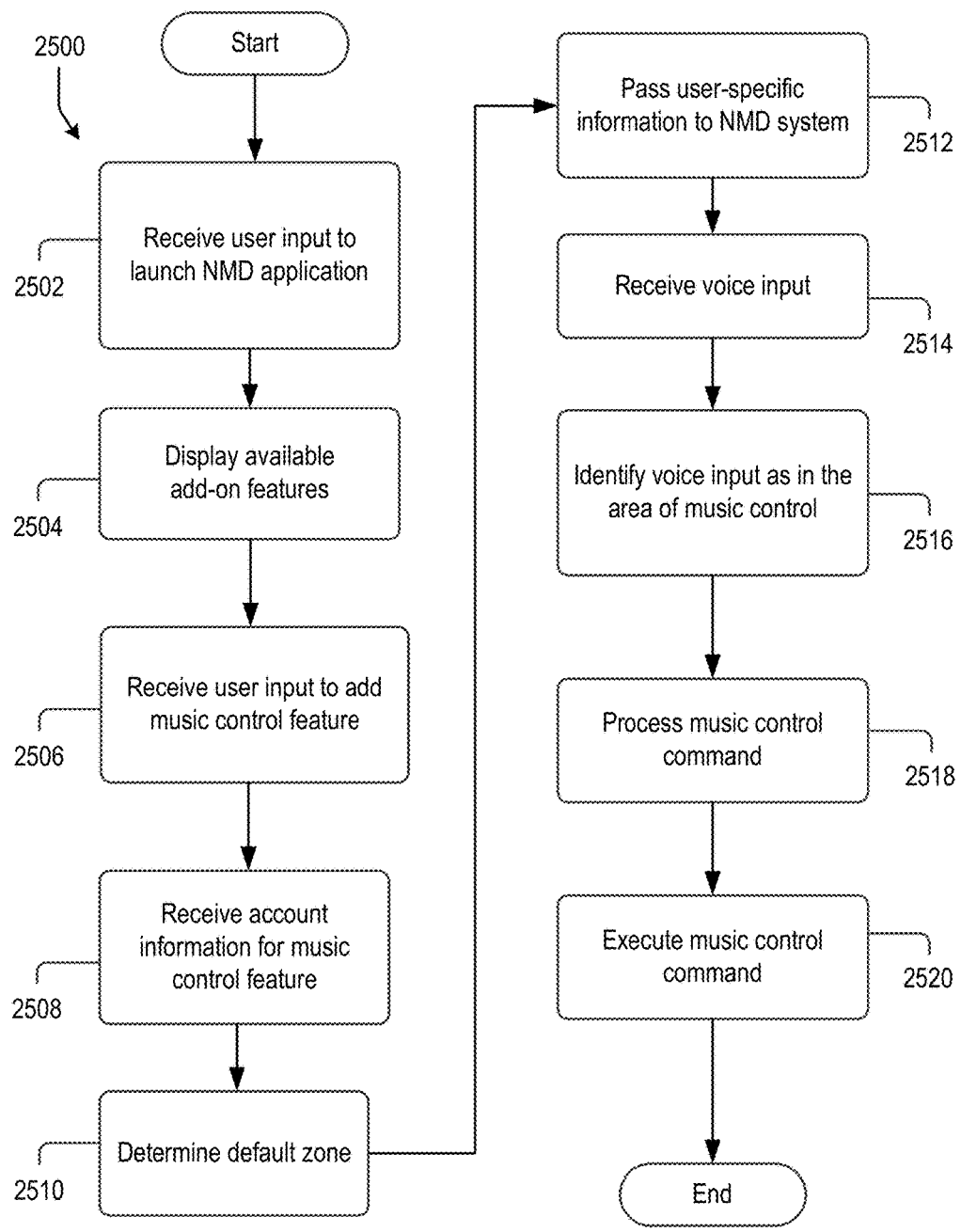
FIG. 25 shows a flow diagram of an example method of music control according to aspects described herein.

As discussed above, some embodiments described herein involve controlling a media playback system. FIG. 25 shows an example flow diagram 2500 of a method for playing an audio response. Method 2500 presents an embodiment of a method that can be implemented within an operating environment involving, for example, the media playback system 100 of FIG. 1, one or more of the playback device 200 of FIG. 2, one or more of the control device 300 of FIG. 3, and one or more of the plurality of devices in system 500 of FIG. 5. Method 2500 may involve transmitting and receiving information between a networked microphone system and the media playback system via various communication paths as described herein and/or using a metadata exchange channel. Method 2500 may include one or more operations, functions, or actions. Although the blocks in FIG. 25 are illustrated in sequential order, these blocks may also be performed in parallel, and/or in a different order than those described herein. Also, the various blocks may be combined into fewer blocks, divided into additional blocks, and/or removed based upon the desired implementation.

In addition, for method 2500 and other processes and methods disclosed herein, the flow diagrams show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 700 and other processes and methods disclosed herein, each block in FIG. 7 may represent circuitry that is wired to perform the specific logical functions in the process.

A user may have received one or more of NMDs 512, 514, 516 and connected the one or more NMDs to one or more networks or communication paths 542, 546. A NMD may be configured to integrate or interface with a media playback system (e.g., computing device 506, CR 522, PBDs 532, 534, 536, 538). The NMDs may be included in a networked microphone system (e.g., NMDs 512, 514, 516, 504).

At block 2502, to configure a NMD to interface or associate a NMD with a media playback system, a user may select on, for example, a control device (e.g., CR 522) to launch an application associated with the NMD or networked microphone system or the media playback system at block 2502. The application may be an application to control features or settings of the networked microphone system and/or the media playback system. The networked microphone system may have one or more specialized add-on features available to provide added or enhanced functionality to the networked microphone system.

Figure 26A:
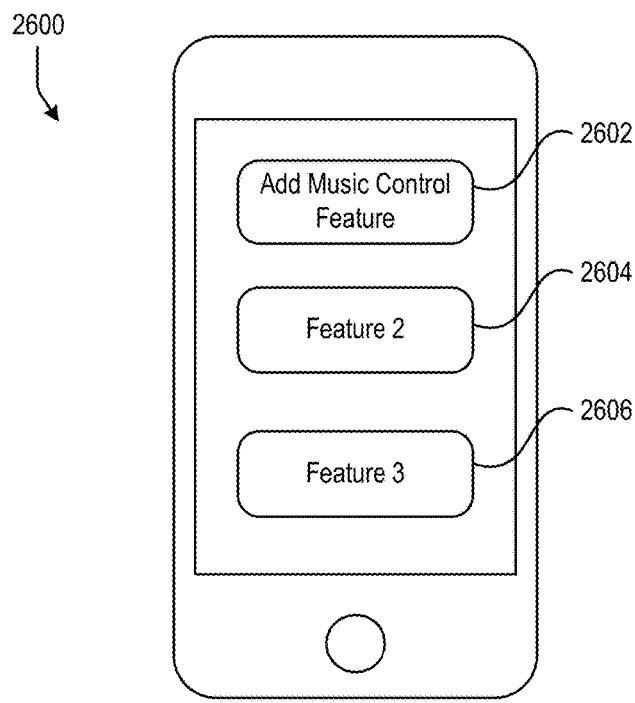
FIGS. 26A-D show example user interfaces of a configuration process according to aspects described herein.
Figure 26B:
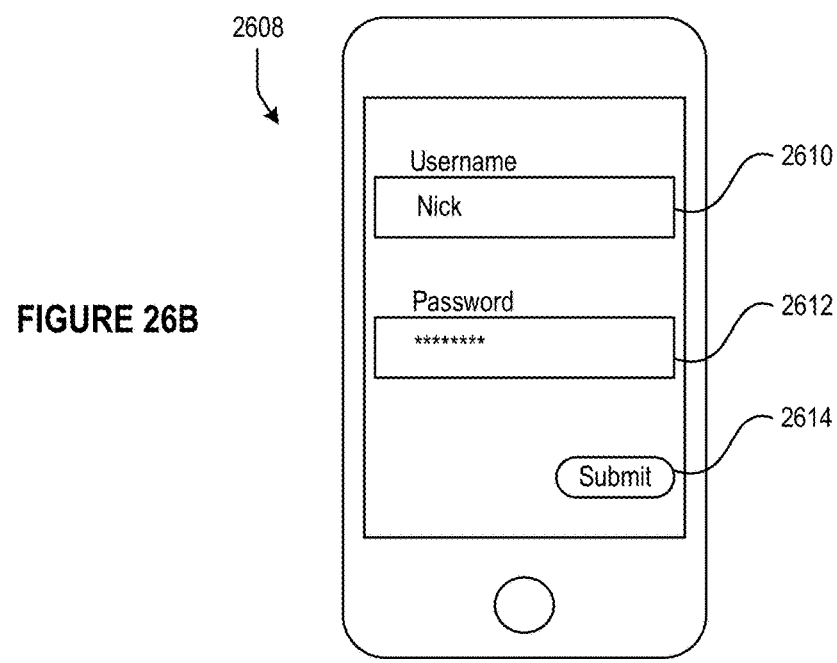

At block 2504, available add-on features for the networked microphone system may be displayed for the user to select. An example user interface 2600 is shown in FIG. 26A displaying available add-on features. The NMD may have one or more available add-on features 2602, 82604, 2606. Feature 2602 may be a music control feature which can, for example, control playback of the media playback system. At block 2506, the control device may receive user input to add the music control feature or skill to the NMD. For example, the user may select to add the music control feature 2602 by selecting feature 2602. The music control feature 2602 may be an application adding music control functionality or skills to the networked microphone system for the user. Upon selecting to add the music control feature 2602, the display may change to show user interface 808 to prompt for account information from the user.

At block 2508, a control device may receive account information for the music control feature via user interface 2608 and input fields 2610 and 2612. The account information may be of an account that a user has with a media playback system and/or a music service. The account information may include a username and password of the account. The username may be entered in field 2610, and the password may be inputted in field 2612. The user may select a button such as a submit button 2614 to submit the username and password for authentication with the media playback system (e.g., computing device 506) and/or music service (e.g., computing device 508). The account information may be transmitted via any of communication paths 542, 544, 546 and/or the metadata exchange channel for authentication at computing device 504, computing device 506, and/or computing device 508. Once authenticated, user information associated with the account may be transmitted from the media playback system to the networked microphone system. The user information may be custom names (e.g., custom zone names, custom playlist names, custom song names, custom album names, custom artist names, etc.), household identifier(s) associated with the user information, PBD identifier(s), and/or zone identifier(s). A custom name may be any name that is provided by the user. For example, a media playback system may provide a list of common zone names for the user to select from when naming a zone and/or give the user the option to type in a name of the zone. An interface of control device 300 may display the list of common zone names and/or display a field in which a user can enter a custom zone name via input (e.g., voice, text) received by the control device 300. Custom name information may be transmitted or shared with any device in system 500.

At block 2510, a default zone (e.g., one or more playback devices) or default zones (e.g., at least two playback devices in different zones, group of at least two zones) may be determined for the NMD. The default zone or playback device (s) may be determined according to any of the methods disclosed and described herein.

Figure 26C:
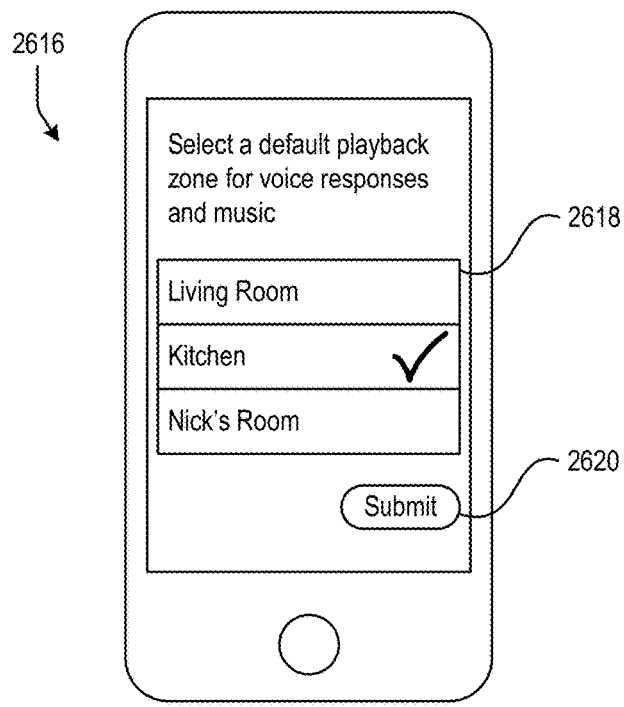
Figure 26D:
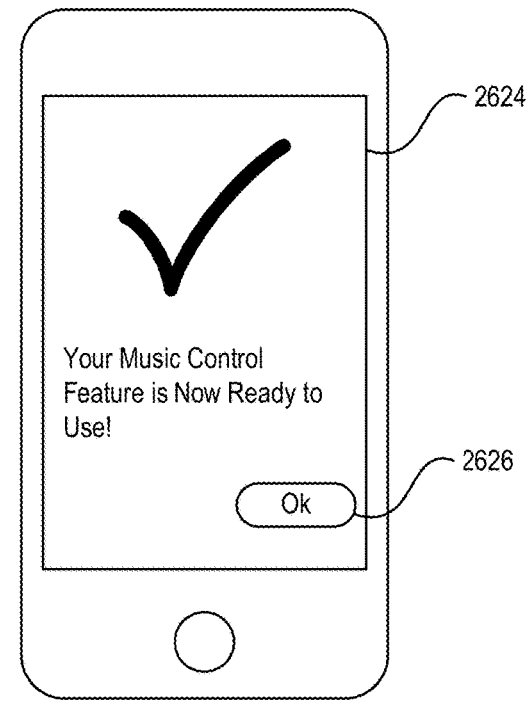

In some aspects, the user may specify the default zone during the initial configuration or setup. User interface 2616 shown in FIG. 26C illustrates an example user interface which enables a user to select a default playback zone to associate with the NMD. User interface 2616 may display a listing of available playback zones 2618. The displayed names of available playback zones may include custom names associated with the user account entered at block 2508. For example, the listing of available playback zones 2618 may include the "Living Room" and "Kitchen" and the custom zone name of "Nick's Room." The displayed listings may be selectable to enable a user to specify the default zone (s) for playback of voice responses and/or music in response to commands received by the NMD or other control device. FIG. 26C shows the example of the user selecting the kitchen as the default zone. The user may select a button 2620 such as a submit button to confirm selection of and submit the selection of the default zone. A confirmation screen 2622 shown in FIG. 26D may be displayed to confirm to the user that the setup process is complete, and the user may select a button 2626 to dismiss the confirmation screen 2622.

At block 2512, user-specific playback information may be sent to the networked microphone system from, for example, the media playback system. The user-specific information may be custom playback information such as custom zone names, custom playlists, and/or custom playlist names. In some aspects, the user-specific information and/or user account may be associated with a household identifier (HHI). The user-specific playback information may be transmitted from the media playback system (e.g., computing device 506, CR 522, PBD 532, PBD 534, PBD 536, and/or PBD 538) to the networked microphone system (e.g., computing device 504, NMD 512, NMD 514, and/or NMD 516), for example, via the metadata exchange channel and/or any other communication path between the media playback system and the networked microphone system.

Computing device 504 may store the custom playback information as dynamic variables which may be variables that can be dynamically associated with different variable types. For example, "Nick's Room" may be a custom zone name and may be stored as a dynamic variable that is associated with a zone variable type. As another example, "Nick's Faves" may be a custom playlist with a custom name created by the user. The name "Nick's Faves" may be stored as a dynamic variable and associated with a playlist variable type. In this manner, the networked microphone system may be aware of and can identify in the voice input custom information associated with the user.

The dynamic variables may be stored in a table or other data structure and dynamically associated with different variable types. For example, each dynamic variable may be associated with one or more variable types. The dynamic variables may be stored with identifiers associated with the user account. For example, the custom zone name of "Nick's Room" may be associated with a zone identifier of the media playback system and/or the identifier(s) of the PBD(s) in the "Nick's Room" zone. As another example, the custom zone name of "Nick's Room" may be stored with a zone identifier tag and/or the identifier(s) of the PBD(s) in the "Nick's Room" zone may be stored with a tag to the "Nick's Room" zone. The dynamic variables may be continuously, periodically, or aperiodically updated to include new custom names added or removed by the user or associated with the user's account. A custom name may be any name supplied by the user which may or might not already exist in a database.

In some aspects, each dynamic variable may be stored or associated with an identifier which may be used to identify the dynamic variable in a media playback system command. For example, the zone name "Nick's Room" may be stored with a zone identifier specific to the media playback system and when a command requests an action to be performed on the playback devices in "Nick's Room" the zone identifier for "Nick's Room" may be supplied in addition to or instead of "Nick's Room" with the media playback system command.

At block 2514, a user can provide voice input by speaking a command or request which may be received by a NMD. The networked microphone system can convert the voice input from speech to text and parse the words to determine the syntax of the voice input. The spoken command may have a particular syntax which the networked microphone system can recognize as being in the area or domain of music playback control. For example, the user may say "play The Beatles in the Kitchen and Nick's Room." The networked microphone system may recognize the word "play" as a command which corresponds to an intent or directly as an intent that is associated with music playback and may identify the spoken command as in the area or domain of music playback control at block 2516.

In another aspect, the presence or inclusion of one or more media variable instances and/or one or more zone variable instances may indicate that the command word "play" corresponds to the "play" intent. The networked microphone system may determine that "The Beatles" corresponds to a media variable instance by searching a music catalog which may include music metadata and determining that, for example, an artist is named "The Beatles." The networked microphone system may determine that "Kitchen" and/or "Nick's Room" correspond to zone names based on common zone names and/or dynamic variables associated with a zone variable type. The combination of the command word "play" with the media variable "The Beatles" and/or "Nick's Room" may enable the networked microphone system to determine that the voice input corresponds to the music control intent of playing requested music.

Because the spoken command is identified as being in the area or domain of music playback control, the networked microphone system may prioritize search results for music content related to "The Beatles" who are known artists and deprioritize or exclude search results for music content related to the homophone "the beetles" which might not be associated with any known artists. In other words, in response to identifying that the voice input is in the music domain, the set of words or vocabulary used for the speech-to-text recognition may be changed to be specific to the music domain which may include words not normally found in a dictionary and/or may be in a dictionary or a word in a language different from the spoken language.

For example, the set of words or vocabulary used for the speech-to-text recognition may be updated to include metadata information of media items (e.g., artist name, track name, album name, song name) in response to determining that the voice input is in the music domain. In some aspects, the voice input may include dictation of letters and/or symbols, for example, for custom names (e.g., zone, playlist), media variables, and/or names of artists, albums, and/or tracks. As another example, word(s) in the resulting text from the speech-to-text conversion may be changed to use media specific words prior to processing the music control command. The speech-to-text conversion for media variable instances may be use words found in music metadata, media catalogs, and/or custom or local media identifiers (e.g., playlist names, track names, album names, artist names etc.) in addition to or instead of standard words used by the networked microphone system. Similarly, the speech-to-text conversion for the zone variable may use custom zone names.

At block 2518, the voice input containing a music control command may be processed. The networked microphone system may have various predefined syntaxes that may be associated with a user's intent (e.g., play, pause, adding to queue, grouping, other transport controls, controls available via the control device 300). Each intent may correspond to one or more media playback system commands which may or might not be the same as or similar to the intent. For instance, an intent of moving music playback from a first zone to a second zone may correspond to a media playback system command to move a now playing media item and/or the playback queue from the first zone to the second zone. In another example, the intent of moving music may correspond to a playback queue copy command for the media playback system to copy the playback queue of the first zone to the playback queue of the second zone and/or copy the state variable of the first zone to the state variable of the second zone.

As yet another example, the intent of moving music may correspond to two media playback system commands. The two commands may be to group the second zone with the first zone and then to remove the first zone from the group to in effect transfer the state of the first zone to the second zone.

A media playback system command may include an application program interface (API) which is called in response to determining that an intent corresponds to the media playback system command. The networked microphone system and/or the media playback system may have a defined mapping or correspondence between the intent of a user and a media playback system command.

In some aspects, the media playback system command may be executed on data stored in a computing device (e.g., computing device, 504, computing device 506, computing device 508) in cloud network 502. For example, an intent to add media item(s) (e.g., track(s), album(s), playlist(s)) to another playlist or playback queue may be added to a playlist or playback queue stored in cloud network 502. Playback queues stored on PBDs 532, 534, 536, 538 may be updated in response to the change in the playlist or playback queue stored in cloud network 502 so that the portion of the playback queue matches a portion or entirety of the playlist or playback queue in cloud network 502.

Certain words, syntaxes, and/or phrases may be associated with the same intent. For example, including the command word "play," "listen," or "hear" in a voice input may correspond to the user's intent that the media playback system play back media content. Each intent may have different types of predefined variables or slots on which to perform an action specified by the command or intent. The variables or slots may be in predefined locations or positions of various phrases. For example, the "play" command syntax may have a media variable for media that the user would like played back and may further have a location or zone variable for a location or zone in which the user would like the associated playback devices to playback the media content. In the example of the spoken command of "play The Beatles in the Kitchen," the instance of the media or music variable may be "The Beatles" and the instance of the zone variable may be the "Kitchen." The networked microphone system and/or media playback system may process the media variable separately and/or differently than the zone variable in identifying relevant objects which correspond to the media variable instance and/or the zone variable instance.

Another example of a syntax or phrase that may be associated with the "play" intent may be the syntax "Let me hear [media variable] [zone variable]." One example of this syntax may be "Let me hear Paul Simon in Emily's Room" where "Let me hear" may be associated with the "play" intent, "Paul Simon" may be an instance of the media variable, and "Emily's Room" may be an instance of the zone variable. The networked microphone system may parse the voice input and determine which of the syntaxes stored in the networked microphone system matches the voice input to identify the intent for the voice input. The syntaxes may be stored in any of the devices in the networked microphone system.

Yet another example of a syntax or phrase for the "play" intent or command may be the syntax "I want to listen to [media variable] in [zone variable]." The word "listen" or clause "I want to listen" may be associated with the "play" intent. Other syntaxes for the "play" intent are possible.

Another example command or intent may be related to adding media content to a queue which may be stored in the media playback system (e.g., in the PBD(s), the computing device 506, and/or CR 522). An example add-to-queue syntax may be "add [media variable] to queue in [zone variable]." Similar to other aspects described herein, the zone variable may be optional, and the system may determine the zone to which the command applies based on various techniques or methods (e.g., use the default zone, use the last-used zone, based on user presence information, use the zone actively playing media). The selected media content corresponding to the media variable may be added to the queue in the zone.

As yet another example command or intent may be a play next command which may cause a selected media content to be added to the top of a queue to be played next in a zone. An example syntax for this command may be to "play [media variable] next." Similar to other aspects described herein, the zone variable may be optional.

Another example of a command or intent may be a move or transfer command which may move or transfer currently playing music and/or the playback queue of a zone from one zone to another. For example, a user may speak the voice input of "Move music to [zone variable]" where the command word "move" or "transfer" may correspond to an intent to move playback state to another zone.

The commands and intents described herein are examples and other intents or commands are possible. For example, each of the controls available via control device 300 for controlling the media playback system as described herein may have corresponding intents available to be used to control the system. For instance, the name of the control command may correspond to an intent. If the control command involves one or more media items, the syntax for the command may include one or more media variables. If the control command involves one or more zones, the syntax for the command may include one or more zone variables. Other variables to be used with the different intents are also possible.

Examples of controls available via control device 300 for controlling the media playback system may include transport control commands. These commands or intents may be relevant to a media item which is currently being played such as transport commands (e.g., stop, pause, skip, rewind, fast forward, back, volume, etc.) or commands related to saving or adding the currently played media item to another playback queue or playlist. The syntax for intents or actions to be taken on a media item that is now playing may be simpler and may correspond to the names of the transport control. For example, the voice input for an intent to pause music playback may be the voice input "pause."

Different types of variables may be used in the different command syntaxes. For the media variable, the media variable may be a variable or slot in the syntax where the user is likely to specify via voice input media content that the user would like to hear or play. The media variable can be a variety of music related features or characteristics (e.g., types of media variables) including, but not limited to, album name, artist name, song name, playlist name, custom playlist name, genre (e.g., pop, classical, country, rock, R&B, etc.), mood (e.g., romantic, workout, productive), music tempo (e.g., upbeat, slow), radio station name, composer's name, musical era (e.g., baroque, romantic, classical, 20th Century), time period (e.g., 80's, 90's), playlist creator's name, ranking (e.g., best, Top 40) and/or other music identifying feature. The music variable may have a custom name that may be a custom playlist name created by the user of the user account and/or other custom name (e.g., custom song name, custom album name, custom artist name).

For the zone variable, the zone variable may be a variable or slot in the syntax where the user is likely to specify via voice input a location or zone in which to perform the requested action or the intent (e.g., play the requested music). A user may or might not include a zone instance in the voice input. In the event, the user does not specify a zone, for example, by simply saying "play some Beatles," the networked microphone system and/or media playback system may determine to "play some Beatles" in a default zone and/or other zone (s) based on other input (e.g., user presence information, context information, location information). The zone variable may include dynamic variables for custom zone names provided by the user. As another example, a custom zone name may be for example "Nick's Room" or "3rd Floor Conference Room."

In some aspects, the syntax may include a media service variable for a media service or application or other media-related service, product or application (e.g., media playback system) to execute the voice input. The system may identify a default playback system or zone (s) for all media related content or associate different playback systems or zone (s) with different services. For example, a user may say "play on Spotify Josh Groban in the bedroom." The system (e.g., networked microphone system and/or media playback system) may recognize "Spotify" as an instance of the media service variable, "Josh Groban" as an instance of a music variable, and "bedroom" as an instance of a zone variable. The system may search for media content related to "Josh Groban" as discussed herein within the media catalog of the media service Spotify®.

Some types of variables may be scalar in that the scalar variables may be formed into a vector or set which contains more than one instance of the same variable. A vector of a scalar variable may have the format or syntax when spoken by the user of "[first scalar variable] and [second scalar variable]," "[first scalar variable], [second scalar variable], and [third scalar variable]," or "[first scalar variable] [second scalar variable] [third scalar variable]." For example, a zone variable may be a scalar variable, and the user may specify that media content be played in more than one "Kitchen, Living Room, and Dining Room." In some aspects, a vector or a predefined set of scalar variables may be given a name. A predefined vector named, for example, "downstairs" may be associated with all of the zones which are downstairs in a home environment. In the example environment shown in FIG. 1, "downstairs" may be the "Living Room," "Dining Room," "Office," "Master Bedroom," "Bedroom," and "Bathroom" zones. The control device 300 can show a list of zones, and a user can select from the list of zones those zones to associate with the name or label "downstairs."

In some aspects, the media variable may be a scalar variable. More than one of the same type of music variable may be spoken in a single command phrase, and each media variable instance may be processed for corresponding media items independently of the other media variable instance (s) or in combination with the other media variable instance (s). For example, the voice input may be "Let's listen to music from The Beatles and the Beach Boys" which may correspond to the syntax "Let's listen to music from [first media variable] and [second media variable]." In one aspect, first media variable instance of "The Beatles" may be processed independently of "the Beach Boys." In independently processing "The Beatles" from "the Beach Boys," "The Beatles" may be processed for any media items related to the Beatles, and "the Beach Boys" may be processed for any media items related to "the Beach Boys" as will be described in more detail with respect to block 718. In another aspect, the first media variable instance of "The Beatles" and the second media variable instance of "the Beach Boys" may be processed as a combination where the system may process for media items related to both "The Beatles" and "the Beach Boys" (e.g., songs on which The Beatles and the Beach Boys perform and/or are listed as artists).

Networked microphone system and/or media playback system may associate a vector or set of zone variable instances with a grouping command. For example, the networked microphone system and/or media playback system may recognize the scalar variable syntax for the room variable and determine that this syntax corresponds to a media playback system command of grouping the specified instances of the zone variable. As an example, the user may specify to play media content in the "Living Room, Kitchen, and Nick's Room." The system 500 (e.g., networked microphone system and/or media playback system) may recognize "Nick's Room" as a zone variable based on location or placement of where "Nick's Room" is spoken in the phrase and search the table storing dynamic variables for custom zone names corresponding to "Nick's Room." The searching may be performed by the computing device 504 and/or computing device 506, and the custom zone name and/or identifier may be transmitted between the computing device 504 and computing device 506 based on the search of the table. The transmission may be via the metadata exchange channel and/or any other communication path between the computing device 504 and computing device 506.

Another example of a syntax which may be recognized as a grouping command by the media playback system may be to "add [zone variable]" or "also play in [zone variable]." For example, the networked microphone system may recognize the word "add" or the phrase "also play" as corresponding to a grouping intent or command. The system may determine the intent solely based on the voice input including the command word of "add" or "also play" in the command word position of the syntax or based on the voice input including the command word and a zone variable instance. This type of grouping may be based on context such as the context of which zones the music is already playing in. The media playback system may send this information to the networked microphone system via any communication path and/or the metadata exchange channel. In some aspects, the media playback system may receive the information and understand to also play the music currently being played in one or more zones in the specified zone and/or to include the specified zone in an existing group.

In some aspects, the music variable can be a scalar variable. For example, the user can specify to "play Backstreet Boys music from the 90's." "Backstreet Boys" may be the name of an artist and "the 90's" may be a time period for the music. Another example may be "play American Pie by Madonna" where "American Pie" may be a track name and "Madonna" may be an artist's name.

The music variable may be processed by searching a music database for information related to the specific music variable. The database may be a database of music at computing device 504, computing device 506, and/or computing device 508. For example, the user may speak "play American Pie." The networked microphone system may search computing device 504 for any music information related to "American Pie." The computing device 504 may return the results of, for example, an artist who has an album named the same as the music variable, the album name which matches or is similar to the music variable, a track named the music variable, a radio station of the music variable, a playlist named the music variable, a streaming service provider identifier of content related to the music variable and/or the raw speech-to-text conversion results. Using the example of "American Pie," the search results may return the artist "Don McLean," the album(s) named "American Pie," track(s) named "American Pie," radio station(s) named "American Pie" (e.g., identifier for Pandora radio station for "American Pie"), a music service (e.g., streaming music service such as Spotify® or Pandora®) track identifier for the track "American Pie" (e.g, Spotify® track identifier for "American Pie", URI, and/or URL) and/or the raw speech-to-text result of "American Pie." The networked microphone system may provide the set of results from the database search to the media playback system. The results may be provided via the metadata exchange channel and/or any other communication path established between the networked microphone system and the media playback system.

In some aspects, the spoken command may specify the specific media content (e.g., song, artist) or set of media content (e.g., album) to play such as "play the American Pie album" in which case the search results may return the album named "American Pie" and identifiers of music services for the album named "American Pie."

As another example, the user may speak the command "play foofoo" where the music variable is "foofoo." "Foofoo" might not correspond to any musical features or characteristics, and as a result, the database might not have any artist, album and/or track which corresponds to the music variable "foofoo." In this example, the returned result may only be the result of the speech-to-text conversion of "foofoo." The speech-to-text conversion or raw text may be used to search custom names (e.g., custom album name, custom song name, custom artist name). The raw text may be used to search for content stored on a device (e.g., CR 522) or on a network-enabled storage device (e.g., network attached storage (NAS) device). The network-enabled storage device may be able to communicate with the media playback system and/or networked microphone system via communication paths 542, 544, 546. In some instances, custom content may be stored by the user on computing device 508. The contents in the network-enabled storage device may be indexed on any device in system 500 and may be searchable based on the raw text.

As yet another example, the user may speak the command "play Beatles." Outside of a musical context "Beatles" may be interpreted to correspond to "beetles" because these words are homophones. Since the spoken command may be identified as in the area of music control in block 716, the networked microphone system may aware that in the spoken command "play Beatles" "Beatles" likely corresponds to the artist or other musical content named "Beatles." The search of the database may produce the results of the artist The Beatles, artist identifiers for The Beatles for different streaming services, an identifier for a recommended playlist based on the artist The Beatles and/or the raw results of the speech-to-text conversion of the utterance "Beatles."

As another example, the voice input spoken by the user may be "play Jazz." The system 500 may identify "Jazz" as a genre based on a search of a database storing a listing of genres. The system may search for relevant media content which corresponds to the genre of jazz. The search results may, for example, be identifiers for the genre "Jazz" in databases of various music services and/or playlist name (s) or identifier(s) of playlist(s) which correspond to the genre "Jazz."

In some aspects, the voice input may include two commands or phrases which are spoken in sequence. The networked microphone system may recognize that the two commands that are spoken in sequence may be related. The first command may contain a first variable type and the second command may contain a subset of the first variable type. For example, the user may provide the voice input "play some classical music" followed by "play something romantic." There may be a pause between the two commands. The system 500 may have eras of classical music associated with a classical instance of the music variable. The system 500 may recognize that "romantic" refers to the romantic era of classical music and may process the command as being a command to play something from the romantic era rather than to play something of a romantic mood. As another example, the user may speak "play some *NSync" followed by a short pause and then "play No Strings Attached." The system 500 may recognize that "No Strings Attached" is an album by the artist *NSync and may play this album rather than an album named "No Strings Attached" by another artist.

In some aspects, the command may include a system name variable for the name of a media playback system. The media playback system may be associated with a name such as the name of the media playback system manufacturer (e.g., SONOS®), a custom name, and/or other name. The voice input may include the name of the system to identify a specific system associated with the user account on which to execute the command or intent. In some instances, the presence of a media playback system name variable in the spoken command may be used in block 716 to automatically identify the voice input as being in the area of music control.

At block 2520, the media playback system may execute the spoken music control command by executing each of the parsed commands and variable (s). The media playback system may receive the search results from the networked microphone system and/or one or more media playback system commands. The media playback system commands and/or media information (e.g., search results) may be received by the media playback system in one or more messages from the networked microphone system. Based on the search results, the media playback system (e.g., computing device 506, control device 522, and/or playback device 532, 534, 536, 538) may decide what media content to play or queue for playback in response to the spoken command. Various techniques may be used to determine what to play in response to the spoken command when search results in addition to the raw text-to-speech conversion is received.

In some aspects, the media playback system may weight the different results based on a variety of data points and/or preferences. For example, the weighting of the different results may be based on any of popularity, user playback history, music services associated with the user account, music services available to the media playback system, music stored on storage devices associated with the media playback system and/or user preferences. As an example, songs by different artists may have the same name. If the search result returns songs with the same name by different artists, the song that is more popular may be weighted more and/or selected. The popularity of a song may be determined based on a variety of sources such as user play count, radio play count, music chart ranking, copies sold, and/or other available data. As another example, the media items which have been recently played by the user may be weighted more heavily.

In some aspects, the user may indicate for a media variable a preference order for media items to select. For example, the user may indicate that custom playlists are most preferred followed by a radio station, curated playlist, track, album, artist. The system may give more weight to media variable types that are higher in priority based on the user's preferences. The user's preferences may be stored in a user profile and/or otherwise associated with the user's account such that the user's preferences may be transmitted to the networked microphone system and/or media playback system. Some media variable types may be given equal priority or weighting.

In some aspects, a default prioritization may be used if the user has not provided user preferences. The system may use any combination of priorities for the different media variable types. For example, the system may prioritize media content corresponding to an album followed by artist and track ahead of the results corresponding to the raw text.

As another example, the media variable instance may be the name of an artist, and the artist may correspond to a playlist and a radio station. For media variable instances, playing of the radio station may be preferred over the playlist.

As yet another example, the media playback system may filter out results associated with a music service to which the user and/or the media playback system does not have access. After filtering out inaccessible results, the media playback system may select the media content to play based various methods or techniques described herein.

The selection methods described herein are illustrative, and other examples of methods or techniques for selecting media item(s) to play in response to a "play" command may be used.

In response to selecting the content to play in response to receiving a "play" command or intent, the media playback system may use the identifiers and/or other identifying information provided from the search results to identify a source for the content. The identifiers may be a network address or link where the corresponding content can be retrieved by the media playback system such as a network storage location or uniform resource locator (URL) and/or metadata (e.g., artist name, album name, track number, radio station name, playlist name, media service name, etc.).

In some aspects, the command or intent may be a transport command (e.g., pause, play after pause, skip, back, rewind, fast forward). As discussed above, the system 500 may determine a media playback system command which corresponds to the command or intent and execute the corresponding media playback system command. The networked microphone system can cause the media playback system to execute the command by transmitting a message to the media playback system including command information identifying the command corresponding to the intent (e.g., play, pause, etc.) and relevant objects of the command (e.g., variables such as zone name, zone identifier, group identifier, media identifier etc.). For example, the transport command may include an instance of a zone variable (e.g., Nick's Room, Kitchen, or other identifier for the zone) for the zone in which the command is to be executed.

In response to causing an action on the PBD(s) based on the voice input, the media playback system may update and/or store the state information relating to the actions performed by the PBD(s). For example, the PBD(s) may update the state variable to indicate the state of the zone such as that the zone or specific playback device (s) are currently playing a particular media item and/or a particular media item was added to the queue stored on the PBD(s). The state variable may be accessed by any device in system 500 in order to enable seamless playback and/or control from various devices in the system 500.

While the methods and systems have been described herein with respect to media content (e.g., music content, video content), the methods and systems described herein may be applied to a variety of content which may have associated audio that can be played by a media playback system. For example, pre-recorded sounds which might not be part of a music catalog may be played in response to a voice input. One example is the voice input "what does a nightingale sound like?". The networked microphone system's response to this voice input might not be music content with an identifier and may instead be a short audio clip. The media playback system may receive information associated with playing back the short audio clip (e.g., storage address, link, URL, file) and a media playback system command to play the short audio clip. Other examples are possible including podcasts, news clips, notification sounds, alarms, etc.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method, comprising:
receiving, via a networked microphone device associated with a media playback system, a voice command, wherein the media playback system comprises one or more zones;
determining, via the networked microphone device, an audio response zone based on a direction of the voice command respective to the media playback system, wherein the determined audio response zone comprises one or more playback devices;
selecting, via the networked microphone device, the determined audio response zone to play an audio response;
determining, via the networked microphone device, a directionality of audio output of the one or more playback devices based on the direction of the voice command respective to the media playback system; and
causing, via the networked microphone device, at least one playback device of the one or more playback devices of the selected audio response zone to play the audio response according to the determined directionality of audio output.

2. The method of claim 1, wherein
determining, via the networked microphone device, the audio response zone comprises causing, via the networked microphone device, a computing device to determine the audio response zone, and wherein selecting, via the networked microphone device, the determined audio response zone comprises causing, via the networked microphone device, the computing device to select the determined audio response zone, and wherein causing, via the networked microphone device, at least one playback device of the one or more playback devices of the selected audio response zone to play the audio response comprises causing, via the networked microphone device and the computing device, the at least one playback device of the one or more playback devices of the selected audio response zone to play the audio response.

3. The method of claim 1, further comprising:
receiving, via the networked microphone device from a controller device, an indication of a particular zone to which the networked microphone device is assigned.

4. The method of claim 1, further comprising:
sending, via the networked microphone device to a computing device, an indication of a particular zone to which the networked microphone device is assigned.

5. The method of claim 1, further comprising:
applying, via the networked microphone device, acoustics of an environment in which the networked microphone device is placed to the received voice command.

6. The method of claim 1, further comprising:
causing, via the networked microphone device, the at least one playback device to adjust a volume of audio content to a volume level that is below a volume level of the audio response.

7. The method of claim 1, further comprising:
receiving, via the networked microphone device, an indication of audio content;
determining, via the networked microphone device, at least one music service from a plurality of music services that supports the audio content; and
causing, via the networked microphone device, the at least one music service to transmit the audio content to the at least one playback device.

8. The method of claim 1, further comprising:
establishing, via the networked microphone device, a metadata exchange channel between the media playback system and the networked microphone device.

9. The method of claim 1, wherein the at least one playback device comprises a fallback device, the method further comprising:
before causing the at least one playback device to play the audio response, determining, via the networked microphone device, that another playback device is not available to play the audio response.

10. The method of claim 1, further comprising:
determining, via the networked microphone device, that the received voice command was received from a registered user of the media playback system; and
in response to determining that the received voice command was received from the registered user of the media playback system, configuring, via the networked microphone device, an instruction for the media playback system based on content from the voice command and information in a user profile for the registered user.

11. The method of claim 1, wherein the received voice command comprises:

a command word, one or more media variable instances, and one or more zone variable instances.

12. A networked microphone device comprising:
one or more processors; and
tangible, non-transitory computer-readable media comprising instructions encoded therein, wherein the instructions, when executed, cause the networked microphone device to perform a method comprising:
receiving a voice command, wherein the networked microphone device is associated with a media playback system, and wherein the media playback system comprises one or more zones;
determining an audio response zone based on a direction of the voice command respective to the media playback system, wherein the determined audio response zone comprises one or more playback devices;
selecting the determined audio response zone to play an audio response;
determining a directionality of audio output of the one or more playback devices based on the direction of the voice command respective to the media playback system; and
causing at least one playback device of the one or more playback devices of the selected audio response zone to play the audio response according to the determined directionality of audio output.

13. The networked microphone device of claim 12, wherein
determining, via the networked microphone device, the audio response zone comprises causing, via the networked microphone device, a computing device to determine the audio response zone, and wherein selecting, via the networked microphone device, the determined audio response zone comprises causing, via the networked microphone device, the computing device to select the determined audio response zone, and wherein causing, via the networked microphone device, at least one playback device of the one or more playback devices of the selected audio response zone to play the audio response comprises causing, via the networked microphone device and the computing device, the at least one playback device of the one or more playback devices of the selected audio response zone to play the audio response.

14. The networked microphone device of claim 12, wherein the method further comprises:
receiving, via the networked microphone device from a controller device, an indication of a particular zone to which the networked microphone device is assigned.

15. The networked microphone device of claim 12, wherein the method further comprises:
sending, via the networked microphone device to a computing device, an indication of a particular zone to which the networked microphone device is assigned.

16. The networked microphone device of claim 12, wherein the method further comprises:
applying acoustics of an environment in which the networked microphone device is placed to the received voice command.

17. The networked microphone device of claim 12, wherein the method further comprises:
causing the at least one playback device to adjust a volume of audio content to a volume level that is below a volume level of the audio response.

18. The networked microphone device of claim 12, wherein the method further comprises:
receiving an indication of audio content;
determining at least one music service from a plurality of music services that supports the audio content; and
causing the at least one music service to transmit the audio content to the at least one playback device.

19. The networked microphone device of claim 12, wherein the method further comprises:
establishing a metadata exchange channel between the media playback system and the networked microphone device.

20. The networked microphone device of claim 12, wherein the at least one playback device comprises a fallback device, and wherein the method further comprises:
before causing the at least one playback device to play the audio response, determining, via the networked microphone device, that another playback device is not available to play the audio response.

* * * * *